US012574953B2

(12) United States Patent
Li

(10) Patent No.: US 12,574,953 B2
(45) Date of Patent: Mar. 10, 2026

(54) LINK SWITCHING METHOD IN SIDELINK COMMUNICATION AND APPARATUS

(71) Applicant: HUAWEI TECHNOLOGIES CO., LTD., Shenzhen (CN)

(72) Inventor: Xiangyu Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 18/165,136

(22) Filed: Feb. 6, 2023

(65) Prior Publication Data

US 2023/0180280 A1 Jun. 8, 2023

Related U.S. Application Data

(63) Continuation of application No. PCT/CN2020/107968, filed on Aug. 7, 2020.

(51) Int. Cl.
*H04W 4/00* (2018.01)
*H04W 72/0453* (2023.01)
(Continued)

(52) U.S. Cl.
CPC ..... *H04W 72/542* (2023.01); *H04W 72/0453* (2013.01); *H04W 76/14* (2018.02); *H04W 76/15* (2018.02); *H04W 88/04* (2013.01)

(58) Field of Classification Search
CPC ............................ H04W 72/542; H04W 76/15
See application file for complete search history.

(56) References Cited

U.S. PATENT DOCUMENTS 9,125,179 B2 * 9/2015 Seok ..................... H04W 76/10
9,544,045 B2 * 1/2017 Hoymann .......... H04B 7/15557
(Continued)

FOREIGN PATENT DOCUMENTS

CN 107431544 A 12/2017
CN 109246793 A 1/2019
(Continued)

OTHER PUBLICATIONS

International Searching Authority, English Translation of the Written Opinion of the International Searching Authority PCT/CN2020/107968, WIPO, pp. 1-6. (Year: 2023).*
(Continued)

*Primary Examiner* — Elisabeth Benoit Magloire

(74) *Attorney, Agent, or Firm* — Leydig, Voit & Mayer, Ltd.

(57) ABSTRACT

This application discloses a link switching method in sidelink (SL) communication and an apparatus, to improve SL communication quality. The method may be implemented by using the following steps: A first communication apparatus communicates with a second communication apparatus through a first relay apparatus, where a link between the first communication apparatus and the first relay apparatus is a first source communication link, and a link between the second communication apparatus and the first relay apparatus is a second source communication link; the first communication apparatus establishes a destination communication link when a specified condition is satisfied; and the first communication apparatus communicates with the second communication apparatus through the destination communication link. When at least one of the two communication apparatuses move, quality of the link between the two communication apparatuses may deteriorate. In embodiments of this application, communication quality between two terminals is improved through link switching.

17 Claims, 18 Drawing Sheets

(51) Int. Cl.

| | | |
|---|---|---|
| *H04W 72/542* | (2023.01) | |
| *H04W 76/14* | (2018.01) | |
| *H04W 76/15* | (2018.01) | |
| *H04W 88/04* | (2009.01) | |

(56) References Cited

U.S. PATENT DOCUMENTS

| | | | | |
|---|---|---|---|---|
| 10,925,033 | B2* | 2/2021 | Wang | H04N 7/185 |
| 2012/0028627 | A1* | 2/2012 | Hunzinger | H04W 36/302 |
| | | | | 455/422.1 |
| 2012/0300680 | A1* | 11/2012 | Pietsch | H04L 25/0256 |
| | | | | 370/279 |
| 2012/0320763 | A1* | 12/2012 | Hong | H04W 24/10 |
| | | | | 370/246 |
| 2013/0039201 | A1* | 2/2013 | Kwon | H04L 5/14 |
| | | | | 370/252 |
| 2017/0033858 | A1* | 2/2017 | Calcev | H04B 7/155 |
| 2018/0295534 | A1 | 10/2018 | Huang et al. | |
| 2019/0053249 | A1* | 2/2019 | Zhang | H04W 72/23 |
| 2019/0320357 | A1* | 10/2019 | Wang | H04W 48/12 |
| 2019/0320495 | A1* | 10/2019 | Kuang | H04W 36/0066 |
| 2019/0373647 | A1* | 12/2019 | Rugeland | H04W 72/0446 |
| 2020/0029384 | A1* | 1/2020 | Hong | H04W 36/305 |
| 2020/0068580 | A1* | 2/2020 | Tang | H04W 76/14 |
| 2020/0245311 | A1* | 7/2020 | Uchiyama | H04W 76/15 |
| 2020/0296738 | A1* | 9/2020 | Inokuchi | H04W 72/21 |
| 2020/0351669 | A1* | 11/2020 | Xu | H04W 76/14 |
| 2022/0007445 | A1 | 1/2022 | Pan et al. | |

FOREIGN PATENT DOCUMENTS

| | | | |
|---|---|---|---|
| EP | 3477996 | A1 | 5/2019 |
| EP | 4106399 | A1 | 12/2022 |
| WO | 2016208097 | A1 | 12/2016 |

OTHER PUBLICATIONS

"3rd Generation Partnership Project; Technical Specification Group Services and System Aspects; Study on system enhancement for Proximity based Services (ProSe) in the 5G System (5GS)(Release 17)," 3GPP TR 23.752 V0.4.0, Total 121 pages, 3rd Generation Partnership Project, Valbonne, France (Jun. 2020).

Huawei et al., "Further views on Rel-17 work area on NR sidelink enhancements for V2X and other use cases," 3GPP TSG RAN Meeting #85, Newport Beach, USA, RP-191831, Total 13 pages, 3rd Generation Partnership Project, Valbonne, France (Sep. 16-20, 2019).

\* cited by examiner

First relay
device

First terminal
device

Second
terminal device

First source
communication link

Second source
communication link

First destination
communication link

Second destination
communication link

Second relay
device

LINK SWITCHING METHOD IN SIDELINK COMMUNICATION AND APPARATUS

CROSS-REFERENCE TO RELATED APPLICATIONS

This application is a continuation of International Application No. PCT/CN2020/107968, filed on Aug. 7, 2020, the disclosure of which is hereby incorporated by reference in its entirety.

TECHNICAL FIELD

Embodiments of this application relate to the field of communication technologies, and in particular, to a link switching method in sidelink communication and an apparatus.

BACKGROUND

Data may be directly transmitted between terminal devices through a sidelink (SL). Communication quality of the SL may be related to coverage signals of the two terminal devices. For example, when the coverage signals of the two terminal devices in SL communication are poor, or one terminal device is located outside coverage of the other terminal device, the communication quality of the SL deteriorates.

In consideration of improvement of network and system performance, a relay terminal device may be deployed in an SL communication system. The relay terminal device may have a strong capability. For example, the relay terminal device has strong receive and transmit antennas, and the relay terminal device may assist another terminal device in forwarding data, to implement coverage enhancement. For example, a terminal device 1 may communicate with a terminal device 2 through a relay terminal device. The terminal device 1 communicates with the relay terminal device through an SL, and the relay terminal device also communicates with the terminal device 2 through the SL. However, when the terminal device 1, the terminal device 2, or the relay terminal device moves, signal quality of a link 1 between the terminal device 1 and the relay terminal device may deteriorate, or signal quality of a link 2 between the relay terminal device and the terminal device 2 may deteriorate. Consequently, communication quality between the terminal device 1 and the terminal device 2 is affected.

SUMMARY

This application provides a link switching method in sidelink communication and an apparatus, to improve SL communication quality.

According to a first aspect, a link switching method in sidelink communication is provided. The method may be performed by a terminal device, or may be performed by a component (for example, a processor, a chip, or a chip system) of the terminal device. The terminal device may be denoted as a first terminal device. The method may be implemented in the following steps: The first terminal device communicates with a second terminal device through a first relay device, where a link between the first terminal device and the first relay device is a first source communication link, and a link between the second terminal devices and the first relay device is a second source communication link; the first terminal device establishes a destination communication link when a specified condition is satisfied; and the first terminal device communicates with the second terminal device through the destination communication link. When either or both of the two terminal devices moves/move, quality of the link between the two terminal devices may deteriorate. In this embodiment of this application, communication quality between the two terminals is improved through link switching.

In a possible design, the specified condition is associated with channel quality of the first source communication link, and/or the specified condition is associated with channel quality of the second source communication link. In this way, the link switching can be triggered by using the channel quality of the link between the two terminal devices, so that the destination communication link with better channel quality can be switched to, and the communication quality between the two terminals is improved through the link switching.

In a possible design, the channel quality is represented by using any one or more of the following parameters: a reference signal received power RSRP, a reference signal-signal to interference plus noise ratio RS-SINR, reference signal received quality RSRQ, or a reference signal-received signal strength indicator RS-RSSI.

In a possible design, the specified condition includes one or more of the following: the channel quality of the first source communication link is less than a first threshold, the channel quality of the second source communication link is less than a second threshold, or a sum of the channel quality of the first source communication link and the channel quality of the second source communication link is less than a third threshold. When the quality of the source communication link cannot satisfy a U2U relay communication requirement (for example, a QoS requirement), relay device reselection or the link switching can be triggered, to ensure the U2U relay communication requirement (for example, the QoS requirement).

In a possible design, the specified condition may be configured by a network device of the first terminal device for the first terminal device. For example, the network device of the first terminal device configures the specified condition for the first terminal device by using a radio resource control (radio resource control, RRC) message, a system information block (system information block, SIB) message, or pre-configured information. Alternatively, the specified condition may be pre-stored locally by the first terminal device, or may be pre-specified in a protocol. Alternatively, the specified condition may be configured by another terminal device for the first terminal device, for example, configured by the first relay device or the second terminal device for the first terminal device. For example, the another terminal may configure the specified condition for the first terminal by using a PC5-RRC message.

In a possible design, the destination communication link includes a first destination communication link and a second destination communication link, the first destination communication link is a link between the first terminal device and a second relay device, and the second destination communication link is a link between the second terminal device and the second relay device; the first terminal device sends a first message to the second relay device, where the first message requests to establish a unicast connection between the first terminal device and the second relay device; and the first terminal device receives a second message from the second relay device, where the second message is used to accept the establishment of the unicast connection between the first terminal device and the second relay device.

The second relay device may broadcast a discovery message or an announcement message to a surrounding terminal device. The announcement message is used as an example, and the announcement message indicates that the second relay device has a relay capability. The announcement message may be sent to the surrounding terminal device through a PC5-S interface. The first terminal device selects the second relay device by receiving the announcement message. That the first terminal device sends a first message to the second relay device means that the first terminal device sends the first message to the second relay device through unicast.

In a possible design, the first message indicates the second relay device to establish a unicast connection to the second terminal device. The second relay device may initiate the establishment of the unicast connection to the second terminal based on the first message.

Alternatively, after establishing the unicast connection to the second relay device, the first terminal device sends first indication information to the second relay device, where the first indication information indicates the second relay device to establish a unicast connection to the second terminal device.

In a possible design, the first terminal device sends a unicast connection establishment request message, where the unicast connection establishment request message requests to establish a unicast connection to the second terminal device. Currently, the first terminal device has established the unicast connection to the second terminal device through the first relay device. When the channel quality of the source communication link is poor, the first terminal device may re-initiate the unicast connection to the second terminal device. However, the first terminal device does not establish the connection to the second relay device. After receiving the unicast connection establishment request message, the second relay device helps the first terminal device forward the unicast connection establishment request message. In this case, the second relay device may further parse the first message to obtain an identifier of the second terminal device, and forward the unicast connection establishment request message to the second terminal device. Alternatively, the unicast connection establishment request message may be sent through broadcast. After receiving the unicast connection establishment request message, a second relay device that satisfies a condition, has a capability, or is interested in the unicast connection establishment request message helps forward the unicast connection establishment request message.

Optionally, after receiving a unicast connection establishment accept message sent by the second terminal device, the second relay device returns the unicast connection establishment accept message to the first terminal device. The first terminal device receives the unicast connection establishment accept message from the second relay device. The unicast connection establishment accept message returned by the second relay device indicates that the establishment of the unicast connection between the first terminal device and the second terminal device is completed. After receiving the unicast connection establishment accept message, the first terminal device learns that the second relay device serves as a relay device.

In a possible design, the destination communication link includes the first destination communication link and the second destination communication link, the first destination communication link is the link between the first terminal device and the second relay device, and the second destination communication link is the link between the second terminal device and the second relay device; the first terminal device receives an announcement message from the second relay device, where the announcement message indicates that the second relay device has the relay capability; and the first terminal device determines channel quality of the first destination communication link between the first terminal device and the second relay device based on signal quality of the announcement message. The first terminal device may obtain the channel quality of the first destination communication link between the first terminal device and one or more surrounding second relay devices in this manner. In addition, one or more target second relay devices may be selected.

In a possible design, the method further includes: The first terminal device receives a measurement report from the second terminal device, where the measurement report includes channel quality that is of the second destination communication link and that is measured by the second terminal device. Alternatively, the second terminal device may receive the announcement message from the second relay device, and the second terminal device determines the channel quality of the second destination communication link between the second terminal device and the second relay device based on signal quality of the announcement message. The second terminal device sends the measurement report to the first terminal device. In this way, the first terminal device can learn of the channel quality of the second destination communication link, and may use the channel quality of the second destination communication link as a reference condition for determining whether to perform link switching.

In a possible design, the first terminal device sends measurement configuration information to the second terminal device, where the measurement configuration information includes one or more of the following: an identifier of the second relay device, a cell identifier of the second relay device, or information about a carrier on which the second relay device works. In this way, power consumption of measuring the announcement message of the second relay device by the second terminal device can be reduced. In addition, this can further help ensure that the first terminal device and the second terminal device measure the same second relay device, so as to help determine a link to be switched to or determine reselection of the second relay device.

In a possible design, the first terminal device sends second indication information to the second relay device, where the second indication information indicates one or more of the following information: a source address of the first source communication link, a destination address of the first source communication link, a source address of the second source communication link, or a destination address of the second source communication link; and the second indication information is used by the second relay device to measure channel quality of the first destination communication link between the first terminal device and the second relay device and channel quality of the second destination communication link between the second relay device and the second terminal device. In this way, the second relay device may measure the channel quality of the first destination communication link and the channel quality of the second destination communication link based on the second indication information.

Optionally, the second indication information may be sent before the first terminal device establishes the unicast connection to the second relay device, or may be sent during the establishment of the unicast connection between the first terminal device and the second relay device, or may be sent after the establishment of the unicast connection between the first terminal device and the second relay device.

In a possible design, the first terminal device sends third indication information to the second relay device, where the third indication information indicates a first source address and a first destination address, the first source address is a source address used by the first terminal device to send a first inquiry message, the first destination address is a destination address used by the first terminal device to send the first inquiry message, the first inquiry message is used to inquire whether there is a relay device around, and the third indication information is used by the second relay device to measure channel quality of the first destination communication link between the first terminal device and the second relay device. This design provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

In a possible design, the third indication information alternatively indicates a second source address and a second destination address, the second source address is a source address used by the second terminal device to send a second inquiry message, the second destination address is a destination address used by the second terminal device to send the second inquiry message, the second inquiry message is used to inquire whether there is a relay device around, and the third indication information is used by the second relay device to measure channel quality of the second destination communication link between the second relay device and the second terminal device. This design provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

Optionally, the third indication information may be sent before the first terminal device establishes the unicast connection to the second relay device, or may be sent during the establishment of the unicast connection between the first terminal device and the second relay device, or may be sent after the first terminal device establishes the unicast connection to the second relay device.

In a possible design, the specified condition is further associated with the channel quality of the first destination communication link, and/or the specified condition is further associated with the channel quality of the second destination communication link.

In a possible design, the specified condition further includes any one or more of the following: the channel quality of the first destination communication link is greater than a fourth threshold; the channel quality of the first source communication link is less than the channel quality of the first destination communication link; the channel quality of the second destination communication link is greater than a fifth threshold; the channel quality of the second source communication link is less than the channel quality of the second destination communication link; a sum of the channel quality of the first source communication link and the channel quality of the second source communication link is less than a sum of the channel quality of the first destination communication link and the channel quality of the second destination communication link; or a sum of the channel quality of the first destination communication link and the channel quality of the second destination communication link is greater than a sixth threshold. In this way, when the channel quality of the destination communication link satisfies the specified condition, or when the channel quality of the destination communication link is better than the channel quality of the source link, the link switching can be triggered, so that the destination communication link with better channel quality can be switched to, and the communication quality between the two terminals is improved through the link switching.

In a possible design, the first terminal device sends a third message, where the third message requests to establish a unicast connection between the first terminal device and the second terminal device, and the third message includes information indicating that relay is supported. This manner is applicable to a case in which the second relay device does not send an announcement message or a discovery message to a surrounding terminal device, to notify the surrounding terminal device that the second relay device has a relay capability. In this case, the first terminal device does not discover existence of the second relay device. In this case, the first terminal device may send the third message (which may be a unicast connection establishment request message) for the second terminal device. The unicast connection establishment request message may be sent through broadcast, and another terminal device may also receive the unicast connection establishment request message, but does not reply to the message or perform processing based on the message.

After receiving a response message of the third message, the second relay device returns a fourth message to the first terminal device, and the first terminal device receives the fourth message from the second relay device, where the fourth message indicates that the establishment of the unicast connection between the first terminal device and the second terminal device is completed. The first terminal device learns, based on the fourth message, that the second relay device bears a relay function in U2U relay communication. The response message of the third message may be a unicast connection establishment accept message from the second terminal device.

In a possible design, the first terminal device sends a fifth message to the second terminal device, where the fifth message requests to establish a unicast connection to the second terminal device. Herein, the first terminal device directly sends the fifth message to the second terminal device instead of sending the fifth message through the relay device. For example, when the first terminal device determines that channel quality of a link through which the first terminal device is directly connected to the second terminal device is good, the first terminal device directly sends the fifth message to the second terminal device.

Optionally, after receiving the fifth message, the second terminal device returns a sixth message to the first terminal device, and the first terminal device receives the sixth message from the second terminal device, where the sixth message indicates that the establishment of the unicast connection is completed.

Alternatively, the first terminal device may broadcast the unicast connection establishment request message, and the unicast connection establishment request message is received by the second terminal device. This indicates that in this case, the channel quality of the link through which the first terminal device is directly connected to the second terminal device is good.

In a possible design, the method further includes: The first terminal device obtains, by receiving data sent by the second terminal device to the first relay device, the channel quality of the destination communication link through which the first terminal device is directly connected to the second terminal device. In this way, the first terminal device may learn of the channel quality of the link through which first terminal device is directly connected to the second terminal device, and use the channel quality as a reference condition for the link switching.

In a possible design, the specified condition further includes any one or more of the following: the channel quality of the destination communication link through which the first terminal device is directly connected to the second terminal device is greater than a seventh threshold.

In a possible design, the method further includes: The first terminal device sends a seventh message to the first relay device, where the seventh message requests to release a unicast connection between the first terminal device and the first relay device, or the seventh message requests to release the unicast connection between the first terminal device and the second terminal device. Releasing the original unicast connection can reduce overheads and complexity of the terminal device.

According to a second aspect, a link switching method in sidelink communication is provided. The method may be performed by a terminal device, or may be performed by a component (for example, a processor, a chip, or a chip system) of the terminal device. The terminal device may be denoted as a first terminal device. The method may be implemented by using the following steps: The first terminal device communicates with a second terminal device through a source communication link, where the source communication link is a communication link through which the first terminal device is directly connected to the second terminal device; the first terminal device establishes a first destination communication link and a second destination communication link when a specified condition is satisfied, where the first destination communication link is a link between the first terminal device and a relay device, and the second destination communication link is a link between the first terminal device and the relay device; and the first terminal device communicates with the second terminal device through the first destination communication link and the second destination communication link. When either or both of the two terminal devices moves/move, quality of the link between the two terminal devices may deteriorate. In this embodiment of this application, communication quality between the two terminals is improved through link switching.

In a possible design, the specified condition is associated with any one or more of the following: channel quality of the source communication link, channel quality of the first destination communication link, or channel quality of the second destination communication link. In this way, the link switching can be triggered by using the channel quality of the link between the two terminal devices, so that the destination communication link with better channel quality can be switched to, and the communication quality between the two terminals is improved through the link switching.

In a possible design, the channel quality is represented by using any one or more of the following parameters: a reference signal received power RSRP, a reference signal-signal to interference plus noise ratio RS-SINR, reference signal received quality RSRQ, or a reference signal-received signal strength indicator RS-RSSI.

In a possible design, the specified condition includes any one or more of the following: the channel quality of the source communication link is less than a first threshold; the channel quality of the first destination communication link is greater than a second threshold; the channel quality of the source communication link is less than the channel quality of the first destination communication link; the channel quality of the second destination communication link is greater than a third threshold; the channel quality of the source communication link is less than the channel quality of the second destination communication link; the channel quality of the source communication link is less than a sum of the channel quality of the first destination communication link and the channel quality of the second destination communication link; or a sum of the channel quality of the first destination communication link and the channel quality of the second destination communication link is greater than a fourth threshold. When the quality of the source communication link cannot satisfy a U2U relay communication requirement (for example, a QoS requirement), or it is determined that the channel quality of the destination communication link is better, relay device reselection or the link switching can be triggered in time, to ensure the U2U relay communication requirement (for example, the QoS requirement).

In a possible design, the first terminal device sends a first message to the relay device, where the first message requests to establish a unicast connection between the first terminal device and the relay device; and the first terminal device receives a second message from the relay device, where the second message indicates that the relay device accepts the establishment of the unicast connection between the first terminal device and the relay device.

The relay device may broadcast a discovery message or an announcement message to a surrounding terminal device. The announcement message is used as an example, and the announcement message indicates that the relay device has a relay capability. The announcement message may be sent to the surrounding terminal device through a PC5 interface. The first terminal device selects the relay device by receiving the announcement message. That the first terminal device sends a first message to the relay device means that the first terminal device sends the first message to a second relay device through unicast.

In a possible design, the first message indicates the relay device to establish a unicast connection to the second terminal device; and the second relay device may initiate the establishment of the unicast connection to the second terminal based on the first message.

Alternatively, after establishing the unicast connection to the relay device, the first terminal device sends first indication information to the relay device, where the first indication information indicates the relay device to establish a unicast connection to the second terminal device.

In a possible design, the first terminal device sends a third message, where the third message requests to establish a unicast connection to the second terminal device. Currently, the first terminal device has established the unicast connection to the second terminal device. When the channel quality of the source communication link is poor, the first terminal device may re-initiate the unicast connection to the second terminal device. However, the first terminal device does not establish the connection to the relay device. After receiving a unicast connection establishment request message, the relay device helps the first terminal device forward the unicast connection establishment request message. In this case, the relay device may further parse the first message to obtain an identifier of the second terminal device, and forward the unicast connection establishment request message. Alternatively, the unicast connection establishment request message may be sent through broadcast. After receiving the unicast connection establishment request message, a relay device that satisfies a condition, has a capability, or is interested in the unicast connection establishment request message helps forward the unicast connection establishment request message.

Optionally, after receiving a unicast connection establishment accept message sent by the second terminal device, the relay device returns a fourth message to the first terminal device, and the first terminal device receives the fourth message from the relay device, where the fourth message indicates that the establishment of the unicast connection between the first terminal device and the second terminal device is completed. After receiving the fourth message, the first terminal device determines the relay device. In this case, the specified condition may include: the channel quality of the source communication link is less than a first threshold.

In a possible design, the first terminal device receives an announcement message from the relay device, where the announcement message indicates that the relay device has the relay capability; and the first terminal device determines the channel quality of the first destination communication link between the first terminal device and the relay device based on signal quality of the announcement message. The first terminal device may obtain the channel quality of the first destination communication link between the first terminal device and one or more surrounding relay devices in this manner. In addition, one or more target relay devices may be selected.

In a possible design, the first terminal device receives a measurement report from the second terminal device, where the measurement report includes the channel quality that is of the second destination communication link and that is measured by the second terminal device. Alternatively, the second terminal device may receive the announcement message from the relay device, and the second terminal device determines the channel quality of the second destination communication link between the second terminal device and the relay device based on signal quality of the announcement message. The second terminal device sends the measurement report to the first terminal device. In this way, the first terminal device can learn of the channel quality of the second destination communication link, and may use the channel quality of the second destination communication link as a reference condition for determining whether to perform link switching.

In a possible design, the first terminal device sends measurement configuration information to the second terminal device, where the measurement configuration information includes one or more of the following: an identifier of the relay device, a cell identifier of the relay device, or information about a carrier on which the relay device works. In this way, power consumption of measuring the announcement message of the relay device by the second terminal device can be reduced. In addition, this can further help ensure that the first terminal device and the second terminal device measure the same second relay device, so as to help determine a link to be switched to or determine reselection of the relay device.

In a possible design, the first terminal device sends second indication information to the relay device, where the second indication information indicates a source address used by the first terminal device to send data to the second terminal device and/or a destination address used by the first terminal device to send data to the second terminal device, and the second indication information is used by the relay device to measure the channel quality of the first destination communication link between the first terminal device and the relay device. In this way, the relay device may measure the channel quality of the first destination communication link based on the second indication information.

The second terminal device may send third indication information to the relay device, where the third indication information indicates a source address used by the second terminal device to send data to the first terminal device and/or a destination address used by the second terminal device to send data to the first terminal device, and the third indication information is used by the relay device to measure the channel quality of the second destination communication link between the second terminal device and the relay device. In this way, the relay device may measure the channel quality of the second destination communication link based on the third indication information.

Optionally, both the second indication information and the third indication information may be sent before the first terminal device establishes the unicast connection to the relay device, or may be sent during the establishment of the unicast connection between the first terminal device and the relay device, or may be sent after the first terminal device establishes the unicast connection to the relay device.

In a possible design, the first terminal sends fourth indication information to the relay device, where the fourth indication information indicates a first source address and a first destination address, the first source address is a source address used by the first terminal device to send a first inquiry message, the first destination address is a destination address used by the first terminal device to send the first inquiry message, the first inquiry message is used to inquire whether there is a relay device around, and the fourth indication information is used by the relay device to measure channel quality of the first destination communication link between the first terminal device and the relay device. This provides different possible implementations of obtaining the channel quality of the first destination communication link and the channel quality of the second destination communication link. The relay device measures the channel quality of the first destination communication link and the channel quality of the second destination communication link. In comparison with separate measurement performed by the first terminal device and the second terminal device, system power consumption can be reduced.

In a possible design, the fourth indication information alternatively indicates a second source address and a second destination address, the second source address is a source address used by the second terminal device to send a second inquiry message, the second destination address is a destination address used by the second terminal device to send the second inquiry message, the second inquiry message is used to inquire whether there is a relay device around, and the fourth indication information is used by the relay device to measure channel quality of the second destination communication link between the relay device and the second terminal device. This design provides different possible implementations of obtaining the channel quality of the first destination communication link and the channel quality of the second destination communication link. The relay device measures the channel quality of the first destination communication link and the channel quality of the second destination communication link. In comparison with separate measurement performed by the first terminal device and the second terminal device, system power consumption can be reduced.

Optionally, the fourth indication information may be sent before the first terminal device establishes the unicast connection to the relay device, or may be sent during the establishment of the unicast connection between the first terminal device and the relay device, or may be sent after the first terminal device establishes the unicast connection to the relay device.

In a possible design, the first terminal device sends, to the second terminal device, a message for requesting to release the unicast connection. Releasing the original unicast connection can reduce overheads and complexity of the terminal device.

According to a third aspect, a link switching method in sidelink communication is provided. The method may be performed by a relay device in a sidelink relay communication scenario, or may be performed by a component (for example, a processor, a chip, or a chip system) of the relay device. The relay device may be denoted as a first relay device. The method may be implemented by using the following steps: The first relay device receives first data from a first terminal device, and forwards the first data to a second terminal device, where a link between the first terminal device and the first relay device is a first source communication link, and a link between the second terminal device and the first relay device is a second source communication link; and the first relay device triggers establishment of a destination communication link when a specified condition is satisfied, where the destination communication link is a link through which the first terminal device is to communicate with the second terminal device. When either or both of the two terminal devices moves/move, quality of the link between the two terminal devices may deteriorate. In this embodiment of this application, communication quality between the two terminals is improved through link switching.

In a possible design, the specified condition is associated with channel quality of the first source communication link, and/or the specified condition is associated with channel quality of the second source communication link. In this way, the link switching can be triggered by using the channel quality of the link between the two terminal devices, so that the destination communication link with better channel quality can be switched to, and the communication quality between the two terminals is improved through the link switching.

In a possible design, the channel quality is represented by using any one or more of the following parameters: a reference signal received power RSRP, a reference signal-signal to interference plus noise ratio RS-SINR, reference signal received quality RSRQ, or a reference signal-received signal strength indicator RS-RSSI.

In a possible design, the specified condition includes one or more of the following: the channel quality of the first source communication link is less than a first threshold, the channel quality of the second source communication link is less than a second threshold, or a sum of the channel quality of the first source communication link and the channel quality of the second source communication link is less than a third threshold. When the quality of the source communication link cannot satisfy a U2U relay communication requirement (for example, a QoS requirement), relay device reselection or the link switching can be triggered, to ensure the U2U relay communication requirement (for example, the QoS requirement).

In a possible design, the destination communication link includes a first destination communication link and a second destination communication link, the first destination communication link is a link between the first terminal device and a second relay apparatus, and the second destination communication link is a link between the second terminal device and the second relay apparatus; and the triggering establishment of a destination communication link includes: The first relay device sends indication information to the first terminal device, where the indication information indicates to trigger the establishment of the destination communication link; and the first terminal device sends a first message to the second relay device based on the indication information, where the first message requests to establish a unicast connection between the first terminal device and the second relay device.

The second relay device may broadcast a discovery message or an announcement message to a surrounding terminal device. The announcement message is used as an example, and the announcement message indicates that the second relay device has a relay capability. The announcement message may be sent to the surrounding terminal device through a PC5 interface. The first terminal device selects the second relay device by receiving the announcement message. That the first terminal device sends a first message to the second relay device means that the first terminal device sends the first message to the second relay device through unicast.

In a possible design, the first relay device sends indication information to the second relay device, where the indication information indicates one or more of the following information: a source address of the first source communication link, a destination address of the first source communication link, a source address of the second source communication link, or a destination address of the second source communication link; and the second indication information is used by the second relay device to measure channel quality of the first destination communication link between the first terminal device and the second relay device and channel quality of the second destination communication link between the second relay device and the second terminal device. In this way, the second relay device may measure the channel quality of the first destination communication link and the channel quality of the second destination communication link based on the indication information.

In a possible design, the first relay device sends indication information to the second relay device, where the indication information indicates a first source address and a first destination address, the first source address is a source address used by the first terminal device to send a first inquiry message, the first destination address is a destination address used by the first terminal device to send the first inquiry message, the first inquiry message is used to inquire whether there is a relay device around, and the indication information is used by the second relay device to measure channel quality of the first destination communication link between the first terminal device and the second relay device. This provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

In a possible design, the indication information alternatively indicates a second source address and a second destination address, the second source address is a source address used by the second terminal device to send a second inquiry message, the second destination address is a destination address used by the second terminal device to send the second inquiry message, the second inquiry message is used to inquire whether there is a relay device around, and the indication information indicates the second relay device to measure channel quality of the second destination communication link between the second relay device and the second terminal device. This provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

In a possible design, the specified condition is further associated with the channel quality of the first destination communication link, and/or the specified condition is further associated with the channel quality of the second destination communication link.

In a possible design, the specified condition further includes any one or more of the following: the channel quality of the first destination communication link is greater than a fourth threshold; the channel quality of the first source communication link is less than the channel quality of the first destination communication link; the channel quality of the second destination communication link is greater than a fifth threshold; the channel quality of the second source communication link is less than the channel quality of the second destination communication link; a sum of the channel quality of the first source communication link and the channel quality of the second source communication link is less than a sum of the channel quality of the first destination communication link and the channel quality of the second destination communication link; or a sum of the channel quality of the first destination communication link and the channel quality of the second destination communication link is greater than a sixth threshold. In this way, when the channel quality of the destination communication link satisfies the specified condition, or when the channel quality of the destination communication link is better than the channel quality of the source link, the link switching can be triggered, so that the destination communication link with better channel quality can be switched to, and the communication quality between the two terminals is improved through the link switching.

In a possible design, the first relay device sends indication information to the first terminal device, where the indication information is used to trigger the first terminal device to establish the unicast connection to the second terminal device. That the first terminal device establishes the unicast connection to the second terminal device may include: The first terminal device establishes the connection to the second terminal device through the second relay device; or the first terminal device establishes a direct connection to the second terminal device.

In a possible design, the first relay device establishes a unicast connection to the second relay device, and the first relay device sends indication information to the second relay device, where the indication information is used to trigger the second relay device to separately establish unicast connections to the first terminal device and the second terminal device.

In a possible design, the method further includes: The first relay device indicates the first terminal device to release the unicast connection to the second terminal device. Releasing the original unicast connection can reduce overheads and complexity of the terminal device.

According to a fourth aspect, a communication apparatus is provided. The communication apparatus may be a terminal device, denoted as a first terminal device; or an apparatus (for example, a chip, a chip system, or a circuit) in the first terminal device, or an apparatus that can be used in matching with the first terminal device. In a design, the communication apparatus may include modules that one-to-one correspond to the methods/operations/steps/actions described in the first aspect. The module may be implemented by a hardware circuit, software, or a combination of a hardware circuit and software. In a design, the communication apparatus may include a processing module and a communication module. The processing module is configured to invoke the communication module to perform a receiving function and/or a sending function. For example:

The communication module is configured to communicate with a second terminal device through a first relay device, where a link between the first terminal device and the first relay device is a first source communication link, and a link between the second terminal device and the first relay device is a second source communication link. The processing module is configured to establish a destination communication link when a specified condition is satisfied. Further, the communication module is further configured to communicate with the second terminal device through the destination communication link.

In a possible design, the specified condition is associated with channel quality of the first source communication link, and/or the specified condition is associated with channel quality of the second source communication link. In this way, link switching can be triggered by using the channel quality of the link between the two terminal devices, so that the destination communication link with better channel quality can be switched to, and communication quality between the two terminals is improved through the link switching.

In a possible design, the channel quality is represented by using any one or more of the following parameters: a reference signal received power RSRP, a reference signal-signal to interference plus noise ratio RS-SINR, reference signal received quality RSRQ, or a reference signal-received signal strength indicator RS-RSSI.

In a possible design, the specified condition includes one or more of the following: the channel quality of the first source communication link is less than a first threshold, the channel quality of the second source communication link is less than a second threshold, or a sum of the channel quality of the first source communication link and the channel quality of the second source communication link is less than a third threshold. When the quality of the source communication link cannot satisfy a U2U relay communication requirement (for example, a QoS requirement), relay device reselection or the link switching can be triggered, to ensure the U2U relay communication QoS requirement.

In a possible design, the destination communication link includes a first destination communication link and a second destination communication link, the first destination communication link is a link between the first terminal device and a second relay device, and the second destination communication link is a link between the second terminal device and the second relay device; the communication module is configured to send a first message to the second relay device, where the first message requests to establish a unicast connection between the first terminal device and the second relay device; and the communication module is configured to receive a second message from the second relay device, where the second message is used to accept the establishment of the unicast connection between the first terminal device and the second relay device.

The second relay device may broadcast a discovery message or an announcement message to a surrounding terminal device. The announcement message is used as an example, and the announcement message indicates that the second relay device has a relay capability. The announcement message may be sent to the surrounding terminal device through a PC5-S interface. The first terminal device selects the second relay device by receiving the announcement message. That the first terminal device sends a first message to the second relay device means that the first terminal device sends the first message to the second relay device through unicast.

In a possible design, the first message indicates the second relay device to establish a unicast connection to the second terminal device. The second relay device may initiate the establishment of the unicast connection to the second terminal based on the first message.

Alternatively, the communication module is configured to: after the unicast connection to the second relay device is established, send first indication information to the second relay device, where the first indication information indicates the second relay device to establish a unicast connection to the second terminal device.

In a possible design, the communication module is configured to send a unicast connection establishment request message, where the unicast connection establishment request message requests to establish a unicast connection to the second terminal device. Currently, the first terminal device has established the unicast connection to the second terminal device through the first relay device. When the channel quality of the source communication link is poor, the first terminal device may re-initiate the unicast connection to the second terminal device. However, the first terminal device does not establish the connection to the second relay device. After receiving the unicast connection establishment request message, the second relay device helps the first terminal device forward the unicast connection establishment request message to the second terminal device. In this case, the second relay device may further parse the first message to obtain an identifier of the second terminal device, and forward the unicast connection establishment request message to the second terminal device. Alternatively, the unicast connection establishment request message may be sent through broadcast. After receiving the unicast connection establishment request message, a second relay device that satisfies a condition, has a capability, or is interested in the unicast connection establishment request message helps forward the unicast connection establishment request message.

Optionally, after receiving a unicast connection establishment accept message sent by the second terminal device, the second relay device returns the unicast connection establishment accept message to the first terminal device. The communication module is further configured to receive the unicast connection establishment accept message from the second relay device. The unicast connection establishment accept message returned by the second relay device indicates that the establishment of the unicast connection between the first terminal device and the second terminal device is completed. After receiving the unicast connection establishment accept message, the first terminal device learns that the second relay device serves as a relay device.

In a possible design, the destination communication link includes the first destination communication link and the second destination communication link, the first destination communication link is the link between the first terminal device and the second relay device, and the second destination communication link is the link between the second terminal device and the second relay device; the communication module is further configured to receive an announcement message from the second relay device, where the announcement message indicates that the second relay device has the relay capability; and the processing module is configured to determine channel quality of the first destination communication link between the first terminal device and the second relay device based on signal quality of the announcement message. The first terminal device may obtain the channel quality of the first destination communication link between the first terminal device and one or more surrounding second relay devices in this manner. In addition, one or more target second relay devices may be selected.

In a possible design, the communication module is further configured to receive a measurement report from the second terminal device, where the measurement report includes channel quality that is of the second destination communication link and that is measured by the second terminal device. Alternatively, the second terminal device may receive the announcement message from the second relay device, and the second terminal device determines the channel quality of the second destination communication link between the second terminal device and the second relay device based on signal quality of the announcement message. The second terminal device sends the measurement report to the first terminal device. In this way, the first terminal device can learn of the channel quality of the second destination communication link, and may use the channel quality of the second destination communication link as a reference condition for determining whether to perform link switching.

In a possible design, the communication module is configured to send measurement configuration information to the second terminal device, where the measurement configuration information includes one or more of the following: an identifier of the second relay device, a cell identifier of the second relay device, or information about a carrier on which the second relay device works. In this way, power consumption of measuring the announcement message of the second relay device by the second terminal device can be reduced. In addition, this can further help ensure that the first terminal device and the second terminal device measure the same second relay device, so as to help determine a link to be switched to or determine reselection of the second relay device.

In a possible design, the communication module is configured to send second indication information to the second relay device, where the second indication information indicates one or more of the following information: a source address of the first source communication link, a destination address of the first source communication link, a source address of the second source communication link, or a destination address of the second source communication link; and the second indication information is used by the second relay device to measure channel quality of the first destination communication link between the first terminal device and the second relay device and channel quality of the second destination communication link between the second relay device and the second terminal device. In this way, the second relay device may measure the channel quality of the first destination communication link and the channel quality of the second destination communication link based on the second indication information.

Optionally, the second indication information may be sent before the first terminal device establishes the unicast connection to the second relay device, or may be sent during the establishment of the unicast connection between the first terminal device and the second relay device, or may be sent after the first terminal device establishes the unicast connection to the second relay device.

In a possible design, the communication module is configured to send third indication information to the second relay device, where the third indication information indicates a first source address and a first destination address, the first source address is a source address used by the first terminal device to send a first inquiry message, the first destination address is a destination address used by the first terminal device to send the first inquiry message, the first inquiry message is used to inquire whether there is a relay device around, and the third indication information is used by the second relay device to measure channel quality of the first destination communication link between the first terminal device and the second relay device. This design provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

In a possible design, the third indication information alternatively indicates a second source address and a second destination address, the second source address is a source address used by the second terminal device to send a second inquiry message, the second destination address is a destination address used by the second terminal device to send the second inquiry message, the second inquiry message is used to inquire whether there is a relay device around, and the third indication information is used by the second relay device to measure channel quality of the second destination communication link between the second relay device and the second terminal device. This design provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

Optionally, the third indication information may be sent before the first terminal device establishes the unicast connection to the second relay device, or may be sent during the establishment of the unicast connection between the first terminal device and the second relay device, or may be sent after the first terminal device establishes the unicast connection to the second relay device.

In a possible design, the specified condition is further associated with the channel quality of the first destination communication link, and/or the specified condition is further associated with the channel quality of the second destination communication link.

In a possible design, the specified condition further includes any one or more of the following: the channel quality of the first destination communication link is greater than a fourth threshold; the channel quality of the first source communication link is less than the channel quality of the first destination communication link; the channel quality of the second destination communication link is greater than a fifth threshold; the channel quality of the second source communication link is less than the channel quality of the second destination communication link; a sum of the channel quality of the first source communication link and the channel quality of the second source communication link is less than a sum of the channel quality of the first destination communication link and the channel quality of the second destination communication link; or a sum of the channel quality of the first destination communication link and the channel quality of the second destination communication link is greater than a sixth threshold. In this way, when the channel quality of the destination communication link satisfies the specified condition, or when the channel quality of the destination communication link is better than the channel quality of the source link, the link switching can be triggered, so that the destination communication link with better channel quality can be switched to, and the communication quality between the two terminals is improved through the link switching.

In a possible design, the communication module is configured to send a third message, where the third message requests to establish a unicast connection between the first terminal device and the second terminal device, and the third message includes information indicating that relay is supported. This manner is applicable to a case in which the second relay device does not send an announcement message or a discovery message to a surrounding terminal device, to notify the surrounding terminal device that the second relay device has a relay capability. In this case, the first terminal device does not discover existence of the second relay device. In this case, the first terminal device may send the third message (which may be a unicast connection establishment request message) for the second terminal device. The unicast connection establishment request message may be sent through broadcast, and another terminal device may also receive the unicast connection establishment request message, but does not reply to the message or perform processing based on the message.

After receiving a response message of the third message, the second relay device returns a fourth message to the first terminal device, and the communication module is further configured to receive the fourth message from the second relay device, where the fourth message indicates that the establishment of the unicast connection between the first terminal device and the second terminal device is completed. The first terminal device learns, based on the fourth message, that the second relay device bears a relay function in U2U relay communication. The response message of the third message may be a unicast connection establishment accept message sent by the second terminal device.

In a possible design, the communication module is configured to send a fifth message to the second terminal device, where the fifth message requests to establish a unicast connection to the second terminal device. Herein, the first terminal device directly sends the fifth message to the second terminal device instead of sending the fifth message through the relay device. For example, when the first terminal device determines that channel quality of a link through which the first terminal device is directly connected to the second terminal device is good, the first terminal device directly sends the fifth message to the second terminal device.

Optionally, after receiving the fifth message, the second terminal device returns a sixth message to the first terminal device, and the communication module is configured to receive the sixth message from the second terminal device, where the sixth message indicates that the establishment of the unicast connection is completed.

Alternatively, the first terminal device may broadcast the unicast connection establishment request message, and the unicast connection establishment request message is received by the second terminal device. This indicates that in this case, the channel quality of the link through which the first terminal device is directly connected to the second terminal device is good.

In a possible design, the communication module is further configured to obtain, by receiving data sent by the second terminal device to the first relay device, the channel quality of the destination communication link through which the first terminal device is directly connected to the second terminal device. In this way, the first terminal device may learn of the channel quality of the link through which the first terminal device is directly connected to the second terminal device, and use the channel quality as a reference condition for the link switching.

In a possible design, the specified condition further includes any one or more of the following: the channel quality of the destination communication link through which the first terminal device is directly connected to the second terminal device is greater than a seventh threshold.

In a possible design, the communication module is further configured to send a seventh message to the first relay device, where the seventh message requests to release a unicast connection between the first terminal device and the first relay device, or the seventh message requests to release the unicast connection between the first terminal device and the second terminal device. Releasing the original unicast connection can reduce overheads and complexity of the terminal device.

According to a fifth aspect, a communication apparatus is provided. The communication apparatus may be a terminal device, denoted as a first terminal device; or an apparatus (for example, a chip, a chip system, or a circuit) in the first terminal device, or an apparatus that can be used in matching with the first terminal device. In a design, the communication apparatus may include modules that one-to-one correspond to the methods/operations/steps/actions described in the second aspect. The module may be implemented by a hardware circuit, software, or a combination of a hardware circuit and software. In a design, the communication apparatus may include a processing module and a communication module. The processing module is configured to invoke the communication module to perform a receiving function and/or a sending function. For example:

The communication module is configured to communicate with a second terminal device through a source communication link, where the source communication link is a communication link through which the first terminal device is directly connected to the second terminal device; and the processing module is configured to establish a first destination communication link and a second destination communication link when a specified condition is satisfied, where the first destination communication link is a link between the first terminal device and a relay device, and the second destination communication link is a link between the first terminal device and the relay device, where the communication module is further configured to communicate with the second terminal device through the first destination communication link and the second destination communication link. When either or both of the two terminal devices moves/move, quality of the link between the two terminal devices may deteriorate. In this embodiment of this application, communication quality between the two terminals is improved through link switching.

In a possible design, the specified condition is associated with any one or more of the following: channel quality of the source communication link, channel quality of the first destination communication link, or channel quality of the second destination communication link. In this way, the link switching can be triggered by using the channel quality of the link between the two terminal devices, so that the destination communication link with better channel quality can be switched to, and the communication quality between the two terminals is improved through the link switching.

In a possible design, the channel quality is represented by using any one or more of the following parameters: a reference signal received power RSRP, a reference signal-signal to interference plus noise ratio RS-SINR, reference signal received quality RSRQ, or a reference signal-received signal strength indicator RS-RSSI.

In a possible design, the specified condition includes any one or more of the following: the channel quality of the source communication link is less than a first threshold; the channel quality of the first destination communication link is greater than a second threshold; the channel quality of the source communication link is less than the channel quality of the first destination communication link; the channel quality of the second destination communication link is greater than a third threshold; the channel quality of the source communication link is less than the channel quality of the second destination communication link; the channel quality of the source communication link is less than a sum of the channel quality of the first destination communication link and the channel quality of the second destination communication link; or a sum of the channel quality of the first destination communication link and the channel quality of the second destination communication link is greater than a fourth threshold. When the quality of the source communication link cannot satisfy a U2U relay communication requirement (for example, a QoS requirement), or it is determined that the channel quality of the destination communication link is better, relay device reselection or the link switching can be triggered in time, to ensure the U2U relay communication requirement (for example, the QoS requirement).

In a possible design, the communication module is configured to send a first message to the relay device, where the first message requests to establish a unicast connection between the first terminal device and the relay device; and the communication module is configured to receive a second message from the relay device, where the second message indicates that the relay device accepts the establishment of the unicast connection between the first terminal device and the relay device.

The relay device may broadcast a discovery message or an announcement message to a surrounding terminal device. The announcement message is used as an example, and the announcement message indicates that the relay device has a relay capability. The announcement message may be sent to the surrounding terminal device through a PC5-S interface. The first terminal device selects the relay device by receiving the announcement message. That the first terminal device sends a first message to the relay device means that the first terminal device sends the first message to a second relay device through unicast.

In a possible design, the first message indicates the relay device to establish a unicast connection to the second terminal device; and the second relay device may initiate the establishment of the unicast connection to the second terminal based on the first message.

Alternatively, the communication module is configured to: after the unicast connection to the relay device is established, send first indication information to the relay device, where the first indication information indicates the relay device to establish a unicast connection to the second terminal device.

In a possible design, the communication module is configured to send a third message, where the third message requests to establish a unicast connection to the second terminal device. Currently, the first terminal device has established the unicast connection to the second terminal device. When the channel quality of the source communication link is poor, the first terminal device may re-initiate the unicast connection to the second terminal device. However, the first terminal device does not establish the connection to the relay device. After receiving a unicast connection establishment request message, the relay device helps the first terminal device forward the unicast connection establishment request message. In this case, the relay device may further parse the first message to obtain an identifier of the second terminal device, and forward the unicast connection establishment request message. Alternatively, the unicast connection establishment request message may be sent through broadcast. After receiving the unicast connection establishment request message, a relay device that satisfies a condition, has a capability, or is interested in the unicast connection establishment request message helps forward the unicast connection establishment request message.

Optionally, after receiving a unicast connection establishment accept message sent by the second terminal device, the relay device returns a fourth message to the first terminal device, and the communication module is configured to receive the fourth message from the relay device, where the fourth message indicates that the establishment of the unicast connection between the first terminal device and the second terminal device is completed. After receiving the fourth message, the first terminal device determines the relay device. In this case, the specified condition may include: the channel quality of the source communication link is less than a first threshold.

In a possible design, the communication module is configured to receive an announcement message from the relay device, where the announcement message indicates that the relay device has the relay capability; and the first terminal device determines the channel quality of the first destination communication link between the first terminal device and the relay device based on signal quality of the announcement message. The first terminal device may obtain the channel quality of the first destination communication link between the first terminal device and one or more surrounding relay devices in this manner. In addition, one or more target relay devices may be selected.

In a possible design, the communication module is configured to receive a measurement report from the second terminal device, where the measurement report includes the channel quality that is of the second destination communication link and that is measured by the second terminal device. Alternatively, the second terminal device may receive the announcement message from the relay device, and the second terminal device determines the channel quality of the second destination communication link between the second terminal device and the relay device based on signal quality of the announcement message. The second terminal device sends the measurement report to the first terminal device. In this way, the first terminal device can learn of the channel quality of the second destination communication link, and may use the channel quality of the second destination communication link as a reference condition for determining whether to perform link switching.

In a possible design, the communication module is configured to send measurement configuration information to the second terminal device, where the measurement configuration information includes one or more of the following: an identifier of the relay device, a cell identifier of the relay device, or information about a carrier on which the second relay device works. In this way, power consumption of measuring the announcement message of the relay device by the second terminal device can be reduced. In addition, this can further help ensure that the first terminal device and the second terminal device measure the same second relay device, so as to help determine a link to be switched to or determine reselection of the relay device.

In a possible design, the communication module is configured to send second indication information to the relay device, where the second indication information indicates a source address used by the first terminal device to send data to the second terminal device and/or a destination address used by the first terminal device to send data to the second terminal device, and the second indication information is used by the relay device to measure the channel quality of the first destination communication link between the first terminal device and the relay device. In this way, the relay device may measure the channel quality of the first destination communication link based on the second indication information.

The second terminal device may send third indication information to the relay device, where the third indication information indicates a source address used by the second terminal device to send data to the first terminal device and/or a destination address used by the second terminal device to send data to the first terminal device, and the third indication information is used by the relay device to measure the channel quality of the second destination communication link between the second terminal device and the relay device. In this way, the relay device may measure the channel quality of the second destination communication link based on the third indication information.

Optionally, both the second indication information and the third indication information may be sent before the first terminal device establishes the unicast connection to the relay device, or may be sent during the establishment of the unicast connection between the first terminal device and the relay device, or may be sent after the first terminal device establishes the unicast connection to the relay device.

In a possible design, the communication module is configured to send fourth indication information to the relay device, where the fourth indication information indicates a first source address and a first destination address, the first source address is a source address used by the first terminal device to send a first inquiry message, the first destination address is a destination address used by the first terminal device to send the first inquiry message, the first inquiry message is used to inquire whether there is a relay device around, and the fourth indication information is used by the relay device to measure channel quality of the first destination communication link between the first terminal device and the relay device. This provides different possible implementations of obtaining the channel quality of the first destination communication link and the channel quality of the second destination communication link. The relay device measures the channel quality of the first destination communication link and the channel quality of the second destination communication link. In comparison with separate measurement performed by the first terminal device and the second terminal device, system power consumption can be reduced.

In a possible design, the fourth indication information alternatively indicates a second source address and a second destination address, the second source address is a source address used by the second terminal device to send a second inquiry message, the second destination address is a destination address used by the second terminal device to send the second inquiry message, the second inquiry message is used to inquire whether there is a relay device around, and the fourth indication information is used by the relay device to measure channel quality of the second destination communication link between the relay device and the second terminal device. This design provides different possible implementations of obtaining the channel quality of the first destination communication link and the channel quality of the second destination communication link. The relay device measures the channel quality of the first destination communication link and the channel quality of the second destination communication link. In comparison with separate measurement performed by the first terminal device and the second terminal device, system power consumption can be reduced.

Optionally, the fourth indication information may be sent before the first terminal device establishes the unicast connection to the relay device, or may be sent during the establishment of the unicast connection between the first terminal device and the relay device, or may be sent after the first terminal device establishes the unicast connection to the relay device.

In a possible design, the communication module is configured to send, to the second terminal device, a message for requesting to release the unicast connection. Releasing the original unicast connection can reduce overheads and complexity of the terminal device.

According to a sixth aspect, a communication apparatus is provided. The communication apparatus may be a relay device, denoted as a first relay device; or an apparatus (for example, a chip, a chip system, or a circuit) in the first relay device, or an apparatus that can be used in matching with the first relay device. In a design, the communication apparatus may include modules that one-to-one correspond to the methods/operations/steps/actions described in the third aspect. The module may be implemented by a hardware circuit, software, or a combination of a hardware circuit and software. In a design, the communication apparatus may include a processing module and a communication module. The processing module is configured to invoke the communication module to perform a receiving function and/or a sending function. For example:

The communication module is configured to: receive first data from a first terminal device, and forward the first data to a second terminal device, where a link between the first terminal device and the first relay device is a first source communication link, and a link between the second terminal device and the first relay device is a second source communication nication link; and the processing module is configured to trigger establishment of a destination communication link when a specified condition is satisfied, where the destination communication link is a link through which the first terminal device is to communicate with the second terminal device. When either or both of the two terminal devices moves/move, quality of the link between the two terminal devices may deteriorate. In this embodiment of this application, communication quality between the two terminals is improved through link switching.

In a possible design, the specified condition is associated with channel quality of the first source communication link, and/or the specified condition is associated with channel quality of the second source communication link. In this way, the link switching can be triggered by using the channel quality of the link between the two terminal devices, so that the destination communication link with better channel quality can be switched to, and the communication quality between the two terminals is improved through the link switching.

In a possible design, the channel quality is represented by using any one or more of the following parameters: a reference signal received power RSRP, a reference signal to interference plus noise ratio RS-SINR, reference signal received quality RSRQ, or a reference signal-received signal strength indicator RS-RSSI.

In a possible design, the specified condition includes one or more of the following: the channel quality of the first source communication link is less than a first threshold, the channel quality of the second source communication link is less than a second threshold, or a sum of the channel quality of the first source communication link and the channel quality of the second source communication link is less than a third threshold. When the quality of the source communication link cannot satisfy a U2U relay communication requirement (for example, a QoS requirement), relay device reselection or the link switching can be triggered, to ensure the U2U relay communication requirement (for example, the QoS requirement).

In a possible design, the destination communication link includes a first destination communication link and a second destination communication link, the first destination communication link is a link between the first terminal device and a second relay device, and the second destination communication link is a link between the second terminal device and the second relay device; the communication module is configured to send indication information to the first terminal device, where the indication information indicates to trigger the establishment of the destination communication link; and the first terminal device sends a first message to the second relay device based on the indication information, where the first message requests to establish a unicast connection between the first terminal device and the second relay device.

The second relay device may broadcast a discovery message or an announcement message to a surrounding terminal device. The announcement message is used as an example, and the announcement message indicates that the second relay device has a relay capability. The announcement message may be sent to the surrounding terminal device through a PC5 interface. The first terminal device selects the second relay device by receiving the announcement message. That the first terminal device sends a first message to the second relay device means that the first terminal device sends the first message to the second relay device through unicast.

In a possible design, the first relay device sends indication information to the second relay device, where the indication information indicates one or more of the following information: a source address of the first source communication link, a destination address of the first source communication link, a source address of the second source communication link, or a destination address of the second source communication link; and the second indication information is used by the second relay device to measure channel quality of the first destination communication link between the first terminal device and the second relay device and channel quality of the second destination communication link between the second relay device and the second terminal device. In this way, the second relay device may measure the channel quality of the first destination communication link and the channel quality of the second destination communication link based on the indication information.

In a possible design, the communication module is configured to send indication information to the second relay device, where the indication information indicates a first source address and a first destination address, the first source address is a source address used by the first terminal device to send a first inquiry message, the first destination address is a destination address used by the first terminal device to send the first inquiry message, the first inquiry message is used to inquire whether there is a relay device around, and the indication information is used by the second relay device to measure channel quality of the first destination communication link between the first terminal device and the second relay device. This provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

In a possible design, the indication information alternatively indicates a second source address and a second destination address, the second source address is a source address used by the second terminal device to send a second inquiry message, the second destination address is a destination address used by the second terminal device to send the second inquiry message, the second inquiry message is used to inquire whether there is a relay device around, and the indication information indicates the second relay device to measure channel quality of the second destination communication link between the second relay device and the second terminal device. This provides different possible implementations of obtaining the channel quality of the first destination communication link and the channel quality of the second destination communication link. The second relay device measures the channel quality of the first destination communication link and the channel quality of the second destination communication link. In comparison with separate measurement performed by the first terminal device and the second terminal device, system power consumption can be reduced.

In a possible design, the specified condition is further associated with the channel quality of the first destination communication link, and/or the specified condition is further associated with the channel quality of the second destination communication link.

In a possible design, the specified condition further includes any one or more of the following: the channel quality of the first destination communication link is greater than a fourth threshold; the channel quality of the first source communication link is less than the channel quality of the first destination communication link; the channel quality of the second destination communication link is greater than a fifth threshold; the channel quality of the second source communication link is less than the channel quality of the second destination communication link; a sum of the channel quality of the first source communication link and the channel quality of the second source communication link is less than a sum of the channel quality of the first destination communication link and the channel quality of the second destination communication link; or a sum of the channel quality of the first destination communication link and the channel quality of the second destination communication link is greater than a sixth threshold. In this way, when the channel quality of the destination communication link satisfies the specified condition, or when the channel quality of the destination communication link is better than the channel quality of the source link, the link switching can be triggered, so that the destination communication link with better channel quality can be switched to, and the communication quality between the two terminals is improved through the link switching.

In a possible design, the communication module is configured to send indication information to the first terminal device, where the indication information is used to trigger the first terminal device to establish the unicast connection to the second terminal device. That the first terminal device establishes the unicast connection to the second terminal device may include: The first terminal device establishes the connection to the second terminal device through the second relay device; or the first terminal device establishes a direct connection to the second terminal device.

In a possible design, the communication module is configured to send indication information to the second relay device after a unicast connection to the second relay device is established, where the indication information is used to trigger the second relay device to separately establish unicast connections to the first terminal device and the second terminal device.

In a possible design, the communication module is further configured to indicate the first terminal device to release the unicast connection to the second terminal device. Releasing the original unicast connection can reduce overheads and complexity of the terminal device.

According to a seventh aspect, a communication apparatus is provided. The communication apparatus includes a communication interface and a processor. The communication interface is used by the communication apparatus to communicate with another device, for example, to send and receive data or a signal. For example, the communication interface may be a transceiver, a circuit, a bus, a module, or a communication interface of another type. The processor is configured to invoke a group of programs, instructions, or data, to perform the method according to the first aspect or the second aspect. The communication apparatus may further include a memory, configured to store the programs, the instructions, or the data invoked by the processor. The memory is coupled to the processor. When executing the instructions or the data stored in the memory, the processor can implement the method according to the first aspect or the second aspect.

According to an eighth aspect, a communication apparatus is provided. The communication apparatus includes a communication interface and a processor. The communication interface is used by the communication apparatus to communicate with another device, for example, to send and receive data or a signal. For example, the communication interface may be a transceiver, a circuit, a bus, a module, or a communication interface of another type. The processor is configured to invoke a group of programs, instructions, or data, to perform the method according to the third aspect. The communication apparatus may further include a memory, configured to store the programs, the instructions, or the data invoked by the processor. The memory is coupled to the processor. When executing the instructions or the data stored in the memory, the processor can implement the method according to the third aspect.

According to a ninth aspect, an embodiment of this application further provides a computer-readable storage medium. The computer-readable storage medium stores computer-readable instructions. When the computer-readable instructions are run on a computer, the method according to the first aspect or the second aspect is performed.

According to a tenth aspect, an embodiment of this application further provides a computer-readable storage medium. The computer-readable storage medium stores computer-readable instructions. When the computer-readable instructions are run on a computer, the method according to the third aspect is performed.

According to an eleventh aspect, an embodiment of this application provides a chip system. The chip system includes a processor, and may further include a memory, to implement the method according to the first aspect or the second aspect. The chip system may include a chip, or may include the chip and another discrete component.

According to a twelfth aspect, an embodiment of this application provides a chip system. The chip system includes a processor, and may further include a memory, to implement the method according to the third aspect. The chip system may include a chip, or may include the chip and another discrete component.

According to a thirteenth aspect, an embodiment of this application provides a communication system. The communication system includes a first terminal device and a second terminal, and the first terminal is configured to perform the method according to the first aspect or the second aspect.

In a possible design, the communication system further includes a first relay device, configured to perform the method according to any one of the third aspect or the possible designs of the third aspect.

According to a fourteenth aspect, a computer program product including instructions is provided. When the computer program product runs on a computer, the method according to the first aspect or the second aspect is performed.

According to a fifteenth aspect, a computer program product including instructions is provided. When the computer program product runs on a computer, the method according to the third aspect is performed.

DESCRIPTION OF EMBODIMENTS

Embodiments of this application provide a link switching method in sidelink communication and an apparatus. The method and the apparatus are based on a same concept. Because principles for resolving a problem by using the method and the apparatus are similar, mutual reference may be made between implementations of the apparatus and the method, and repeated descriptions are not provided again.

In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. In this application, "at least one" means one or more, and "a plurality of" means two or more. In addition, it should be understood that in descriptions of this application, terms such as "first" and "second" are merely used for distinguishing and description, but should not be understood as indicating or implying relative importance, or should not be understood as indicating or implying a sequence. The following describes in detail embodiments of this application with reference to the accompanying drawings.

The link switching method in sidelink communication provided in embodiments of this application may be applied to a 4th generation (4G) communication system, for example, long term evolution (LTE); or may be applied to a 5th generation (5G) communication system, for example, 5G new radio (NR); or may be applied to various future communication systems, for example, a 6th generation (6G) communication system or a 7th generation (7G) communication system. Embodiments of this application may further be applied to an integrated access and backhaul (IAB) scenario.

Figures 1, 2A:
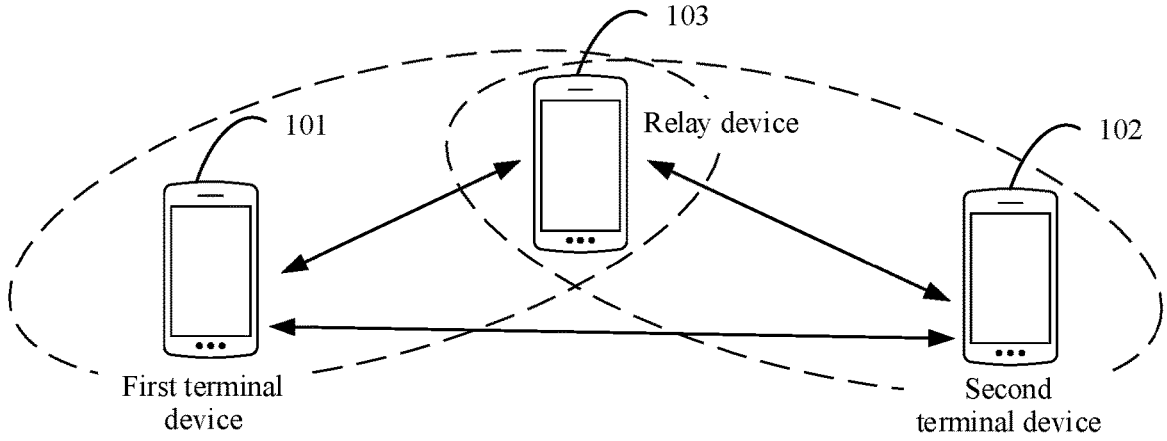
FIG. 1 is a schematic diagram of a U2U communication architecture according to an embodiment of this application.
FIG. 2*a* is a first schematic diagram of link switching according to an embodiment of this application.

FIG. 1 is a schematic diagram of an architecture of a communication system to which an embodiment of this application is applicable. The communication system includes at least two terminal devices: a first terminal device 101 and a second terminal device 102. The communication system may further include a relay device 103. The relay device 103 is also a terminal device, and the relay device 103 implements a relay forwarding function. The first terminal device 101 may communicate with the second terminal device 102 through a directly connected sidelink. The first terminal device 101 and the second terminal device 102 may alternatively transmit data transmission through the relay device 103. The first terminal device 101 sends data to the second terminal device 102 through the relay device 103, and the second terminal device 102 sends data to the first terminal device 101 through the relay device 103. When the first terminal device 101 is located outside coverage or at an edge of the coverage of the second terminal device 102, or the second terminal device 102 is located outside coverage or at an edge of the coverage of the first terminal device 101, data may be forwarded through the relay device 103, to implement sidelink coverage enhancement. The first terminal device 101 communicates with the relay device 103 through a sidelink, and the relay device 103 also communicates with the second terminal device 102 through a sidelink.

The first terminal device 101, the second terminal device 102, and the relay device 103 may be collectively referred to as terminal devices.

The terminal device in embodiments of this application may also be referred to as user equipment (UE), a mobile station (MS), a mobile terminal (MT), or the like, and is a device that provides voice or data connectivity for a user, or may be an internet-of-things device. For example, the terminal device includes a handheld device, a vehicle-mounted device, or the like that has a wireless connection function. The terminal device may be a mobile phone, a tablet computer, a notebook computer, a palmtop computer, a mobile internet device MID), a wearable device (for example, a smart watch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote surgery, a wireless terminal in a smart grid, a wireless terminal in transportation safety (transportation safety), a wireless terminal in a smart city, a wireless terminal in a smart home, a flight device (for example, an intelligent robot, a hot balloon, an uncrewed aerial vehicle, or an aircraft), or the like. It should be understood that, in embodiments of this application, the terminal device may alternatively be a chip in the terminal device; or a communication apparatus, a unit, a module, or the like having a U2U communication function, for example, an in-vehicle communication apparatus, an in-vehicle communication module, or an in-vehicle communication chip. The method provided in embodiments of this application may be performed by a terminal device, or may be performed by a component (for example, a processor, a chip, or a chip system) of the terminal device. An entity that performs the method in embodiments of this application may also be referred to as a communication apparatus. The communication apparatus may be a terminal device or a component (for example, a processor, a chip, or a chip system) of the terminal device. For differentiation, a first communication apparatus, a second communication apparatus, and a relay apparatus may be used for representation. The first communication apparatus corresponds to a first terminal device, the second communication apparatus corresponds to a second terminal device, and the relay apparatus corresponds to a relay device. In embodiments of this application, a terminal device is used as an example of a device for implementing a function of the method for description.

When the terminal device is referred to as UE, a communication scenario shown in FIG. 1 may also be referred to as user equipment to user equipment relay (UE to UE relay, U2U relay) communication.

U2U relay is a technology by using which user equipment communicates with another user equipment through relay user equipment (relay UE). The U2U relay can improve sidelink coverage enhancement, and can further increase a capacity of a sidelink system. For example, when a coverage signal between one UE and another UE is poor, or one UE is located outside coverage of another UE, coverage enhancement may be implemented by using relay UE. Generally, the relay UE may be a device with a strong capability, and has strong receive and transmit antennas. The relay UE may assist two UEs in U2U relay communication in forwarding data. As shown in FIG. 1, the first terminal device is denoted as UE 1, the second terminal device is denoted as UE 2, and the relay device is denoted as relay UE. The UE 1 may communicate with the UE 2 through the relay UE. The UE 2 is located outside or at an edge of coverage of the UE 1. If the UE 1 needs to send data to the UE 2, the UE 1 may send the data to the relay UE, and the relay UE forwards the data to the UE 2. Similarly, the UE 1 is located outside coverage of the UE 2 or at an edge of the coverage of the UE 2. If the UE 2 needs to send data to the UE 1, the UE 2 may send the data to the relay UE, and the relay UE forwards the received data to the UE 1. In this way, sidelink coverage between the UE 1 and the UE 2 is enhanced.

The first terminal device sends data to the second terminal device through the relay device. In this case, the first terminal device may also be referred to as a transmit end, a data transmit end, or a U2U relay data transmit end, and the second terminal device may also be referred to as a receive end, a data receive end, or a U2U relay data receive end. The second terminal device sends data to the first terminal device through the relay device. In this case, the second terminal device may also be referred to as a transmit end, a data transmit end, or a U2U relay data transmit end, and the first terminal device may also be referred to as a receive end, a data receive end, or a U2U relay data receive end. When the method is applied to a scenario in which the first terminal device establishes a unicast connection to the second terminal device, if the first terminal device initiates a unicast connection establishment request, the first terminal device may also be referred to as an initiator of establishment of an end-to-end unicast connection; or if the second terminal device initiates a unicast connection establishment request, the first terminal device may also be referred to as an acceptor of establishment of an end-to-end unicast connection.

The following uses communication between the first terminal device and the second terminal device as an example to describe the link switching method in sidelink communication provided in embodiments of this application. Embodiments of this application are to improve communication quality between two terminal devices. The two terminal devices may communicate with each other through a directly connected sidelink, or may communicate with each other through a relay device. The directly connected sidelink may be referred to as a direct link. The link through which the two terminal devices communicate with each other through the relay device may be referred to as a relay link. For example, in FIG. 1, the relay link through which the first terminal device and the second terminal device communicate with each other through the relay device may include two links: a link between the first terminal device and the relay device, and a link between the relay device and the second terminal device.

Based on different link types of link switching, the following describes several possible scenarios of link switching by using the accompanying drawings.

Scenario 1: As shown in FIG. 2a, a link switching manner is switching from a relay link to a relay link.

The first terminal device and the second terminal device communicate with each other through a first relay device. A link between the first terminal device and the first relay device may be referred to as a first source communication link, and a link between the second terminal device and the first relay device may be referred to as a second source communication link. Link switching is switching from the source communication link to a destination communication link. A switched relay device or a relay device to be switched to is denoted as a second relay device. A link between the first terminal device and the second relay device may be referred to as a first destination communication link, and a link between the second terminal device and the second relay device may be referred to as a second destination communication link. The destination communication link may include a first destination communication link and a second destination communication link.

Figure 2B:
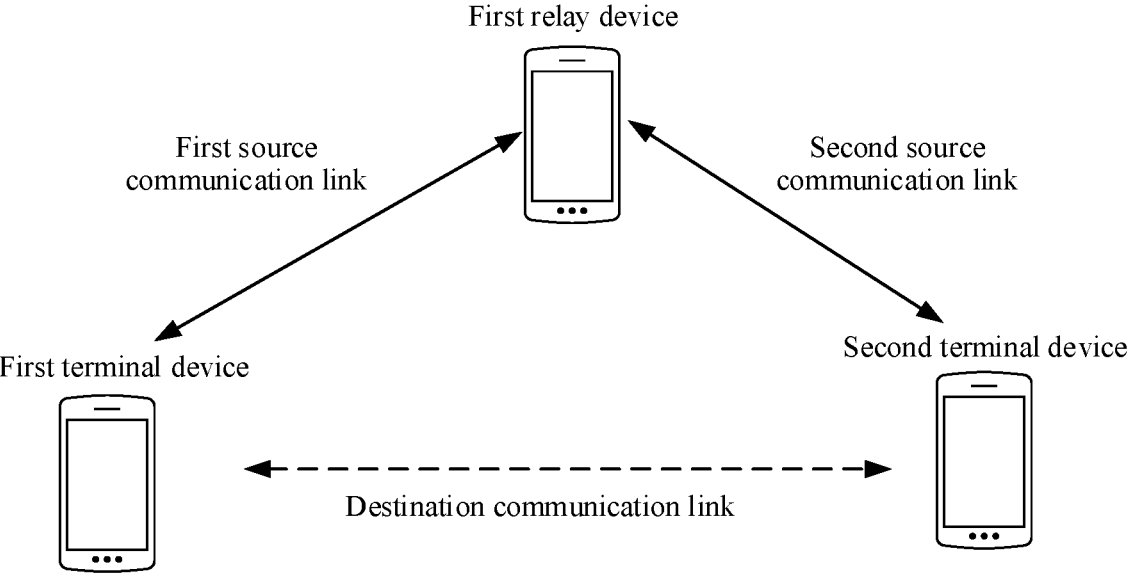
FIG. 2*b* is a second schematic diagram of link switching according to an embodiment of this application.

Scenario 2: As shown in FIG. 2b, a link switching manner is switching from a relay link to a direct link.

The first terminal device and the second terminal device communicate with each other through a first relay device. A link between the first terminal device and the first relay device may be referred to as a first source communication link, and a link between the second terminal device and the first relay device may be referred to as a second source communication link. Link switching is switching from the source communication link to a destination communication link. The destination communication link is a communication link through which the first terminal device is directly connected to the second terminal device.

Figure 2C:
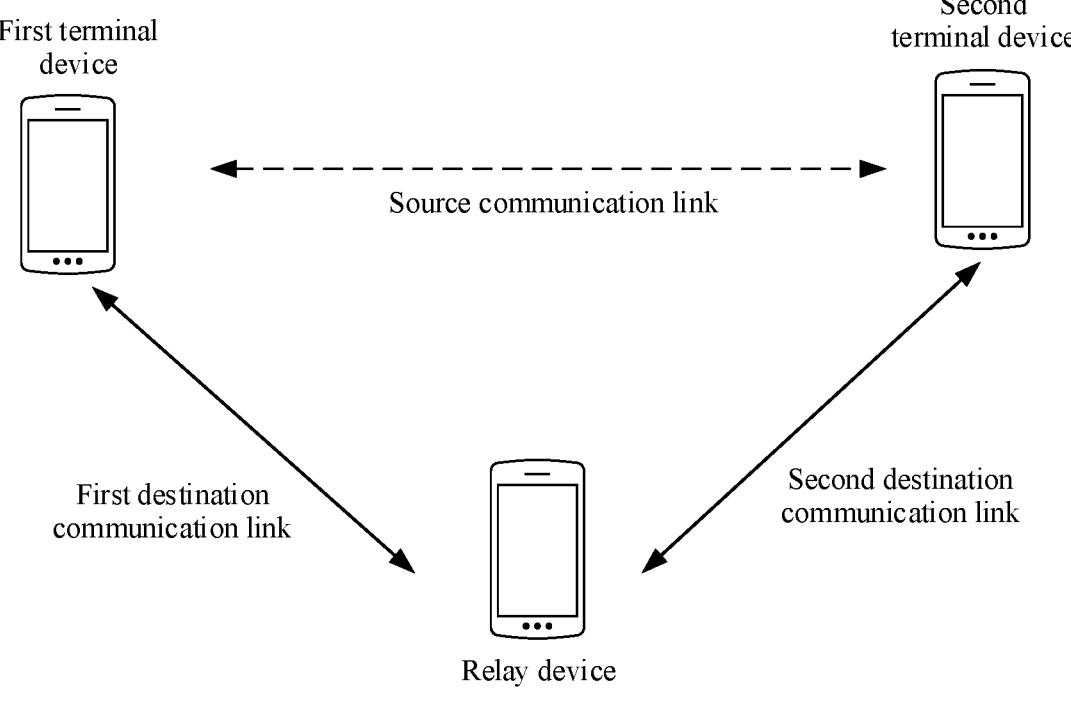
FIG. 2*c* is a third schematic diagram of link switching according to an embodiment of this application.

Scenario 3: As shown in FIG. 2c, a link switching manner is switching from a direct link to a relay link.

The first terminal device and the second terminal device communicate with each other through a direct link, and the direct link between the first terminal device and the second terminal device is a source communication link. Link switching is switching from the source communication link to a destination communication link. The destination communication link is a relay link. A switched relay device or a relay device to be switched to is denoted as a third relay device. A link between the first terminal device and the third relay device may be referred to as a first destination communication link, and a link between the second terminal device and the third relay device may be referred to as a second destination communication link. The destination communication link may include the first destination communication link and the second destination communication link.

In embodiments of this application, when the first terminal device and the second terminal device communicate with each other through the relay device, the relay device may transparently forward data; or may parse data, re-encapsulate the data and transmit the re-encapsulated data. Embodiments of this application are applicable to U2U relay communication based on L2 relay forwarding, and are further applicable to U2U relay communication based on L3 relay forwarding.

When either or both of the two terminal devices moves/move, quality of the link between the two terminal devices may deteriorate. In embodiments of this application, communication quality between the two terminals is improved through link switching. The method provided in embodiments of this application is applicable to the foregoing several link switching scenarios.

The following describes in detail the method provided in embodiments of this application with reference to the accompanying drawings.

It should be noted that embodiments of this application relate to comparison between two values. When A is greater than B, it may be equivalently replaced with a description that A is greater than or equal to B. Similarly, when A is less than B, it may be equivalently replaced with a description that A is less than or equal to B. A corresponding offset value may be added to any side of the inequality. For example, A>B may be equivalently replaced with A+Offset value greater than B, or may be equivalently replaced with A>B+ Offset value. The offset value may be positive or negative. In embodiments of this application, descriptions of a plurality of thresholds are designed, and are described by using a first threshold, a second threshold, . . . . It may be understood that values of different thresholds may be the same or may be different.

Figure 3:
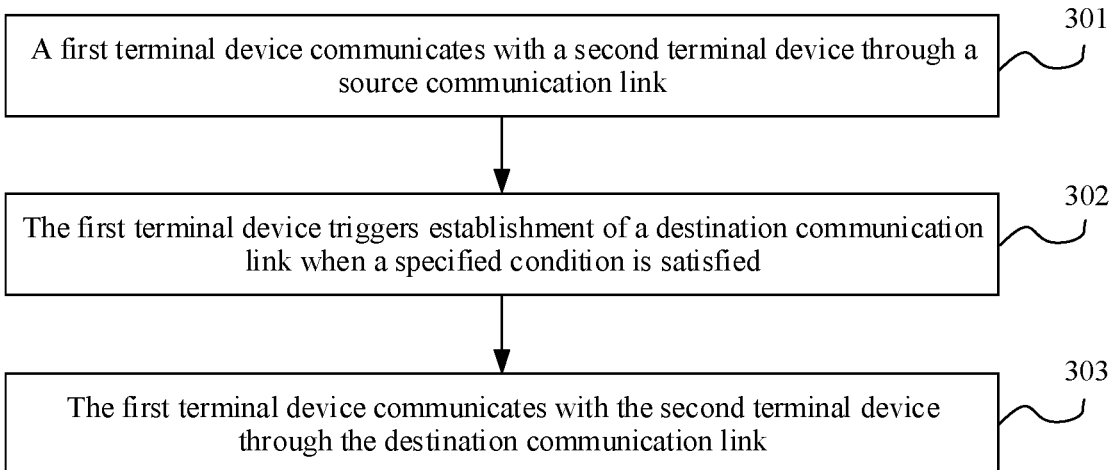
FIG. 3 is a first schematic flowchart of a link switching method in sidelink communication according to an embodiment of this application.

As shown in FIG. 3, a procedure of a link switching method in sidelink communication according to an embodiment of this application is described as follows:

S301. A first terminal device communicates with a second terminal device through a source communication link.

S302. The first terminal device triggers establishment of a destination communication link when a specified condition is satisfied.

The specified condition is associated with channel quality of the source communication link, or the specified condition is associated with channel quality of the destination communication link, or the specified condition is associated with the channel quality of the source communication link and the channel quality of the destination communication link.

Optionally, after the first terminal device triggers the establishment of the destination communication link, S303 may be further performed optionally.

S303. The first terminal device communicates with the second terminal device through the destination communication link.

In this way, link switching can be triggered in time by using the channel quality of the link between the two terminal devices, so that the destination communication link with better channel quality can be switched to, and communication quality between the two terminals is improved through the link switching.

Based on the embodiment in FIG. 3, the following separately describes the procedure of the link switching method in sidelink communication in different link switching scenarios.

Figure 4:
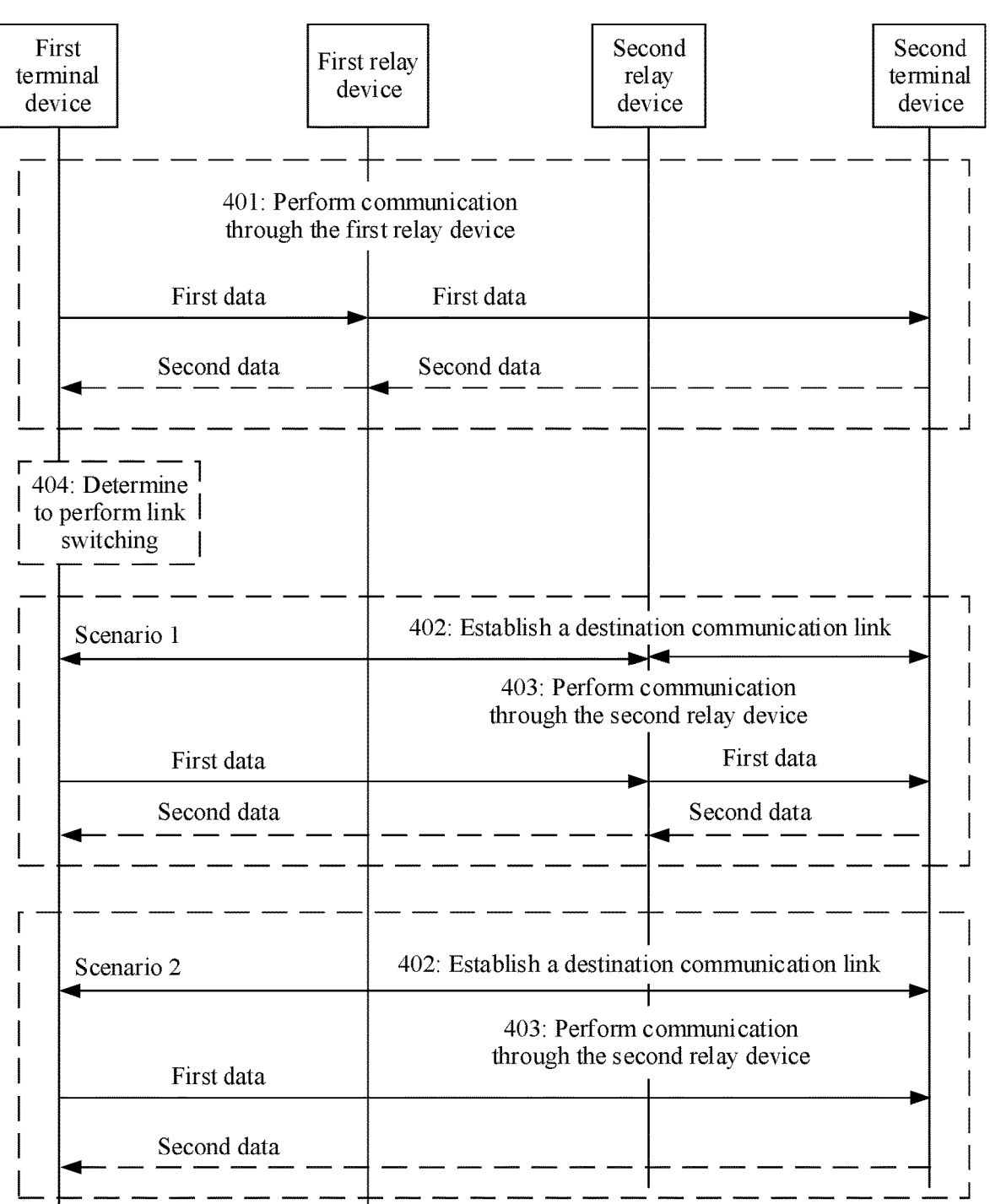
FIG. 4 is a first schematic flowchart of a link switching method in sidelink communication in a scenario 1 and a scenario 2 according to an embodiment of this application.

As shown in FIG. 4, in the foregoing scenario 1 or scenario 2, a procedure of a link switching method in sidelink communication is described as follows:

S401. A first terminal device communicates with a second terminal device through a first relay device.

The sidelink communication may include one of two communication directions, or the two communication directions may coexist. The two communication directions are as follows:

(1) The first terminal device sends data to the second terminal device. The first terminal device sends first data to the first relay device through a first source communication link, the first relay device receives the first data from the first terminal device through the first source communication link, and the first relay device forwards the first data to the second terminal device through a second source communication link.

(2) The second terminal device sends data to the first terminal device. The second terminal device sends second data to the first relay device through the second source communication link, the first relay device receives the second data from the second terminal device through the second source communication link, and the first relay device forwards the second data to the first terminal device through the first source communication link.

S402. The first terminal device establishes a destination communication link when a specified condition is satisfied.

It may also be understood that, when the specified condition is satisfied, the first terminal device triggers the establishment of the destination communication link or triggers sending of a corresponding unicast connection establishment request (direct communication request) message.

In the scenario 1, the destination communication link includes a first destination communication link and a second destination communication link. The first destination communication link is a link between the first terminal device and a second relay device, and the second destination communication link is a link between the second terminal device and the second relay device.

In the scenario 2, the destination communication link is a link through which the first terminal device is directly connected to the second terminal device.

Optionally, after the destination communication link is established, the method may further include S403.

S403. The first terminal device communicates with the second terminal device through the destination communication link.

In the scenario 1, the first terminal device communicates with the second terminal device through the second relay device. Similar to S401, the sidelink communication may include one of two communication directions, or the two communication directions may coexist. The two communication directions are as follows: (1) The first terminal device sends data to the second terminal device. The first terminal device sends first data to the second relay device through the first destination communication link, the second relay device receives the first data from the first terminal device through the first destination communication link, and the second relay device forwards the first data to the second terminal device through the second destination communication link. (2) The second terminal device sends data to the first terminal device. The second terminal device sends second data to the second relay device through the second destination communication link, the second relay device receives the second data from the second terminal device through the second destination communication link, and the second relay device forwards the second data to the first terminal device through the first destination communication link.

In the scenario 2, the first terminal device communicates with the second terminal device through the direct link. Similar to S401, the sidelink communication may include one of two communication directions, or the two communication directions may coexist. The two communication directions are as follows: (1) The first terminal device sends first data to the second terminal device. (2) The second terminal device sends second data to the first terminal device.

The following describes some possible implementations in the embodiment in FIG. 4 by using examples.

First, how the first terminal device determines whether the specified condition is satisfied in the scenario 1 and the scenario 2 is separately described.

In the scenario 1, the specified condition is associated with channel quality of any one or more of the following: the first source communication link, the second source communication link, the first destination communication link, or the second destination communication link.

In the scenario 2, the specified condition is associated with channel quality of any one or more of the following: the first source communication link, the second source communication link, or the destination communication link.

In this embodiment of this application, the channel quality of the communication link may be represented by using a result of measuring a signal by another terminal device when one terminal device transmits a signal to the another terminal device through the communication link. The signal may be a reference signal, or may be any broadcast signal or unicast signal, or may be data.

The channel quality of the communication link may be represented by using any one or more of the following parameters: a signal received power, signal to interference plus noise ratio (SINR), signal received quality (RQ), or a signal-received signal strength (RSSI).

If the signal is referred to as a reference signal, the channel quality of the communication link may be represented by using any one or more of the following parameters: a reference signal received power (RSRP), a reference signal-signal to interference plus noise ratio (reference signal signal-to-noise and interference ratio, RS-SINR), reference signal received quality (RSRQ), or a reference signal-received signal strength (RS-RSSI).

In the scenario 1, the specified condition may include any one or more of the following: the channel quality of the first source communication link is less than a first threshold; the channel quality of the second source communication link is less than a second threshold; a sum of the channel quality of the first source communication link and the channel quality of the second source communication link is less than a third threshold; the channel quality of the first destination communication link is greater than a fourth threshold; the channel quality of the first source communication link is less than the channel quality of the first destination communication link; the channel quality of the second destination communication link is greater than a fifth threshold; the channel quality of the second source communication link is less than the channel quality of the second destination communication link; or a sum of the channel quality of the first source communication link and the channel quality of the second source communication link is less than a sum of the channel quality of the first destination communication link and the channel quality of the second destination communication link.

It may also be described as follows: In the scenario 1, the specified condition may include any one or more of the following: the channel quality of the first source communication link is less than or equal to the first threshold; the channel quality of the second source communication link is less than or equal to the second threshold; the sum of the channel quality of the first source communication link and the channel quality of the second source communication link is less than or equal to the third threshold; the channel quality of the first destination communication link is greater than or equal to the fourth threshold; the channel quality of the first source communication link is less than or equal to the channel quality of the first destination communication link; the channel quality of the second destination communication link is greater than or equal to the fifth threshold; the channel quality of the second source communication link is less than or equal to the channel quality of the second destination communication link; the sum of the channel quality of the first source communication link and the channel quality of the second source communication link is less than or equal to the sum of the channel quality of the first destination communication link and the channel quality of the second destination communication link; or the sum of the channel quality of the first destination communication link and the channel quality of the second destination communication link is greater than a sixth threshold.

In the scenario 2, the specified condition may include any one or more of the following: the channel quality of the first source communication link is less than a first threshold; the channel quality of the second source communication link is less than a second threshold; a sum of the channel quality of the first source communication link and the channel quality of the second source communication link is less than a third threshold; the channel quality of the destination communication link is greater than a sixth threshold; or a sum of the channel quality of the first source communication link and the channel quality of the second source communication link is less than the channel quality of the destination communication link. The sixth threshold in the scenario 2 may be the same as or different from the sixth threshold in the scenario 1.

It may also be described as follows: In the scenario 2, the specified condition may include any one or more of the following: the channel quality of the first source communication link is less than or equal to the first threshold; the channel quality of the second source communication link is less than or equal to the second threshold; the sum of the channel quality of the first source communication link and the channel quality of the second source communication link is less than or equal to the third threshold; the channel quality of the destination communication link is greater than or equal to the sixth threshold; or the sum of the channel quality of the first source communication link and the channel quality of the second source communication link is less than or equal to the channel quality of the destination communication link.

In this embodiment of this application, the specified condition may be configured by a network device of the first terminal device for the first terminal device. For example, the network device of the first terminal device configures the specified condition for the first terminal device by using a radio resource control (RRC) message, a system information block (SIB) message, or pre-configured information. Alternatively, the specified condition may be pre-stored locally by the first terminal device, or may be pre-specified in a protocol. Alternatively, the specified condition may be configured by another terminal device for the first terminal device, for example, configured by the first relay device or the second terminal device for the first terminal device. For example, the another terminal may configure the specified condition for the first terminal by using a PC5-RRC message.

The foregoing describes possible specified conditions, where the possible specified conditions relate to the channel quality of the source link and the channel quality of the destination link. The following describes how the first terminal device obtains the channel quality of the source link and the channel quality of the destination link.

Optionally, before S402, the method may further include S404.

S404. The first terminal device determines to perform link switching.

In the scenario 1, a relay link is switched to a relay link. In this case, the link switching may also be understood as relay device reselection. S404 may also be described as follows: The first terminal device determines to perform relay device reselection.

The first terminal device determines, by determining whether the specified condition is satisfied, to perform link switching. When the specified condition is satisfied, the first terminal device determines to switch from the source communication link to the destination communication link.

The first terminal device needs to determine to make a link switching decision based on the channel quality of the link. The following separately uses examples to describe how the first terminal device obtains the channel quality of the link in the scenario 1 and the scenario 2.

Figure 5:
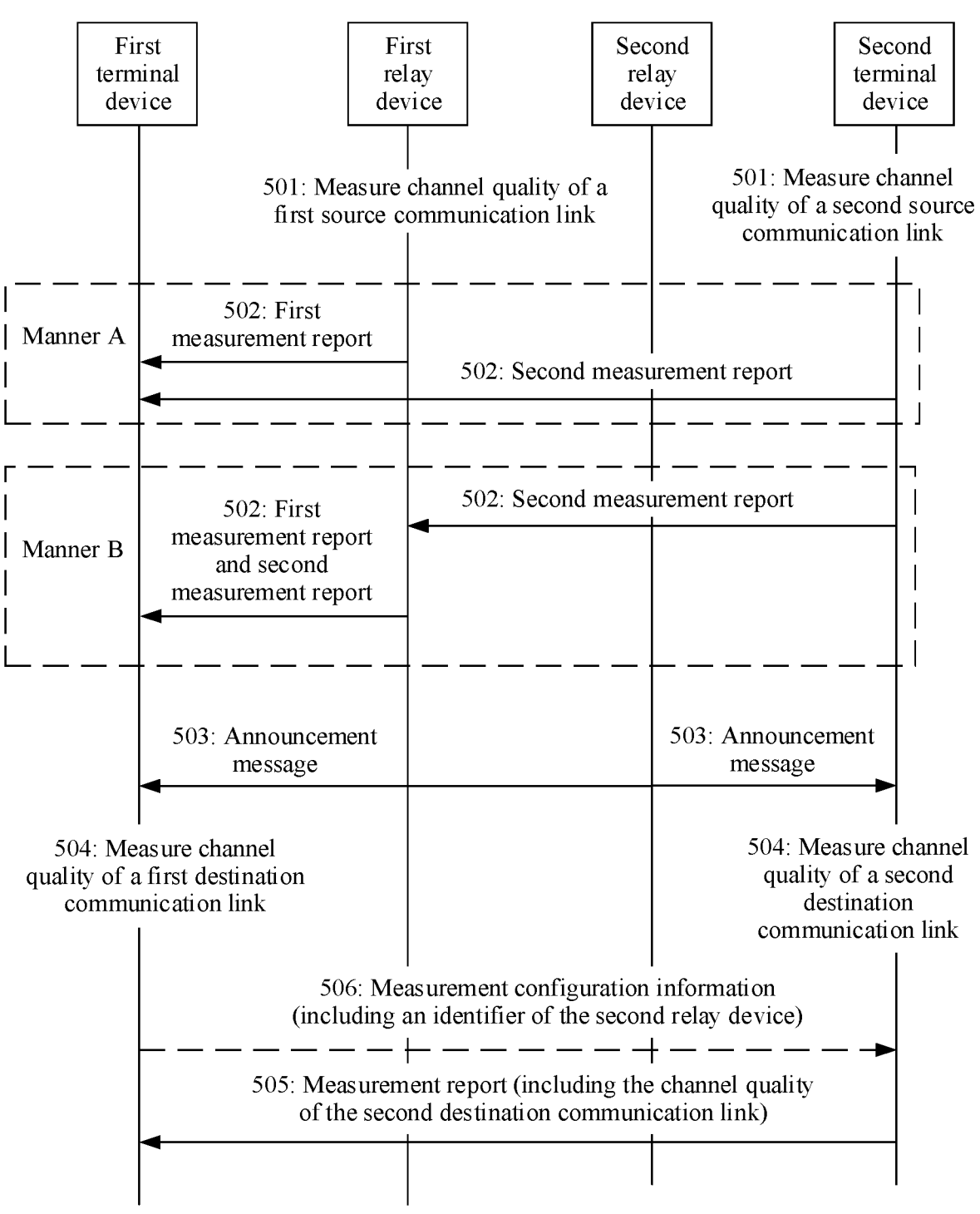
FIG. 5 is a first schematic flowchart of obtaining channel quality of a link in a scenario 1 according to an embodiment of this application.
Figure 6:
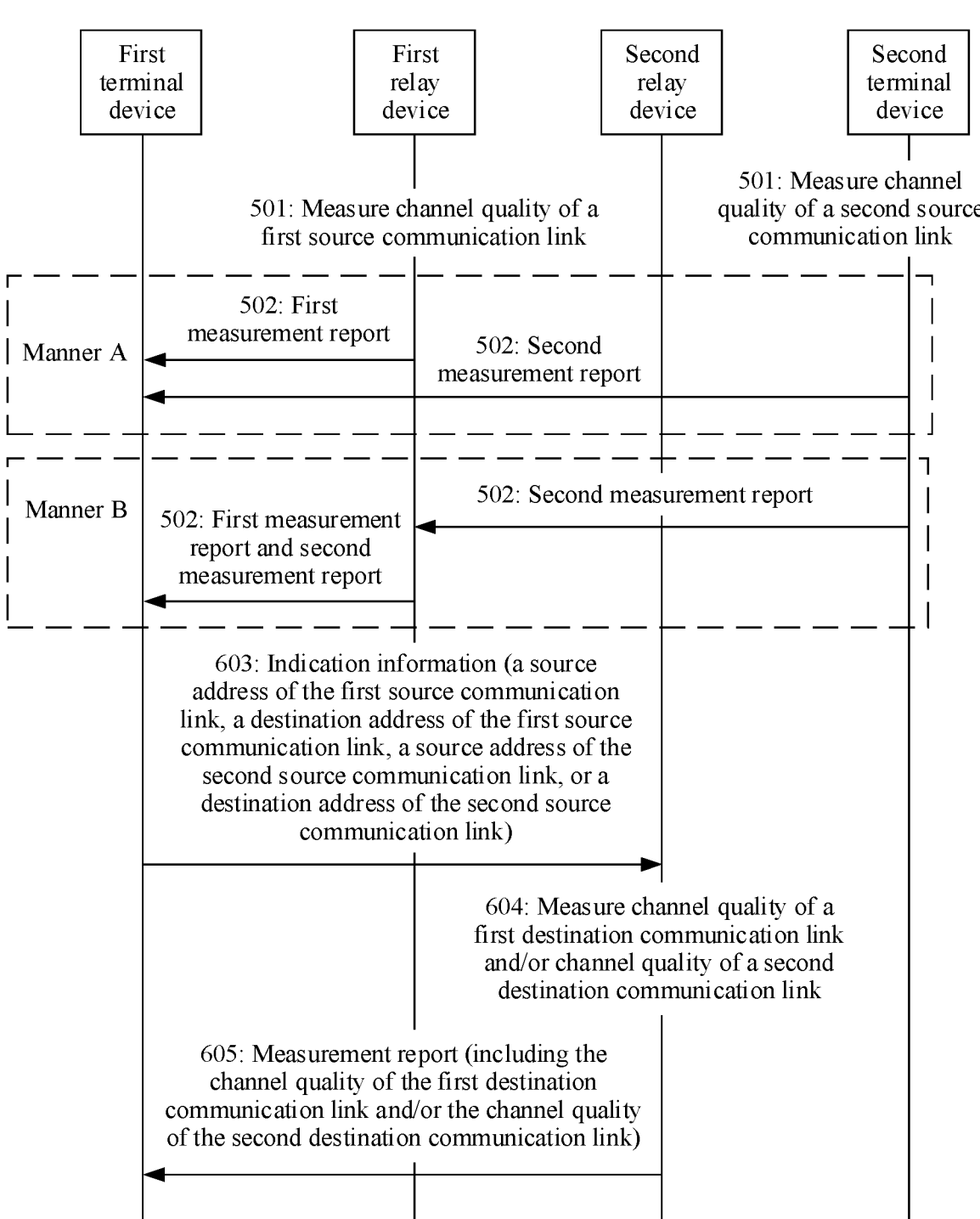
FIG. 6 is a second schematic flowchart of obtaining channel quality of a link in a scenario 1 according to an embodiment of this application.
Figure 7:
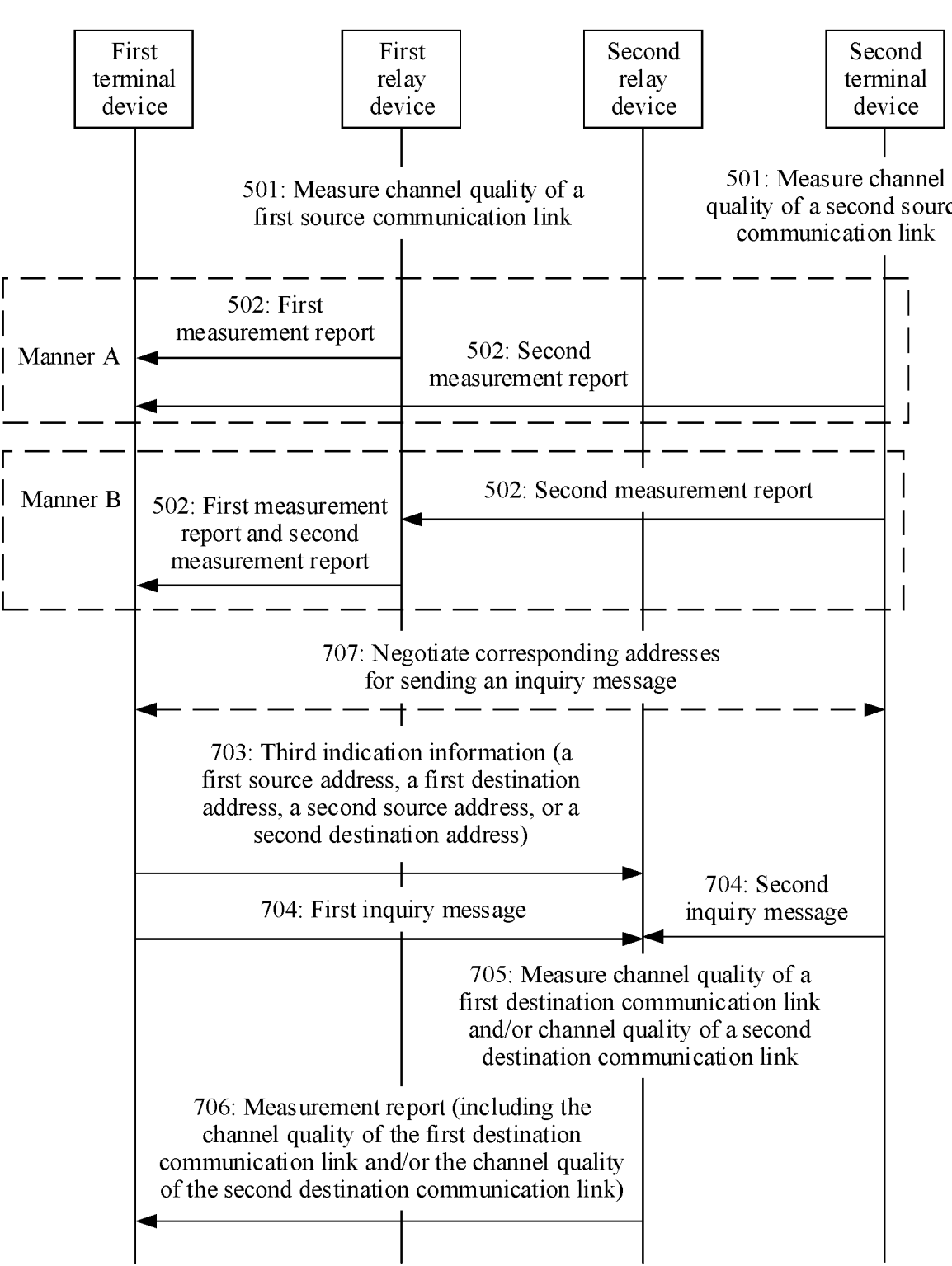
FIG. 7 is a third schematic flowchart of obtaining channel quality of a link in a scenario 1 according to an embodiment of this application.

The following uses FIG. 5 to FIG. 7 as examples to describe how the first terminal device obtains the channel quality of the link in the scenario 1.

S501. The first relay device measures the channel quality of the first source communication link, and the second terminal device measures the channel quality of the second source communication link.

The first relay device may obtain a measurement result of a reference signal based on the reference signal received from the first terminal device, to obtain the channel quality of the first source communication link. For example, the first relay device measures a demodulation reference signal (DMRS) of a PC5-radio resource control (RRC) connection corresponding to the first terminal device, to obtain an RSRP of the DMRS, where the RSRP is the channel quality of the first source communication link.

The second terminal device may obtain a measurement result of a reference signal based on the reference signal received from the first relay device, to obtain the channel quality of the second source communication link. For example, the second terminal device measures a DMRS of a PC5-RRC connection corresponding to the first relay device, to obtain an RSRP of the DMRS, where the RSRP is the channel quality of the second source communication link.

The first relay device may measure the channel quality of the first source communication link based on an SL measurement configuration of the first terminal device. The second terminal device may measure the channel quality of the second source communication link based on the SL measurement configuration of the first terminal device, or an SL measurement configuration of the first relay device.

Optionally, the first relay device may also measure the channel quality of the second source communication link. The first relay device may obtain a measurement result of a reference signal based on the reference signal received from the second terminal device, to obtain the channel quality of the second source communication link. For example, the first relay device measures a DMRS of a PC5-RRC connection corresponding to the second terminal device, to obtain an RSRP of the DMRS, where the RSRP is the channel quality of the second source communication link. The first relay device may measure the channel quality of the second source communication link based on an SL measurement configuration of the second terminal device.

S502. The first relay device and the second terminal device send measurement reports to the first terminal device.

S502 may be implemented in two manners: a manner A and a manner B.

Manner A: The first relay device sends a first measurement report to the first terminal device, and the second terminal device sends a second measurement report to the first terminal device.

It should be noted that the second terminal device communicates with the first terminal device through the first relay device. Therefore, the second terminal device sends the second measurement report to the first relay device, and the first relay device forwards the second measurement report to the first terminal device. Herein, it is equivalent to that the first relay device transparently transmits the second measurement report, to be specific, forwards the second measurement report without sensing the second measurement report.

Manner B: The second terminal device sends the second measurement report to the first relay device, and the first relay device sends, to the first terminal device, a message including a first measurement report and a second measurement report.

After receiving the second measurement report of the second terminal device, the first relay device parses the second measurement report, re-encapsulates the second measurement report and the first measurement report, and sends the re-encapsulated second measurement report and the first measurement report to the first terminal device.

The first measurement report carries the channel quality of the first source communication link, for example, the RSRP of the DMRS of the PC5-RRC connection corresponding to the first relay device and the first terminal device. The second measurement report carries the channel quality of the second source communication link, for example, the RSRP of the DMRS of the PC5-RRC connection corresponding to the first relay device and the second terminal device.

The first relay device and the second terminal device may send the measurement reports to the first terminal device based on the following several trigger manners. The trigger manners are applicable to both the manner A and the manner B.

Trigger manner 1: When a reporting condition is satisfied, sending of the measurement report is triggered. A reporting condition of the first relay device may be that the channel quality of the first source communication link is less than a threshold, for example, the first threshold. A reporting condition of the second terminal device may be that the channel quality of the second source communication link is less than a threshold, for example, the second threshold. The reporting condition of the first relay device may be configured by the first terminal device for the first relay device. The reporting condition of the second terminal device may be configured by the first terminal device, or may be configured by the first relay device.

Trigger manner 2: The measurement report is periodically sent. A periodicity in which the first relay device sends the first measurement report may be configured by the first terminal device for the first relay device. A periodicity in which the second terminal device sends the second measurement report may be configured by the first terminal device, or may be configured by the first relay device.

Trigger manner 3: After the first terminal device sends a request message to the first relay device, the first relay device sends the first measurement report to the first terminal device. Similarly, after the first terminal device sends a request message to the second terminal device, the second terminal device sends the second measurement report to the first terminal device. After the first relay device sends a request message to the second terminal device, the second terminal device sends the second measurement report to the first relay device.

The first relay device and the second terminal device may be triggered to report the measurement reports in a same manner or different manners.

In the manner B, the trigger manner for the first relay device to send the measurement report may alternatively be: The first relay device determines that the sum of the channel quality of the first source communication link and the channel quality of the second source communication link is less than a threshold, for example, the third threshold. The first relay device receives the second measurement report from the second terminal device, obtains the channel quality of the second source communication link in the second measurement report, and combines the channel quality of the second source communication link with the channel quality that is of the first source communication link and that is measured by the first relay device. When the sum of the channel quality of the first source communication link and the channel quality of the second source communication link is less than the third threshold, the first relay device reports a message including the first measurement report and the second measurement report to the first terminal device.

S501 and S502 are steps in which the first terminal device obtains the channel quality of the first source communication link and the channel quality of the second source communication link. The following describes a possible manner in which the first terminal device obtains the channel quality of the destination communication link.

In the scenario 1, the destination communication link includes the first destination communication link and the second destination communication link. The following describes a first possible manner in which the first terminal device obtains the channel quality of the destination communication link in the scenario 1 by using S503 to S506.

Because the first terminal device and the second terminal device do not establish unicast connections to the second relay device, there is no actually established link between the first terminal device and the second relay device, and there is no established link between the second terminal device and the second relay device. Therefore, before link switching, the first destination communication link is actually signal transmission quality between the first terminal device and the first relay device, and the second destination communication link is actually signal transmission quality between the second terminal device and the first relay device.

The second relay device broadcasts a discovery message or an announcement message to a surrounding terminal device. The announcement message is used as an example, and the announcement message indicates that the second relay device has a relay capability. The announcement message may be sent to the surrounding terminal device through a PC5-S interface. The surrounding terminal device determines, by receiving the announcement message, that the second relay device has the relay capability.

S503. The first terminal device receives the announcement message from the second relay device, and the second terminal device receives the announcement message from the second relay device.

The announcement message indicates that the second relay device has the relay capability, or is used by another terminal device to discover the second relay device. The announcement message may indicate an address of the second relay device, for example, a Layer 2 (L2) address.

S504. The first terminal device determines the channel quality of the first destination communication link based on signal quality of the announcement message from the second relay device. The second terminal device determines the channel quality of the second destination communication link based on signal quality of the announcement message from the second relay device.

In this case, the first terminal device and the second terminal device do not establish the unicast connections to the second relay device. The first destination communication link and the second destination communication link herein are logical concepts, and are not actually established links.

S505. The second terminal device sends a measurement report to the first terminal device, and the first terminal device receives the measurement report from the second terminal device.

The measurement report includes the channel quality that is of the second destination communication link and that is obtained by the second terminal device.

It may be understood that there may be more than one second relay device around the first terminal device and the second terminal device, and the first terminal device and the second terminal device may further receive announcement messages of a plurality of second relay devices.

Optionally, before S505, S506 may be further performed. S506 may be performed after the first terminal device measures the announcement message of the second relay device.

S506. The first terminal device sends measurement configuration information to the second terminal device, and the second terminal device receives the measurement configuration information from the first terminal device.

The measurement configuration information includes one or more of the following information: an identifier of the second relay device, a cell identifier of the second relay device, or information about a carrier on which the second relay device works. The identifier of the second relay device may be an L2 ID used by the second relay device to send the announcement message. The first terminal device may indicate, to the second terminal device by using the measurement configuration information, an announcement message of one or more second relay devices to be measured. In this way, power consumption of measuring the announcement message of the second relay device by the second terminal device can be reduced. In addition, this can further help ensure that the first terminal device and the second terminal device measure the same second relay device, so as to help determine a link to be switched to or determine reselection of the second relay device.

The first terminal device may send the measurement configuration information to the second terminal device by using an end-to-end PC5-RRC message.

Optionally, the first terminal device sends the measurement configuration information to the second terminal device when a specific condition is satisfied. For example, the specific condition herein may be any one or more of the following: the channel quality of the first source communication link is less than a threshold, for example, the first threshold; the channel quality of the first destination communication link is greater than a threshold, for example, the fifth threshold; or the channel quality of the first source communication link is less than the channel quality of the first destination communication link.

The measurement configuration information in S506 may further include a measurement event, and the measurement event includes that the second terminal device sends a measurement report when a reporting condition is satisfied. The reporting condition may be one or more of the following: the channel quality of the second source communication link is less than a threshold, for example, the second threshold; the channel quality of the second destination communication link is greater than a threshold, for example, the fifth threshold; or the channel quality of the second source communication link is less than the channel quality of the second destination communication link.

For a trigger manner in which the second terminal device sends the measurement report to the first terminal device in S505, refer to the foregoing trigger manner 1 to trigger manner 3. Similar to the trigger manner 1, the second terminal device triggers sending of the measurement report when a specific reporting condition is satisfied. The reporting condition may be carried in the measurement configuration information in S506. Similar to the trigger manner 2, the second terminal device may periodically send the measurement report. Periodicity information may be carried in the measurement configuration information in S506. Similar to the trigger manner 3, after the first terminal device sends a request message to the second terminal device, the second terminal device sends the measurement report to the first terminal device.

S501 and S502 are steps in which the first terminal device obtains the channel quality of the first source communication link and the channel quality of the second source communication link, and S503 to S506 are a possible manner in which the first terminal device obtains the channel quality of the first destination communication link and the channel quality of the second destination communication link in the scenario 1. Execution sequences of S501 and S502 and S503 to S506 may be exchanged, or S501 and S502 and S503 to S506 may be simultaneously performed.

In an optional manner of obtaining the channel quality of the destination communication link, as shown in FIG. 6, the following describes a second possible manner in which the first terminal device obtains the channel quality of the destination communication link in the scenario 1. In this manner, the first terminal device indicates the second relay device to measure the channel quality of the destination communication link.

S501 and S502 are described above. On this basis, the method further includes the following steps.

S603. The first terminal device sends indication information to the second relay device, and the second relay device receives the indication information from the first terminal device.

The indication information may be denoted as second indication information. The second indication information indicates one or more of the following information: a source address of the first source communication link, a destination address of the first source communication link, a source address of the second source communication link, or a destination address of the second source communication link. The source address of the first source communication link herein may be an L2 ID of the first terminal device, and the destination address of the first source communication link may be an L2 ID of the first relay device. The source address of the second source communication link may be the L2 ID of the first relay device, and the destination address of the second source communication link may be an L2 ID of the second terminal device.

The second indication information is used by the second relay device to measure the channel quality of the first destination communication link and/or the channel quality of the second destination communication link.

S604. The second relay device may measure, based on second indication information, first data sent by the first terminal device to the first relay device through the first source communication link, to obtain the channel quality of the first destination communication link. The second relay device may measure, based on the second indication information, second data sent by the second terminal device to the first relay device through the second source communication link, to obtain the channel quality of the second destination communication link.

Optionally, because data transmission between the first terminal device and the second terminal device may be mutual, the second terminal device may also send the second data to the first terminal device. In this case, the source address that is of the second source communication link and that is indicated by the second indication information may be the L2 ID of the second terminal device, and the destination address of the second source communication link may be the L2 ID of the first relay device. The second relay device may measure, based on the second indication information, the second data sent by the second terminal device to the first relay device through the second source communication link, to obtain the channel quality of the second destination communication link.

Alternatively, the second terminal may send indication information to the second relay device, to indicate one or more of the source address of the first source communication link, the destination address of the first source communication link, the source address of the second source communication link, or the destination address of the second source communication link. The second relay device measures, based on the indication information of the second terminal device, the second data sent by the second terminal device to the first relay device through the second source communication link, to obtain the channel quality of the second destination communication link. The second relay device may further measure the first data sent by the first terminal device to the second terminal device through the first source communication link, to obtain the channel quality of the first destination communication link.

S605. The second relay device sends a measurement report to the first terminal device, and the first terminal device receives the measurement report from the second relay device. The measurement report includes the channel quality of the first destination communication link and/or the channel quality of the second destination communication link.

For a trigger manner in which the second relay device sends the measurement report, refer to any one of the foregoing trigger manner 1 to trigger manner 3. That is, reporting of the measurement report may be triggered when a reporting condition is satisfied. The reporting condition may be based on a comparison between the first destination communication link and a threshold value, or may be a comparison between the second destination communication link and a threshold value. The measurement report may be periodically reported, and information about a periodicity may be carried in the second indication information. Reporting may be triggered based on the second indication information, to be specific, measurement and reporting may be performed after the second indication information is received.

S501 and S502 are steps in which the first terminal device obtains the channel quality of the first source communication link and the channel quality of the second source communication link, and S603 to S605 are a second possible manner in which the first terminal device obtains the channel quality of the first destination communication link and the channel quality of the second destination communication link in the scenario 1. Execution sequences of S501 and S502 and S603 to S605 may be exchanged, or S501 and S502 and S603 to S605 may be simultaneously performed.

In an optional manner of obtaining the channel quality of the destination communication link, as shown in FIG. 7, the following describes a third possible manner in which the first terminal device obtains the channel quality of the destination communication link in the scenario 1. In this manner, the first terminal device indicates the second relay device to measure the channel quality of the destination communication link.

In sidelink communication, a discovery manner of a terminal device is: The terminal device sends an inquiry message to a surrounding terminal, where the inquiry message is used to inquire whether there is a relay terminal device around. If a relay terminal device receives the inquiry message, the relay terminal device returns an acknowledgment message to the terminal device, to indicate that the relay terminal device can provide a relay function. The second relay device may measure the channel quality of the destination link based on an inquiry message of the first terminal device or the second terminal device.

S501 and S502 are described above. On this basis, the method further includes the following steps.

S703. The first terminal device sends indication information to the second relay device, and the second relay device receives the indication information from the first terminal device. The indication information may be denoted as third indication information.

Optionally, the third indication information indicates a first source address and/or a first destination address, where the first source address is a source address used by the first terminal device to send a first inquiry message, and the first destination address is a destination address used by the first terminal device to send the first inquiry message. The third indication information is used by the second relay device to measure the channel quality of the first destination communication link.

The third indication information may alternatively indicate a second source address and/or a second destination address. The second source address is a source address used by the second terminal device to send a second inquiry message, and the second destination address is a destination address used by the second terminal device to send the second inquiry message. The third indication information is used by the second relay device to measure the channel quality of the second destination communication link.

S704. The second relay device receives the first inquiry message from the first terminal device. The second relay device receives the second inquiry message from the second terminal device.

The second relay device may receive the first inquiry message or the second inquiry message, or may receive both the first inquiry message and the second inquiry message.

S705. The second relay device may determine the channel quality of the first destination communication link based on signal quality of the first inquiry message.

The second relay device may determine the channel quality of the second destination communication link based on signal quality of the second inquiry message.

S706. The second relay device sends a measurement report to the first terminal device, and the first terminal device receives the measurement report from the second relay device.

The measurement report carries the channel quality of the first destination communication link, and may further carry the channel quality of the second destination communication link.

For a trigger manner in which the second relay device sends the measurement report, refer to any one of the foregoing trigger manner 1 to trigger manner 3. That is, reporting of the measurement report may be triggered when a reporting condition is satisfied. The reporting condition may be based on a comparison between the first destination communication link and a threshold value, or may be a comparison between the second destination communication link and a threshold value. The measurement report may be periodically reported, and information about a periodicity may be carried in the third indication information. Reporting may be triggered based on the third indication information, to be specific, measurement and reporting may be performed after the third indication information is received.

Optionally, before S703, the method may further include S707.

S707. The first terminal device negotiates with the second terminal device for corresponding addresses for sending the inquiry message.

For example, the second terminal device may send the second source address and the second destination address to the first terminal device. The second source address is the source address used by the second terminal device to send the second inquiry message, and the second destination address is the destination address used by the second terminal device to send the second inquiry message.

After obtaining the second source address and the second destination address, the first terminal device sends the third indication information to the second relay device.

Alternatively, the first terminal device may first send the first source address and the first destination address to the second terminal device, where the first source address is the source address used by the first terminal device to send the first inquiry message, and the first destination address is the destination address used by the first terminal device to send the first inquiry message. The second terminal device determines, based on the first destination address, the destination address to which the second inquiry message is to be sent. In this way, the corresponding addresses for sending the inquiry message are successfully negotiated.

S501 and S502 are steps in which the first terminal device obtains the channel quality of the first source communication link and the channel quality of the second source communication link, and S703 to S707 are a third possible manner in which the first terminal device obtains the channel quality of the first destination communication link and the channel quality of the second destination communication link in the scenario 1. Execution sequences of S501 and S502 and S703 to S707 may be exchanged, or S501 and S502 and S703 to S707 may be simultaneously performed.

It should be noted that, regardless of whether the first terminal device sends the second indication information to the second relay device in S603 or the first terminal device sends the third indication information to the second relay device in S703, the following sending occasion may exist.

The second indication information or the third indication information may be sent before the first terminal device establishes the unicast connection to the second relay device. For example, before establishing the unicast connection to the second relay device, the first terminal device sends an inquiry message, a discovery message, or an announcement message, and may include the second indication information or the third indication information in the inquiry message, the discovery message, or the announcement message.

Alternatively, the second indication information or the third indication information may be sent during the establishment of the unicast connection between the first terminal device and the second relay device. For example, during the establishment of the unicast connection between the first terminal device and the second relay device, the first terminal device sends a unicast connection establishment request message to the second relay device, and includes the second indication information or the third indication information in the unicast connection establishment request message.

Alternatively, the second indication information or the third indication information may be sent after the first terminal device establishes the unicast connection to the second relay device. After the first terminal device establishes the unicast connection to the second relay device, the first terminal device includes the second indication information or the third indication information in a PC5-S message. Alternatively, the first terminal device includes the second indication information or the third indication information in a PC5-RRC message.

The embodiments in FIG. 5, FIG. 6, and FIG. 7 separately describe, by using the examples, how to obtain the channel quality of the communication link, including the first source communication link, the second source communication link, the first destination communication link, and the second destination communication link. The channel quality of the foregoing links is separately obtained based on different steps. It may be understood that, in the scenario 1, when the specified condition relates to channel quality of some communication links, some corresponding steps in the embodiments in FIG. 5, FIG. 6, and FIG. 7 may be selected to be performed, to obtain the channel quality of the some communication links related to the specified condition.

In the scenario 2, the destination communication link is a link through which the first terminal device is directly connected to the second terminal device. The following uses FIG. 8 as an example to describe how the first terminal device obtains the channel quality of the link in the scenario 2.

In the scenario 2, processes of measuring the channel quality of the first source communication link and the channel quality of the second source communication link are the same as those in the embodiment in FIG. 5.

S801 is the same as S501.

S802 is the same as S502.

S803. The second terminal device sends second data to the first relay device.

S804. The first terminal device receives the second data from the second terminal device.

S805. The first terminal device determines the channel quality of the destination communication link based on the second data received from the second terminal device.

Because the first terminal device communicates with the second terminal device through the first relay device, when the second terminal device sends the second data to the first terminal device through the first relay device, the first terminal device may receive the data sent by the second terminal device to the first relay device, to obtain the channel quality of the destination communication link through which the first terminal device is directly connected to the second terminal device.

The first terminal device needs to learn of a source address and/or a destination address used when the second terminal device sends the second data to the first relay device, and listens, based on the source address and/or the destination address, to the second data sent by the first terminal device to the first relay device. Optionally, before S804, the method further includes S806. The first terminal device obtains, by using S806, the source address and/or the destination address for listening to the second data.

S806. The second terminal device sends a discovery message, and the first terminal device receives the discovery message from the second terminal device.

The discovery message carries the source address and/or the destination address that are/is used by the second terminal device to send the second data to the first relay device. The source address may be an L2 ID of the second terminal device, and the destination address may be an L2 ID of the first relay device. The discovery message is used by the second terminal device to be discovered by a surrounding terminal device, or is used by the second terminal device to discover a surrounding terminal device. The discovery message may be an announcement message, and notifies a surrounding terminal device that the second terminal device has a relay capability. Alternatively, the discovery message may be an inquiry message, and is used to inquire whether there is a relay device around.

Certainly, the first terminal device may alternatively obtain, by using another message from the second terminal device, the source address and/or the destination address for listening to the second data.

An execution sequence of S803 and S805 is not limited, the sequence of S803 and S805 may be exchanged, or S803 and S805 may be simultaneously performed.

The first terminal device may determine, based on signal quality of the second data received from the second terminal device, the channel quality of the destination communication link. Optionally, the channel quality of the destination communication link may be determined based on a parameter such as an RSRP, RSRQ, an SINR, or an RSSI of the second data. The second data is data transmission data sent by the second terminal device to the first terminal device through the first relay device.

S803 to S806 are an implementation in which the first terminal device obtains the channel quality of the destination communication link. In an alternative implementation, the first terminal device may alternatively determine, by using other data or another signal received from the second terminal device, the channel quality of the destination communication link through which the second terminal device is directly connected to the first terminal device. For example, the first terminal device may receive the discovery message from the second terminal device, and determine the channel quality of the destination communication link based on signal quality of the discovery message. The discovery message described above may be an announcement message or an inquiry message.

S801 and S802 are steps in which the first terminal device obtains the channel quality of the first source communication link and the channel quality of the second source communication link, and S803 to S806 are a possible manner in which the first terminal device obtains the channel quality of the destination communication link in the scenario 2. Execution sequences of S801 and S802 and S803 to S806 may be exchanged, or S801 and S802 and S803 to S806 may be simultaneously performed.

Figure 8:
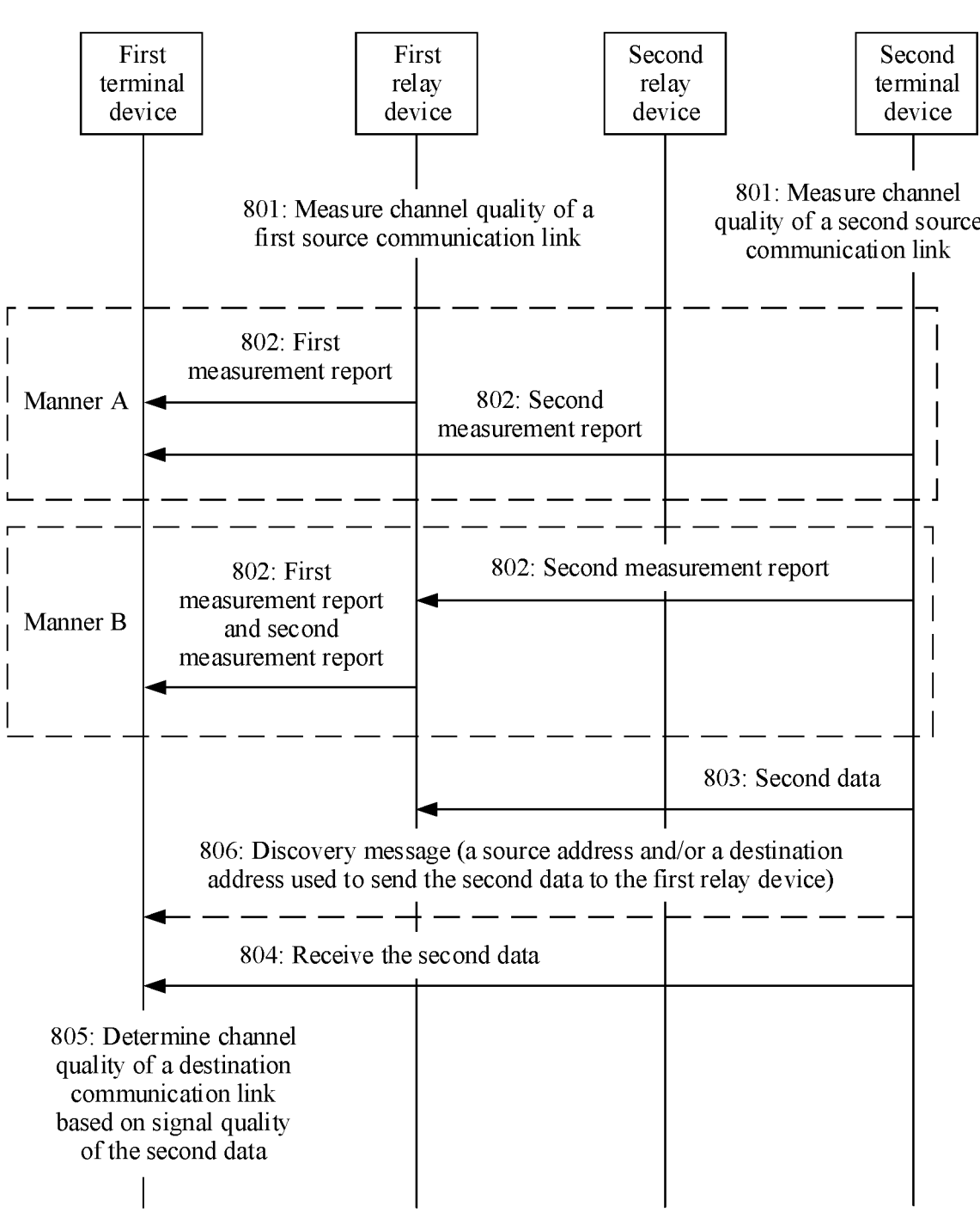
FIG. 8 is a schematic flowchart of obtaining channel quality of a link in a scenario 2 according to an embodiment of this application.

The embodiment in FIG. 8 describes, by using an example, how to obtain the channel quality of the communication link, including the first source communication link, the second source communication link, and the destination communication link. The channel quality of the foregoing links is separately obtained based on different steps. It may be understood that, in the scenario 2, when the specified condition relates to channel quality of some communication links, some corresponding steps in the embodiment in FIG. 8 may be selected to be performed, to obtain the channel quality of the some communication links related to the specified condition.

Till now, the embodiments in FIG. 5 to FIG. 8 are separately used as examples to describe the implementations in which the first terminal device obtains the channel quality of the communication link in the scenario 1 and the scenario 2. The obtained channel quality of the communication link is used to determine whether the specified condition is satisfied. When the specified condition is satisfied, the first terminal device determines to perform link switching.

The link switching may include two parts, one part is to establish the destination communication link, and the other part is to release the source communication link. The releasing of the source communication link is optional. In embodiments of this application, the source communication link may be retained, or the source communication link may be released. The following describes the two parts of the link switching.

A possible implementation of establishing the destination link is first described.

In the scenario 1, the destination communication link includes the first destination communication link and the second destination communication link. A process of establishing the destination communication link includes establishing the first destination communication link and establishing the second destination communication link.

Figures 9A, 9B:
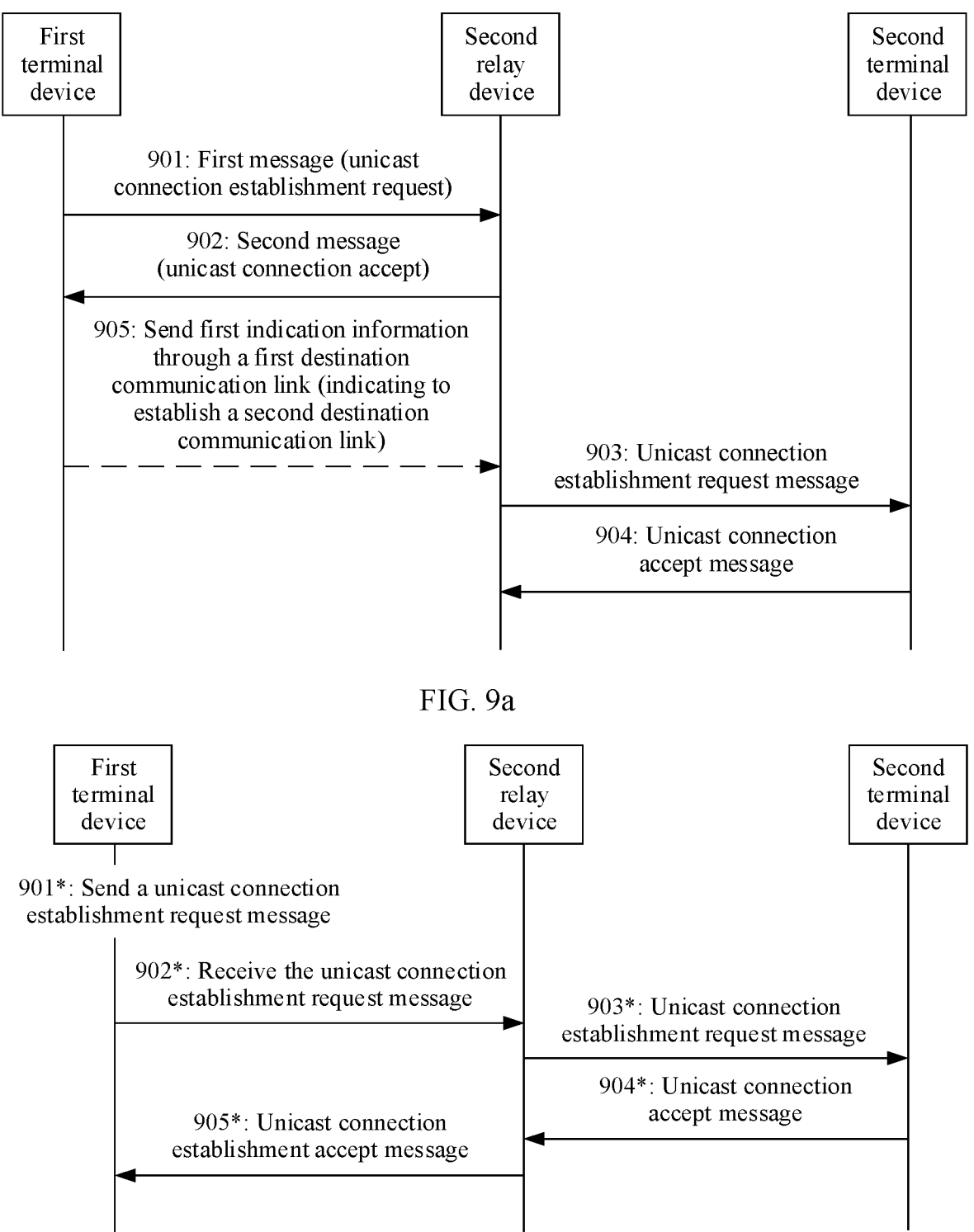
FIG. 9*a* is a first schematic flowchart of establishing a destination communication link in a scenario 1 according to an embodiment of this application.
FIG. 9*b* is a second schematic flowchart of establishing a destination communication link in a scenario 1 according to an embodiment of this application.

As shown in FIG. 9a, in a possible implementation, the first destination communication link is first established, and then the second destination communication link is established.

S901. The first terminal device sends a first message to the second relay device, and the second relay device receives the first message from the first terminal device.

The first message requests to establish the unicast connection between the first terminal device and the second relay device. The first request may be a unicast connection establishment request message.

S902. The second relay device sends a second message to the first terminal device, and the first terminal device receives the second message from the second relay device.

The second message indicates that the unicast connection is accepted. The second message may be a unicast connection establishment accept message (direct communication accept).

The unicast connection between the first terminal device and the second relay device is established by using S901 and S902. That is, the establishment of the first destination communication link is completed.

S903. The second relay device sends a unicast connection establishment request message to the second terminal device, and the second terminal device receives the unicast connection establishment request message from the second relay device.

S904. The second terminal device returns a unicast connection establishment accept message to the second relay device, and the second relay device receives the unicast connection establishment accept message from the second terminal device.

The unicast connection between the second terminal device and the second relay device is established by using S903 and S904. That is, the second destination communication link is established.

The second relay device needs to trigger the establishment of the second destination communication link based on an indication of the first terminal device. Optionally, the first message may indicate the second relay device to establish the unicast connection to the second terminal device. After receiving the first message in S901, the second relay device may trigger, based on the first message, the establishment of the second destination communication link. When the first message indicates the second relay device to establish the unicast connection to the second terminal device, the first message may carry indication information, and the indication information indicates the second relay device to establish the unicast connection to the second terminal device.

In another optional manner, before S903, the method further includes S905.

S905. After establishing the first destination communication link, the first terminal device sends first indication information to the second relay device through the first destination communication link, and the second relay device receives the first indication information from the first terminal device.

The first indication information indicates the second relay device to establish the unicast connection to the second terminal device. The second relay device triggers the establishment of the second destination communication link based on the first indication information. The first indication information may be carried in a PC5-S message or a PC5-RRC message sent by the first terminal device to the second relay device.

For example, the first indication information may be an L2 ID of the second terminal device.

In the scenario of the establishment of the destination communication link in FIG. 9a, based on that the second relay device can be discovered by the first terminal device, the first terminal device has determined to switch to the second relay device. However, in an actual application, when performing link switching, the first terminal device may not determine a relay device to be switched. For example, the second relay device does not actively send a discovery message to surroundings, and the first terminal device does not perceive that the second relay device exists around. The first terminal device cannot obtain the channel quality of the first destination communication link and the channel quality of the second destination communication link. The first terminal device may determine, based on the source communication link, whether the specified condition is satisfied. For example, the first terminal device determines whether any one or more of the following specified conditions is/are satisfied: the channel quality of the first source communication link is less than the first threshold; the channel quality of the second source communication link is less than the second threshold; or the sum of the channel quality of the first source communication link and the channel quality of the second source communication link is less than the third threshold. When the specified condition is satisfied, it is determined to perform link switching. However, the first terminal device does not determine a relay device to be switched to. In this case, the destination communication link may be established in a manner shown in FIG. 9b.

As shown in FIG. 9b, in a possible implementation, the second destination communication link is first established, and then the first destination communication link is established.

S901*. The first terminal device sends a third message.

The third message is a unicast connection establishment request message for the second terminal device. The third message requests to establish the unicast connection to the second terminal device. Currently, the first terminal device and the second terminal device communicate with each other through the first relay device, the first terminal device has established a unicast connection to the first relay device, and the first relay device has established a unicast connection to the second terminal device. That the first terminal device sends a third message is equivalent to that the first terminal device re-requests to establish the unicast connection for the second terminal device. The third message may indicate an identifier of the second terminal device, for example, an L2 ID of the second terminal device. The third message may be sent through broadcast. When receiving the third message, the second relay device determines that the second relay device can perform a relay forwarding function for the first terminal device and the second terminal device. In this case, the second relay device triggers the establishment of the destination communication link.

The third message may carry indication information indicating that relay is supported, indicating that the unicast connection between the current request and the second terminal device supports relay forwarding.

S902*. The second relay device receives the third message from the first terminal device.

S903*. The second relay device sends a unicast connection establishment request message to the second terminal device, and the second terminal device receives the unicast connection establishment request message from the second relay device.

S904*. The second terminal device returns a unicast connection establishment accept message to the second relay device, and the second relay device receives the unicast connection establishment accept message from the second terminal device.

The unicast connection between the second terminal device and the second relay device is established by using S903* and S904*. That is, the second destination communication link is established.

S905*. The second relay device returns a fourth message to the first terminal device, and the first terminal device receives the fourth message from the second relay device.

The fourth message indicates to accept the establishment of the unicast connection, or indicates that the establishment of the unicast connection is completed, and the fourth message may be a unicast connection establishment accept message.

The unicast connection between the first terminal device and the second relay device is established by using S901*, S902*, and S905*. That is, the establishment of the first destination communication link is completed.

In other words, the establishment of the first destination communication link and the establishment of the second destination communication link are completed by using S901* to S905*.

Figures 10, 11:
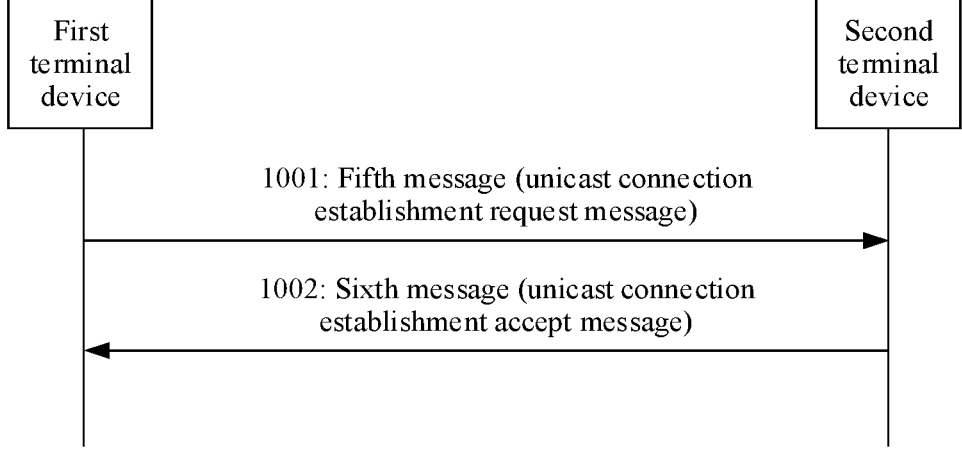
FIG. 10 is a schematic flowchart of establishing a destination communication link in a scenario 2 according to an embodiment of this application.
FIG. 11 is a first schematic flowchart of releasing a source communication link according to an embodiment of this application.

In the scenario 2, the destination communication link includes a link through which the first terminal device is directly connected to the second terminal device. As shown in FIG. 10, after determining to perform link switching, the first terminal device establishes the destination communication link by using the following steps.

S1001. The first terminal device sends a fifth message to the second terminal device, and the second relay device receives the fifth message from the first terminal device.

The fifth message requests to establish the unicast connection to the second terminal device. The fifth message may be a unicast connection establishment request message.

The fifth message may include indication information indicating that relay is supported; or may not include indication information indicating that relay is supported. When the fifth message includes the indication information indicating that relay is supported, if a proper relay device nearby receives the fifth message, the relay device may establish a relay link based on the indication information indicating that relay is supported in the fifth message. This case is similar to the destination link establishment procedure in FIG. 9b. When the fifth message includes the indication information indicating that relay is supported, there may be no suitable relay device around, and S1002 is performed. When the fifth message does not include the indication information indicating that relay is supported, even if there is an appropriate relay device around, the relay device determines that the fifth message does not include the indication information indicating that relay is supported, and does not establish the relay link.

S1002. The second terminal device sends a sixth message to the first terminal device, and the first terminal device receives the sixth message from the second terminal device.

The sixth message indicates that the establishment of the unicast connection is completed, or indicates that the establishment of the unicast connection is accepted. The sixth message may be a unicast connection establishment accept message.

The following describes possible implementations of releasing the source communication link.

Regardless of the scenario 1 or the scenario 2, the source communication link includes the first source communication link and the second source communication link. A process of releasing the source communication link includes releasing the first source communication link and releasing the second source communication link.

As shown in FIG. 11, after determining to perform link switching, the first terminal device releases the source communication link by using the following steps.

S1101. The first terminal device sends a sixth message to the first relay device, and the first relay device receives the sixth message from the first terminal device.

The sixth message requests to release the unicast connection between the first terminal device and the first relay device. The sixth message may be a unicast connection release request (direct communication release) message.

S1102. The first relay device sends a seventh message to the first terminal device, and the first terminal device receives the seventh message from the first relay device.

The seventh message indicates to accept the release of the unicast connection, or indicates that the release of the unicast connection is completed. The seventh message may be a unicast connection release accept (direct communication release accept) message.

The unicast connection between the first terminal device and the second relay device is released by using S1101 and S1102. That is, the first source communication link is released.

S1103. The first relay device sends a unicast connection release request message to the second terminal device, and the second terminal device receives the unicast connection release request message from the first relay device.

S1104. The second terminal device returns a unicast connection release accept message to the first relay device, and the first relay device receives the unicast connection release accept message from the second terminal device.

The unicast connection between the second terminal device and the first relay device is released by using S1103 and S1104. That is, the second source communication link is released.

The first relay device needs to trigger the release of the second source communication link based on an indication of the first terminal device. Optionally, the sixth message may indicate the first relay device to release the unicast connection to the second terminal device. After receiving the sixth message in S1101, the first relay device may trigger, based on the sixth message, the release of the second source communication link. In another optional manner of S1103 and S1104, after releasing the first source communication link, the first relay device autonomously triggers a procedure of releasing the second source communication link.

Figures 12, 13:
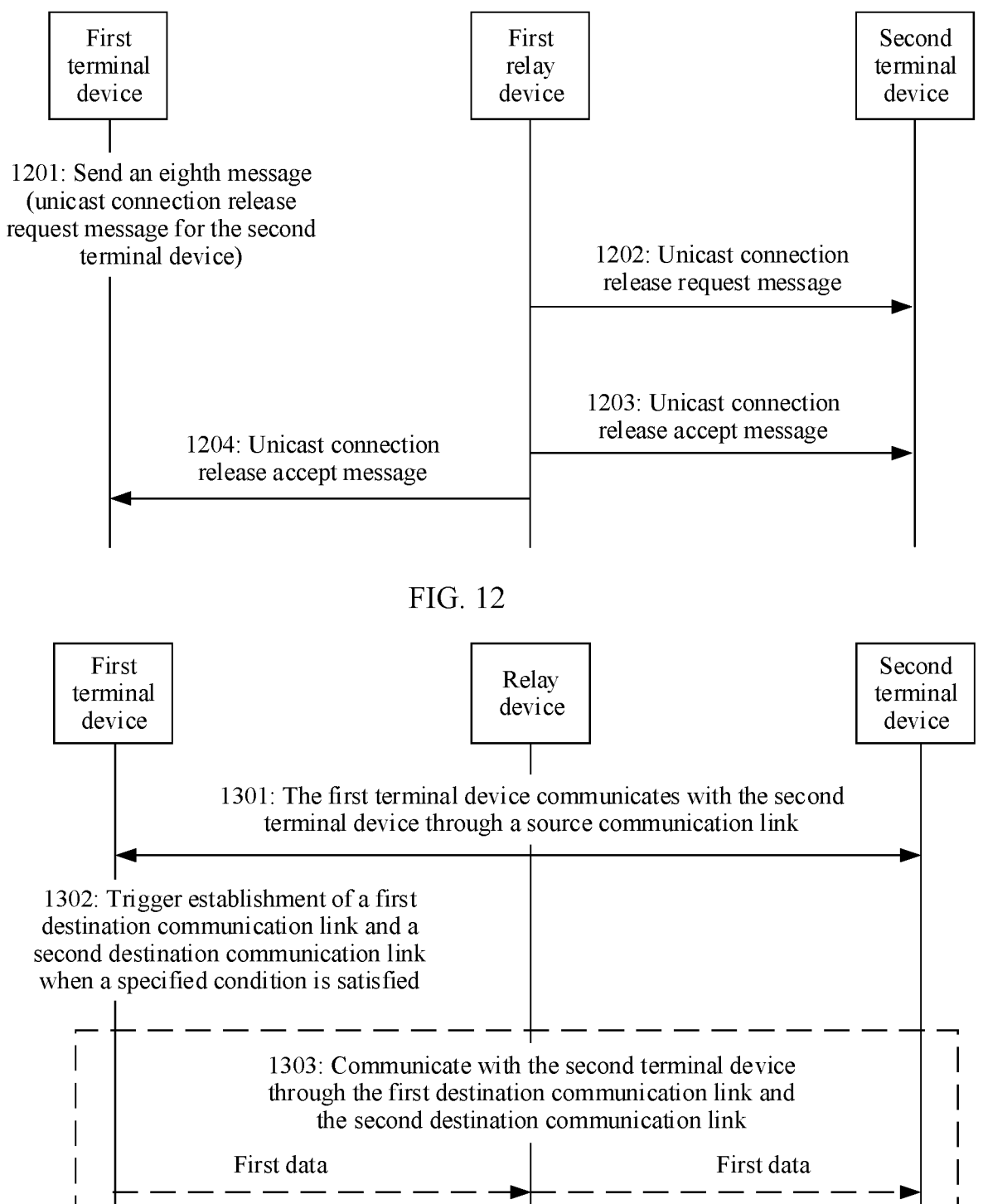
FIG. 12 is a second schematic flowchart of releasing a source communication link according to an embodiment of this application.
FIG. 13 is a schematic flowchart of a link switching method in sidelink communication in a scenario 3 according to an embodiment of this application.

As shown in FIG. 12, after determining to perform link switching, the first terminal device may further release the source communication link by using the following steps.

S1201. The first terminal device sends an eighth message. The first relay device receives the eighth message from the first terminal device.

The eighth message is a unicast connection release request message for the second terminal device. Currently, the first terminal device communicates with the second terminal device through the first relay device. Therefore, the eighth message sent by the first terminal device is forwarded by the first relay device. The eighth message may include indication information indicating that relay is supported.

S1202. After receiving the eighth message from the first terminal device, the first relay device forwards a unicast connection release request message to the second terminal device, and the second terminal device receives the unicast connection release request message from the second relay device.

S1203. The second terminal device returns a unicast connection release accept message to the first relay device, and the first relay device receives the unicast connection release accept message from the second terminal device.

The unicast connection between the second terminal device and the first relay device is released by using S1202 and S1203. That is, the second source communication link is released.

S1204. The first relay device forwards the unicast connection release accept message to the first terminal device, and the first terminal device receives the unicast connection release accept message from the first relay device.

The unicast connection between the first terminal device and the first relay device is released by using S1201 and S1204. That is, the first source communication link is released.

In other words, the release of the first source communication link and the release of the second source communication link are completed by using S1201 to S1204.

The link switching methods in the scenario 1 and the scenario 2 are described above.

As shown in FIG. 13, in the foregoing scenario 3, a procedure of a link switching method in sidelink communication is described as follows:

S1301. The first terminal device communicates with the second terminal device through a source communication link.

The source communication link is the communication link through which the first terminal device is directly connected to the second terminal device.

S1302. The first terminal device triggers establishment of a first destination communication link and a second destination communication link when a specified condition is satisfied.

The first destination communication link is a link between the first terminal device and a relay device, and the second destination communication link is a link between the first terminal device and the relay device. The relay device herein may be denoted as a third relay device. The third relay device is equivalent to the second relay device in the scenario 1. For some or all operations of the third relay device, refer to the foregoing operations of the second relay device.

Optionally, after the first destination communication link and the second destination communication link are established, the method may further include S1303.

S1303. The first terminal device communicates with the second terminal device through the first destination communication link and the second destination communication link.

For S1303, refer to the process of S403 in the scenario 1. Details are not described herein again.

The following describes in detail some possible implementations in the embodiment in FIG. 13.

The specified condition in S1302 may be associated with any one or more of the following channel quality: the source communication link, the first destination communication link, or the second destination communication link.

For descriptions of the channel quality of the communication link, refer to the related descriptions in the scenario 1 and the scenario 2. Details are not described herein again.

The specified condition in S1302 may include any one or more of the following:

the channel quality of the source communication link is less than a seventh threshold; the channel quality of the first destination communication link is greater than a fourth threshold; the channel quality of the source communication link is less than the channel quality of the first destination communication link; the channel quality of the second destination communication link is greater than a fifth threshold; the channel quality of the source communication link is less than the channel quality of the second destination communication link; the channel quality of the source communication link is less than a sum of the channel quality of the first destination communication link and the channel quality of the second destination communication link; or a sum of the channel quality of the first destination communication link and the channel quality of the second destination communication link is greater than a sixth threshold.

It may also be described as follows: The specified condition in S1302 may include any one or more of the following:

the channel quality of the source communication link is less than or equal to the seventh threshold; the channel quality of the first destination communication link is greater than or equal to the fourth threshold; the channel quality of the source communication link is less than or equal to the channel quality of the first destination communication link; the channel quality of the second destination communication link is greater than or equal to the fifth threshold; the channel quality of the source communication link is less than or equal to the channel quality of the second destination communication link; the channel quality of the source communication link is less than or equal to the sum of the channel quality of the first destination communication link and the channel quality of the second destination communication link; or the sum of the channel quality of the first destination communication link and the channel quality of the second destination communication link is greater than or equal to the sixth threshold.

In this embodiment of this application, the specified condition may be configured by a network device of the first terminal for the first terminal device. For example, the network device of the first terminal configures the specified condition for the first terminal by using an RRC message, an SIB message, or pre-configured information. Alternatively, the specified condition may be pre-stored locally by the first terminal device, or may be pre-specified in a protocol. The specified condition may be configured by another terminal device for the first terminal device, for example, configured by the second terminal device for the first terminal device. For example, the another terminal may configure the specified condition for the first terminal by using a PC5-RRC message.

For a method for obtaining, by the first terminal device, the channel quality of the first destination link and the channel quality of the second destination link, refer to the related descriptions in the foregoing scenario 1.

It should be noted that, in the scenario 3, when the channel quality of the first destination communication link and the channel quality of the second destination link are measured by using the embodiment in FIG. 6, because the source link is the direct link, the measurement is different from that in the scenario 1.

A difference is that the second indication information indicates one or more of the following information: a source address used by the first terminal device to send data to the second terminal device, and a destination address used by the first terminal device to send data to the second terminal device. Herein, the source address used by the first terminal device to send the data to the second terminal device may be an L2 ID of the first terminal device, and the destination address used by the first terminal device to send the data to the second terminal device may be an L2 ID of the second terminal device.

The first terminal device and the second terminal device communicate with each other. Optionally, the second terminal device may send indication information to the third relay device, and the indication information is denoted as fourth indication information. The fourth indication information indicates one or more of the following information: a source address used by the second terminal device to send data to the first terminal device, and a destination address used by the second terminal device to send data to the first terminal device. Herein, the source address used by the second terminal device to send the data to the first terminal device may be the L2 ID of the second terminal device, and the destination address used by the second terminal device to send the data to the first terminal device may be the L2 ID of the first terminal device.

The second indication information is used by the third relay device to measure the channel quality of the first destination communication link. The fourth indication information is used by the third relay device to measure the channel quality of the second destination communication link.

The third relay device may measure, based on the second indication information, first data sent by the first terminal device to the second terminal device, to obtain the channel quality of the first destination communication link between the first terminal device and the third relay device. It may be understood that, in this case, no actual communication link is established between the first terminal device and the third relay device, and the first destination communication link herein is a logical concept.

Similarly, the third relay device may measure, based on the fourth indication information, first data sent by the second terminal device to the first terminal device, to obtain the channel quality of the second destination communication link between the second terminal device and the third relay device. It may be understood that in this case, no actual communication link is established between the second terminal device and the third relay device, and the second destination communication link herein is a logical concept.

Different from the scenario 1 and the scenario 2, the source link in the scenario 3 is the link through which the first terminal device is directly connected to the second terminal device. In the scenario 3, the second terminal device may obtain the channel quality of the source link in any manner, and send the channel quality of the source link to the first terminal device, and the first terminal device obtains the channel quality of the source link from the second terminal device.

For the establishment of the first destination communication link and the establishment of the second destination communication link, refer to the foregoing destination link establishment process in the scenario 1. Details are not described herein again.

It should be noted that in the scenario 3, when the first destination communication link and the second destination communication link are established by using the embodiment in FIG. 9b, the first terminal device may determine, based on the source communication link, whether the specified condition is satisfied. For example, the first terminal device determines whether the channel quality of the source communication link is less than the seventh threshold, or the first terminal device determines whether the channel quality of the source communication link is less than or equal to the seventh threshold. When the specified condition is satisfied, it is determined to perform link switching. However, the first terminal device does not determine a relay device to be switched to. In this case, the destination communication link may be established in the manner shown in FIG. 9b.

A process of releasing the source link may be implemented based on the following steps. The first terminal device sends a message for requesting unicast connection release to the second terminal device. After receiving the message for requesting the unicast connection release from the first terminal device, the second terminal device sends a message for accepting the unicast connection release to the first terminal device, and the first terminal device receives the message for accepting the unicast connection release from the second terminal device. The source link is released.

In the foregoing link switching methods in the scenario 1 and the scenario 2 and the optional implementations, the first terminal device mainly triggers the establishment of the destination communication link or triggers the link switching when the specified condition is satisfied. The following provides another link switching method in sidelink communication. A first relay device triggers establishment of a destination communication link or triggers link switching when a specified condition is satisfied.

Figure 14:
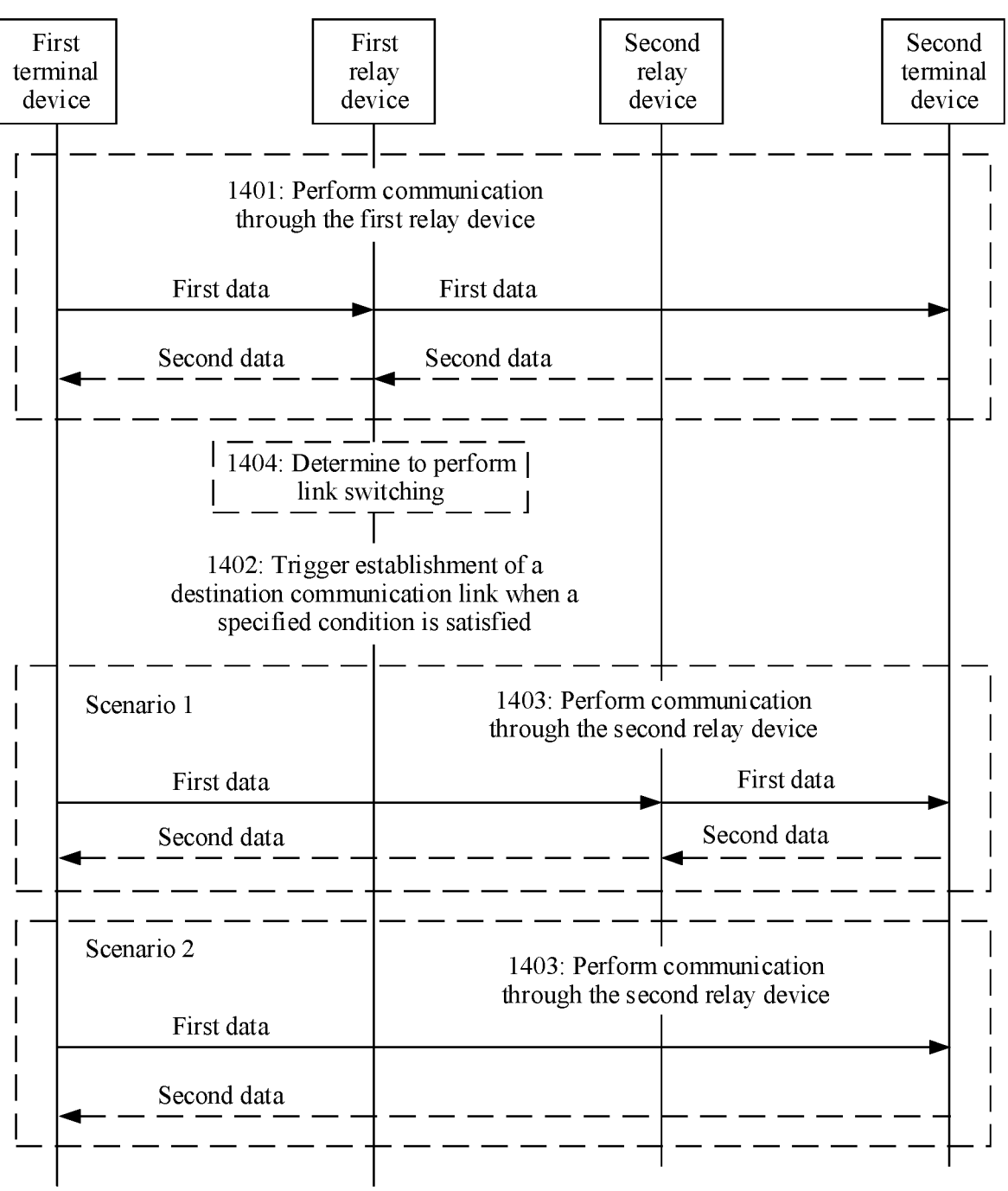
FIG. 14 is a second schematic flowchart of a link switching method in sidelink communication in a scenario 1 and a scenario 2 according to an embodiment of this application.

Based on the embodiment in FIG. 3, as shown in FIG. 14, in the foregoing scenario 1 or scenario 2, a procedure of another link switching method in sidelink communication according to an embodiment of this application is described as follows:

S1401. A first terminal device communicates with a second terminal device through a first relay device.

The sidelink communication may include one of two communication directions, or the two communication directions may coexist. For the two communication directions, refer to the descriptions in S401.

S1402. The first relay device triggers establishment of a destination communication link when a specified condition is satisfied.

In the scenario 1, the destination communication link includes a first destination communication link and a second destination communication link. The first destination communication link is a link between the first terminal device and a second relay device, and the second destination communication link is a link between the second terminal device and the second relay device.

In the scenario 2, the destination communication link is a link through which the first terminal device is directly connected to the second terminal device.

S1403. The first terminal device communicates with the second terminal device through the destination communication link.

Step S1403 is the same as S403.

The following describes some possible implementations in the embodiment in FIG. 14 by using examples.

First, how the first delay device determines whether the specified condition is satisfied in the scenario 1 and the scenario 2 is separately described.

In the scenario 1, the specified condition is associated with channel quality of any one or more of the following: the first source communication link, the second source communication link, the first destination communication link, or the second destination communication link.

In the scenario 2, the specified condition is associated with channel quality of any one or more of the following: the first source communication link, the second source communication link, or the destination communication link.

In the scenario 1 and the scenario 2, for descriptions of some details or optional manners of the specified condition, refer to the foregoing descriptions in the optional implementations of the embodiment in FIG. 4. Details are not described herein again. The following describes some parts different from the optional implementation of the embodiment in FIG. 4.

The specified condition may be configured by a network device of the first relay device for the first relay device. For example, the network device of the first relay device configures the specified condition for the first relay terminal by using an RRC message, an SIB message, or pre-configured information. Alternatively, the specified condition may be pre-stored locally by the first relay device, or may be pre-specified in a protocol. The specified condition may be configured by another terminal device for the first relay device, for example, configured by the first terminal device or the second terminal device for the first relay device. For example, the another terminal may configure the specified condition for the first relay device by using a PC5-RRC message.

The following describes how the first relay device obtains the channel quality of the source link and the channel quality of the destination link.

Optionally, before S1402, the method may further include S1404.

S1404. The first relay device determines to perform link switching.

In the scenario 1, a relay link is switched to a relay link. In this case, the link switching may also be understood as relay device reselection. S1404 may also be described as follows: The first relay device determines to perform relay device reselection or relay link reselection.

The first relay device determines, by determining whether the specified condition is satisfied, to perform link switching. When the specified condition is satisfied, the first terminal device determines to switch from the source communication link to the destination communication link.

The first relay device needs to make a link switching decision based on the channel quality of the link. The following separately uses examples to describe how the first relay device obtains the channel quality of the link in the scenario 1 and the scenario 2.

Figure 15:
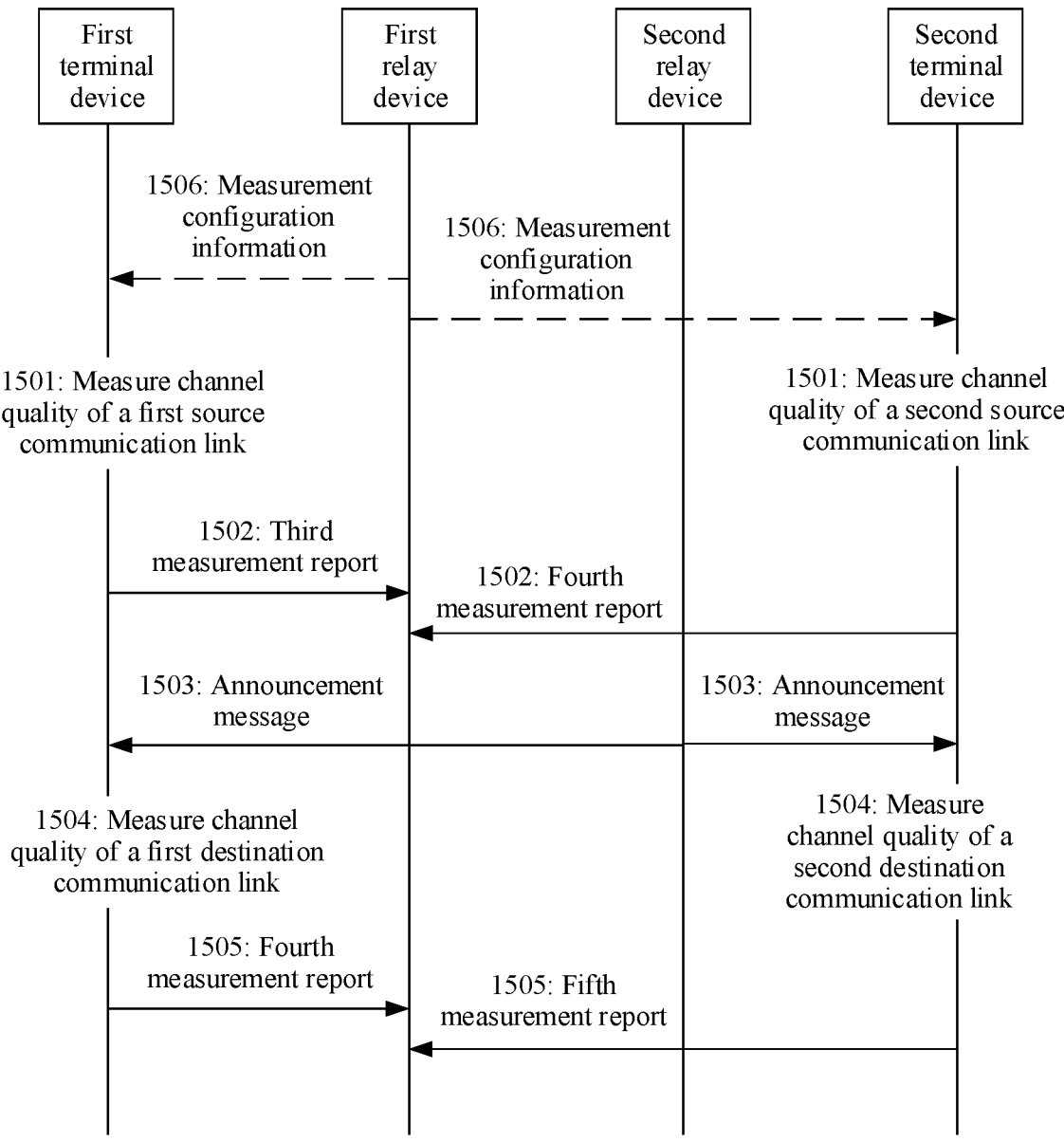
FIG. 15 is a fourth schematic flowchart of obtaining channel quality of a link in a scenario 1 according to an embodiment of this application.
Figure 16:
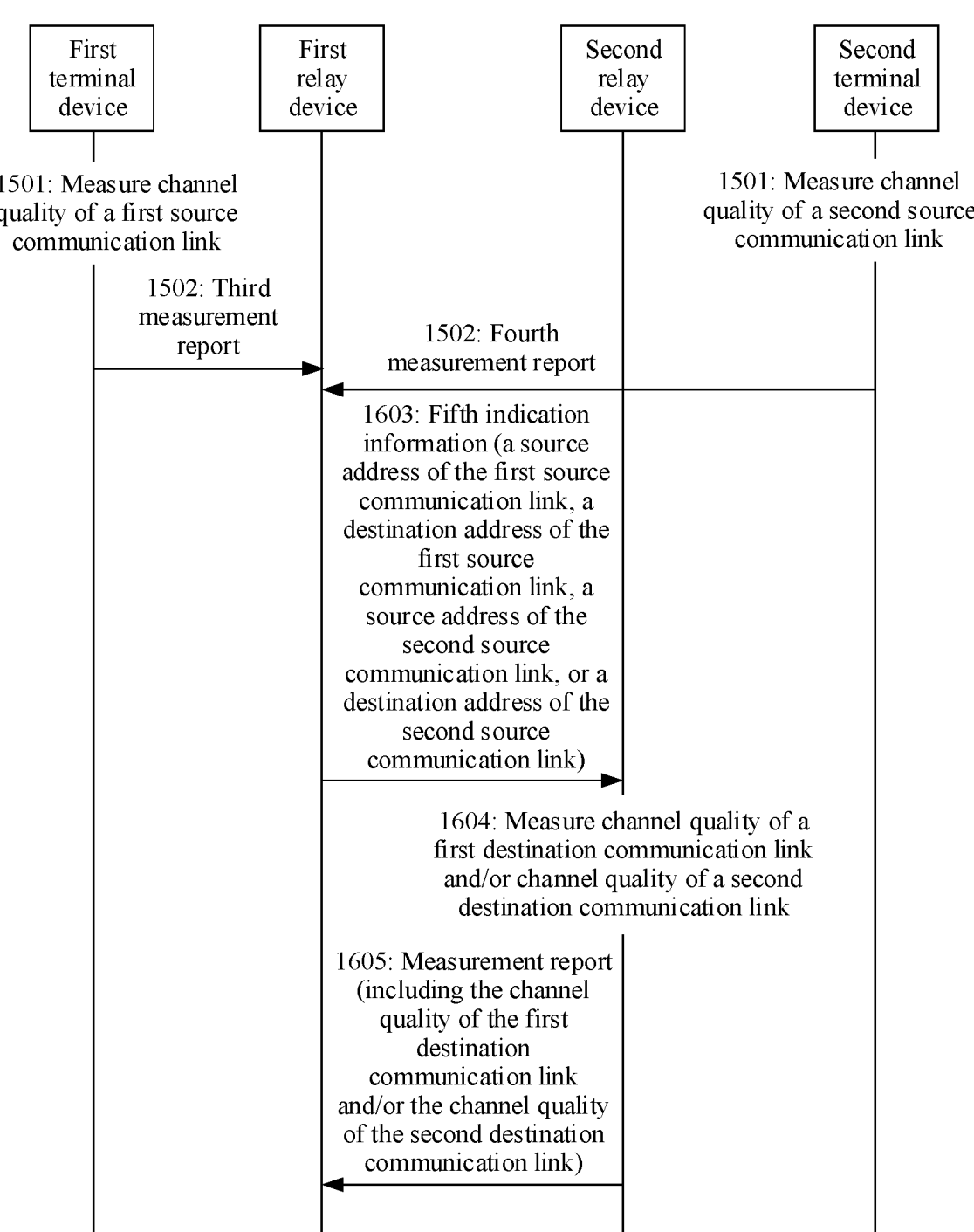
FIG. 16 is a fifth schematic flowchart of obtaining channel quality of a link in a scenario 1 according to an embodiment of this application.
Figure 17:
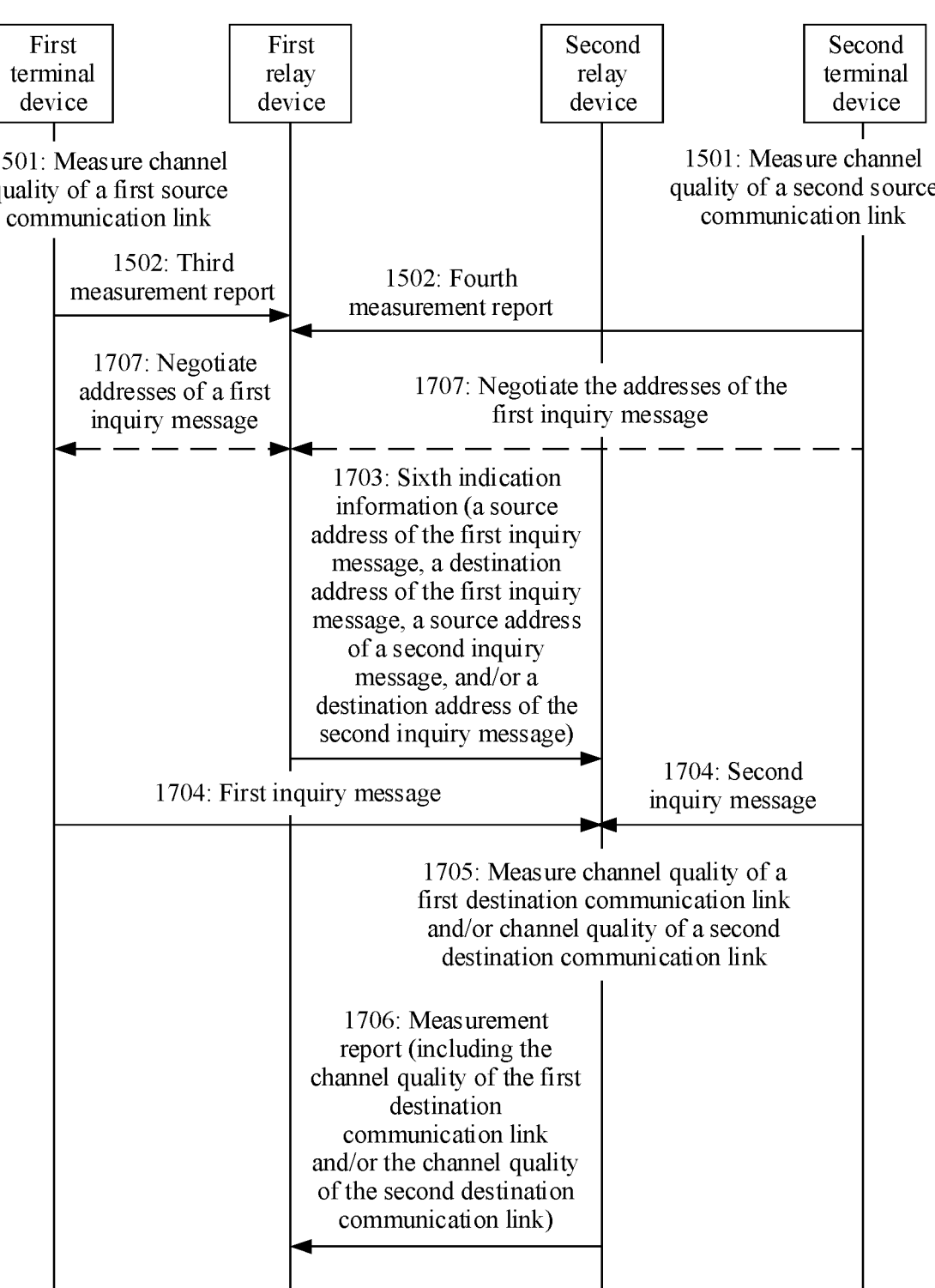
FIG. 17 is a sixth schematic flowchart of obtaining channel quality of a link in a scenario 1 according to an embodiment of this application.

The following uses FIG. 15 to FIG. 17 as examples to describe how the first relay device obtains the channel quality of the link in the scenario 1.

S1501. The first terminal device measures the channel quality of the first source communication link, and the second terminal device measures the channel quality of the second source communication link.

The first terminal device and the second terminal device may separately measure the channel quality of the first source communication link and the channel quality of the second source communication link based on an SL measurement configuration of the first relay device.

For example, the first terminal device may obtain a measurement result of a reference signal based on the reference signal received from the first relay device, to obtain the channel quality of the first source communication link. The first terminal device measures a DMRS of a PC5-non-RRC connection corresponding to the first relay device, to obtain an RSRP of the DMRS, where the RSRP is the channel quality of the first source communication link.

For example, the second terminal device may obtain a measurement result of a reference signal based on the reference signal received from the first relay device, to obtain the channel quality of the second source communication link. For example, the second terminal device measures a DMRS of a PC5-non-RRC connection corresponding to the first relay device, to obtain an RSRP of the DMRS, where the RSRP is the channel quality of the second source communication link.

S1502. The first terminal device sends a third measurement report to the first relay device. The second terminal device sends a fourth measurement report to the first relay device.

The third measurement report may carry the channel quality of the first source communication link, for example, an RSRP of a DMRS of a PC5-RRC connection corresponding to the first terminal device and the first relay device. The fourth measurement report carries the channel quality of the second source communication link, for example, an RSRP of a DMRS of a PC5-RRC connection corresponding to the second terminal device and the first relay device.

The first terminal device and the second terminal device may send the measurement reports to the first relay device in the following several trigger manners.

Trigger manner a: When a reporting condition is satisfied, sending of the measurement report is triggered. A reporting condition of the first terminal device may be that the channel quality of the first source communication link is less than a threshold, for example, the first threshold. A reporting condition of the second terminal device may be that the channel quality of the second source communication link is less than a threshold, for example, the second threshold. The reporting condition of the first terminal device may be configured by the first relay device for the first terminal device. The reporting condition of the second terminal device may be configured by the first relay device for the second terminal device.

Trigger manner b: The measurement report is periodically sent. A periodicity in which the first terminal device sends the third measurement report may be configured by the first relay device for the first terminal device. A periodicity in which the second terminal device sends the fourth measurement report may be configured by the first relay device for the second terminal device.

Trigger manner c: After the first relay device sends a request message to the first terminal device, sending of the third measurement report by the first terminal device to the first relay device is triggered based on the request message. Similarly, after the first relay device sends a request message to the second terminal device, sending of the fourth measurement report by the second terminal device to the first relay device is triggered based on the request message.

The first terminal device and the second terminal device may be triggered to report the measurement reports in a same manner or different manners.

S1501 and S1502 are steps in which the first relay device obtains the channel quality of the first source communication link and the channel quality of the second source communication link. In an alternative implementation, the first relay device may measure the channel quality of the first source communication link and the channel quality of the second source communication link. The first relay device may obtain measurement results of reference signals based on the reference signals separately received from the first terminal device and the second terminal device, to separately obtain the channel quality of the first source communication link and the channel quality of the second source communication link.

The following describes a possible manner in which the first terminal device obtains the channel quality of the destination communication link.

In the scenario 1, the destination communication link includes the first destination communication link and the second destination communication link. The following describes a first possible manner in which the first relay device obtains the channel quality of the destination communication link in the scenario 1 by using S1503 to S1506.

Because the first terminal device and the second terminal device do not establish unicast connections to the second relay device, there is no actually established link between the first terminal device and the second relay device, and there is no established link between the second terminal device and the second relay device. Therefore, before link switching, the first destination communication link is actually signal transmission quality between the first terminal device and the first relay device, and the second destination communication link is actually signal transmission quality between the second terminal device and the first relay device.

The second relay device broadcasts a discovery message or an announcement message to a surrounding terminal device. The announcement message is used as an example, and the announcement message indicates that the second relay device has a relay capability. The announcement message may be sent to the surrounding terminal device through a PC5 interface. The surrounding terminal device determines, by receiving the announcement message, that the second relay device has the relay capability.

S1503. The first terminal device receives the announcement message from the second relay device, and the second terminal device receives the announcement message from the second relay device.

The announcement message indicates that the second relay device has the relay capability, or is used by another terminal device to discover the second relay device. The announcement message may indicate an address of the second relay device, for example, a Layer 2 (L2) address.

S1504. The first terminal device determines the channel quality of the first destination communication link based on signal quality of the announcement message from the second relay device. The second terminal device determines the channel quality of the second destination communication link based on signal quality of the announcement message from the second relay device.

In this case, the first terminal device and the second terminal device do not establish the unicast connections to the second relay device. The first destination communication link and the second destination communication link herein are logical concepts, and are not actually established links.

S1505. The first terminal device sends a fifth measurement report to the first relay device, and the first relay device receives the fifth measurement report from the first terminal device. The fifth measurement report includes the channel quality that is of the second destination communication link and that is obtained by the second terminal device. The second terminal device sends a sixth measurement report to the first relay device, and the first relay device receives the sixth measurement report from the second terminal device. The sixth measurement report includes the channel quality that is of the second destination communication link and that is obtained by the second terminal device.

Optionally, the method may further include S1506. There is no strict execution sequence between S1506 and any one of S1503 to S1505. For example, S1506 may be performed before S1503, and in FIG. 15, S1506 is performed before S1501. There is no strict sequence of S1501, S1502, and S1503.

S1506. The first relay device separately sends measurement configuration information to the first terminal device and the second terminal device, and the first terminal device and the second terminal device separately receive the measurement configuration information from the first relay device.

The measurement configuration information includes one or more of the following information: an identifier of the second relay device, a cell identifier of the second relay device, or information about a carrier on which the second relay device works. The identifier of the second relay device may be an L2 ID used by the second relay device to send the announcement message.

The first relay device may send the measurement configuration information to the first terminal device and the second terminal device by using a PC5-RRC message.

The measurement configuration information in S1506 may further include a measurement event, and the measurement event may include that the first terminal device sends a measurement report when a reporting condition is satisfied. The reporting condition may be one or more of the following: the channel quality of the first source communication link is less than a threshold, for example, the first threshold; the channel quality of the first destination communication link is greater than a threshold, for example, the fourth threshold; or the channel quality of the second source communication link is less than the channel quality of the second destination communication link. The measurement event may further include that the second terminal device sends a measurement report when a reporting condition is satisfied. The reporting condition may be one or more of the following: the channel quality of the second source communication link is less than a threshold, for example, the second threshold; the channel quality of the second destination communication link is greater than a threshold, for example, the fifth threshold; or the channel quality of the second source communication link is less than the channel quality of the second destination communication link.

For a trigger manner in which the first terminal device sends the fifth measurement report to the first relay device and a trigger manner in which the second terminal device sends the sixth measurement report to the first relay device in S1505, refer to the following trigger manners.

Trigger manner a1: When a reporting condition is satisfied, sending of the measurement report is triggered. A reporting condition of the first terminal device may be that the channel quality of the first destination communication link is greater than a threshold, for example, the fourth threshold. The reporting condition of the second terminal device may be that the channel quality of the second destination communication link is less than a threshold, for example, the fifth threshold. The reporting condition of the first terminal device may be configured by the first relay device for the first terminal device. The reporting condition of the second terminal device may be configured by the first relay device for the second terminal device.

Trigger manner b1: The measurement report is periodically sent. A periodicity in which the first terminal device sends the fifth measurement report may be configured by the first relay device for the first terminal device. A periodicity in which the second terminal device sends the sixth measurement report may be configured by the first relay device for the second terminal device.

Trigger manner c1: After the first relay device sends a request message to the first terminal device, sending of the fifth measurement report by the first terminal device to the first relay device is triggered based on the request message. Similarly, after the first relay device sends a request message to the second terminal device, sending of the sixth measurement report by the second terminal device to the first relay device is triggered based on the request message.

The first terminal device and the second terminal device may be triggered to report the measurement reports in a same manner or different manners.

S1501 and S1502 are steps in which the first relay device obtains the channel quality of the first source communication link and the channel quality of the second source communication link, and S1503 to S1506 are a possible manner in which the first relay device obtains the channel quality of the first destination communication link and the channel quality of the second destination communication link in the scenario 1. Execution sequences of S1501 and S1502 and S1503 to S1506 may be exchanged, or S1501 and S1502 and S1503 to S1506 may be simultaneously performed.

In an optional manner of obtaining the channel quality of the destination communication link, as shown in FIG. 16, the following describes a second possible manner in which the first relay device obtains the channel quality of the destination communication link in the scenario 1. In this manner, the first relay device indicates the second relay device to measure the channel quality of the destination communication link.

S1501 and S1502 are described above. On this basis, the method further includes the following steps.

S1603. The first relay device sends indication information to the second relay device, and the second relay device receives the indication information from the first relay device.

The indication information may be denoted as fifth indication information. The fifth indication information indicates one or more of the following information: a source address of the first source communication link, a destination address of the first source communication link, a source address of the second source communication link, or a destination address of the second source communication link. The source address of the first source communication link herein may be an L2 ID of the first terminal device, and the destination address of the first source communication link may be an L2 ID of the first relay device. The source address of the second source communication link may be the L2 ID of the first relay device, and the destination address of the second source communication link may be an L2 ID of the second terminal device.

The fifth indication information is used by the second relay device to measure the channel quality of the first destination communication link and/or the channel quality of the second destination communication link.

S1604. The second relay device may measure, based on the fifth indication information, first data sent by the first terminal device to the first relay device through the first source communication link, to obtain the channel quality of the first destination communication link.

Optionally, because data transmission between the first terminal device and the second terminal device may be mutual, the second terminal device may also send second data to the first terminal device. In this case, the source address that is of the second source communication link and that is indicated by the fifth indication information may be the L2 ID of the second terminal device, and the destination address of the second source communication link may be the L2 ID of the first relay device. The second relay device may measure, based on the fifth indication information, the second data sent by the second terminal device to the first relay device through the second source communication link, to obtain the channel quality of the second destination communication link.

Alternatively, the first terminal device or the second terminal device may send indication information to the second relay device, to indicate one or more of the source address of the first source communication link, the destination address of the first source communication link, the source address of the second source communication link, or the destination address of the second source communication link. The second relay device measures, based on the indication information of the second terminal device, the first data sent by the first terminal device to the first relay device through the first source communication link, to obtain the channel quality of the first destination communication link, and measure the second data sent by the second terminal device to the first relay device through the second source communication link, to obtain the channel quality of the second destination communication link.

S1605. The second relay device sends a measurement report to the first relay device, and the first relay device receives the measurement report from the second relay device. The measurement report includes the channel quality of the first destination communication link and/or the channel quality of the second destination communication link.

For a trigger manner in which the second relay device sends the measurement report, refer to any one of the foregoing trigger manner a to trigger manner c. That is, reporting of the measurement report may be triggered when a reporting condition is satisfied. The reporting condition may be based on a comparison between the first destination communication link and a threshold value, or may be a comparison between the second destination communication link and a threshold value. The measurement report may be periodically reported, and information about a periodicity may be carried in the fifth indication information. Reporting may be triggered based on the fifth indication information, to be specific, measurement and reporting may be performed after the fifth indication information is received.

S1501 and S1502 are steps in which the first terminal device obtains the channel quality of the first source communication link and the channel quality of the second source communication link, and S1603 to S1605 are a second possible manner in which the first terminal device obtains the channel quality of the first destination communication link and the channel quality of the second destination communication link in the scenario 1. Execution sequences of S1501 and S1502 and S1603 to S1605 may be exchanged, or S1501 and S1502 and S1603 to S1605 may be simultaneously performed.

In an optional manner of obtaining the channel quality of the destination communication link, as shown in FIG. 17, the following describes a third possible manner in which the first relay device obtains the channel quality of the destination communication link in the scenario 1. In this manner, the first relay device indicates the second relay device to measure the channel quality of the destination communication link.

In sidelink communication, a discovery manner of a terminal device is: The terminal device sends an inquiry message to a surrounding terminal, where the inquiry message is used to inquire whether there is a relay terminal device around. If a relay terminal device receives the inquiry message, the relay terminal device returns an acknowledgment message to the terminal device, to indicate that the relay terminal device can provide a relay function. The second relay device may measure the channel quality of the destination link based on an inquiry message of the first terminal device or the second terminal device.

S1501 and S1502 are described above. On this basis, the method further includes the following steps.

S1703. The first relay device sends indication information to the second relay device, and the second relay device receives the indication information from the first relay device. The indication information may be denoted as sixth indication information.

Optionally, the sixth indication information indicates a first source address and/or a first destination address, where the first source address is a source address used by the first terminal device to send a first inquiry message, and the first destination address is a destination address used by the first terminal device to send the first inquiry message. The sixth indication information is used by the second relay device to measure the channel quality of the first destination communication link.

The sixth indication information may alternatively indicate a second source address and/or a second destination address. The second source address is a source address used by the second terminal device to send a second inquiry message, and the second destination address is a destination address used by the second terminal device to send the second inquiry message. The sixth indication information is used by the second relay device to measure the channel quality of the second destination communication link.

S1704. The second relay device receives the first inquiry message from the first terminal device. The second relay device receives the second inquiry message from the second terminal device.

The second relay device may receive the first inquiry message or the second inquiry message, or may receive both the first inquiry message and the second inquiry message.

S1705. The second relay device may determine the channel quality of the first destination communication link based on signal quality of the first inquiry message.

The second relay device may determine the channel quality of the second destination communication link based on signal quality of the second inquiry message.

S1706. The second relay device sends a measurement report to the first relay device, and the first relay device receives the measurement report from the second relay device.

The measurement report carries the channel quality of the first destination communication link, and may further carry the channel quality of the second destination communication link.

For a trigger manner in which the second relay device sends the measurement report, refer to any one of the foregoing trigger manner a to trigger manner c. That is, reporting of the measurement report may be triggered when a reporting condition is satisfied. The reporting condition may be based on a comparison between the first destination communication link and a threshold value, or may be a comparison between the second destination communication link and a threshold value. The measurement report may be periodically reported, and information about a periodicity may be carried in the sixth indication information. Reporting may be triggered based on the sixth indication information, to be specific, measurement and reporting may be performed after the sixth indication information is received.

Optionally, before S1703, the method may further include S1707.

S1707. The first relay device separately negotiates with the first terminal device and the second terminal device for corresponding addresses for sending the inquiry message.

For example, the first terminal device may send the first source address and the first destination address to the first relay device. The first source address is the source address used by the first terminal device to send the first inquiry message, and the first destination address is the destination address used by the first terminal device to send the first inquiry message.

For example, the second terminal device may send the second source address and the second destination address to the first relay device. The second source address is the source address used by the second terminal device to send the second inquiry message, and the second destination address is the destination address used by the second terminal device to send the second inquiry message.

After obtaining at least one of the first source address, the first destination address, the second source address, and the second destination address, the first relay device sends the sixth indication information to the second relay device.

S1501 and S1502 are steps in which the first relay device obtains the channel quality of the first source communication link and the channel quality of the second source communication link, and S1703 to S1707 are a third possible manner in which the first relay device obtains the channel quality of the first destination communication link and the channel quality of the second destination communication link in the scenario 1. Execution sequences of S1501 and S1502 and S1703 to S1707 may be exchanged, or S1501 and S1502 and S1703 to S1707 may be simultaneously performed.

It should be noted that, the first relay device may directly send the fifth indication information to the second relay device through an interface between the first relay device and the second relay device in S1603, and the first relay device may directly send the sixth indication information to the second relay device through the interface between the first relay device and the second relay device in S1703.

The embodiments in FIG. 15, FIG. 16, and FIG. 17 separately describe, by using the examples, how to obtain the channel quality of the communication link, including the first source communication link, the second source communication link, the first destination communication link, and the second destination communication link. The channel quality of the foregoing links is separately obtained based on different steps. It may be understood that, in the scenario 1, when the specified condition relates to channel quality of some communication links, some corresponding steps in the embodiments in FIG. 15, FIG. 16, and FIG. 17 may be selected to be performed, to obtain the channel quality of the some communication links related to the specified condition.

In the scenario 2, the destination communication link is a link through which the first terminal device is directly connected to the second terminal device. In the scenario 2, the first relay device may obtain the channel quality of the first source link and the channel quality of the second source link. For an obtaining manner, refer to S1501 and S1502 in the embodiment in FIG. 15. In the scenario 2, the first relay device may determine, based on the channel quality of the first source link and the channel quality of the second source link, to perform link switching. The first relay device determines whether the specified condition is satisfied, and determines to perform link switching when the specified condition is satisfied. The specified condition may include any one or more of the following: the channel quality of the first source communication link is less than a first threshold, the channel quality of the second source communication link is less than a second threshold, or a sum of the channel quality of the first source communication link and the channel quality of the second source communication link is less than a third threshold.

In the scenario 2, the first relay device may alternatively obtain the channel quality of the destination communication link from the first terminal device. For a manner in which the first terminal device obtains the channel quality of the destination communication link, refer to the foregoing descriptions in the embodiment in FIG. 8. After obtaining the channel quality of the destination communication link, the first relay device may determine, based on one or more of the channel quality of the first source link, the channel quality of the second source link, or the channel quality of the destination communication link, whether the specified condition is satisfied. When the specified condition is satisfied, it is determined to perform link switching. The specified condition may include any one or more of the following: the channel quality of the first source communication link is less than a first threshold; the channel quality of the second source communication link is less than a second threshold; a sum of the channel quality of the first source communication link and the channel quality of the second source communication link is less than a third threshold; the channel quality of the destination communication link is greater than a sixth threshold; or a sum of the channel quality of the first source communication link and the channel quality of the second source communication link is less than the channel quality of the destination communication link.

Till now, the implementations in which the first relay device obtains the channel quality of the communication link in the scenario 1 and the scenario 2 are described by using the examples. The obtained channel quality of the communication link is used to determine whether the specified condition is satisfied. When the specified condition is satisfied, the first relay device determines to perform link switching.

The link switching may include two parts, one part is to establish the destination communication link, and the other part is to release the source communication link. The releasing of the source communication link is optional. In embodiments of this application, the source communication link may be retained, or the source communication link may be released. The following describes the two parts of the link switching.

A possible implementation of establishing the destination communication link is first described.

In the scenario 1, the destination communication link includes the first destination communication link and the second destination communication link. A process of establishing the destination communication link includes establishing the first destination communication link and establishing the second destination communication link. The following uses examples to describe an implementation of establishing the destination communication link in the scenario 1.

Figure 18:
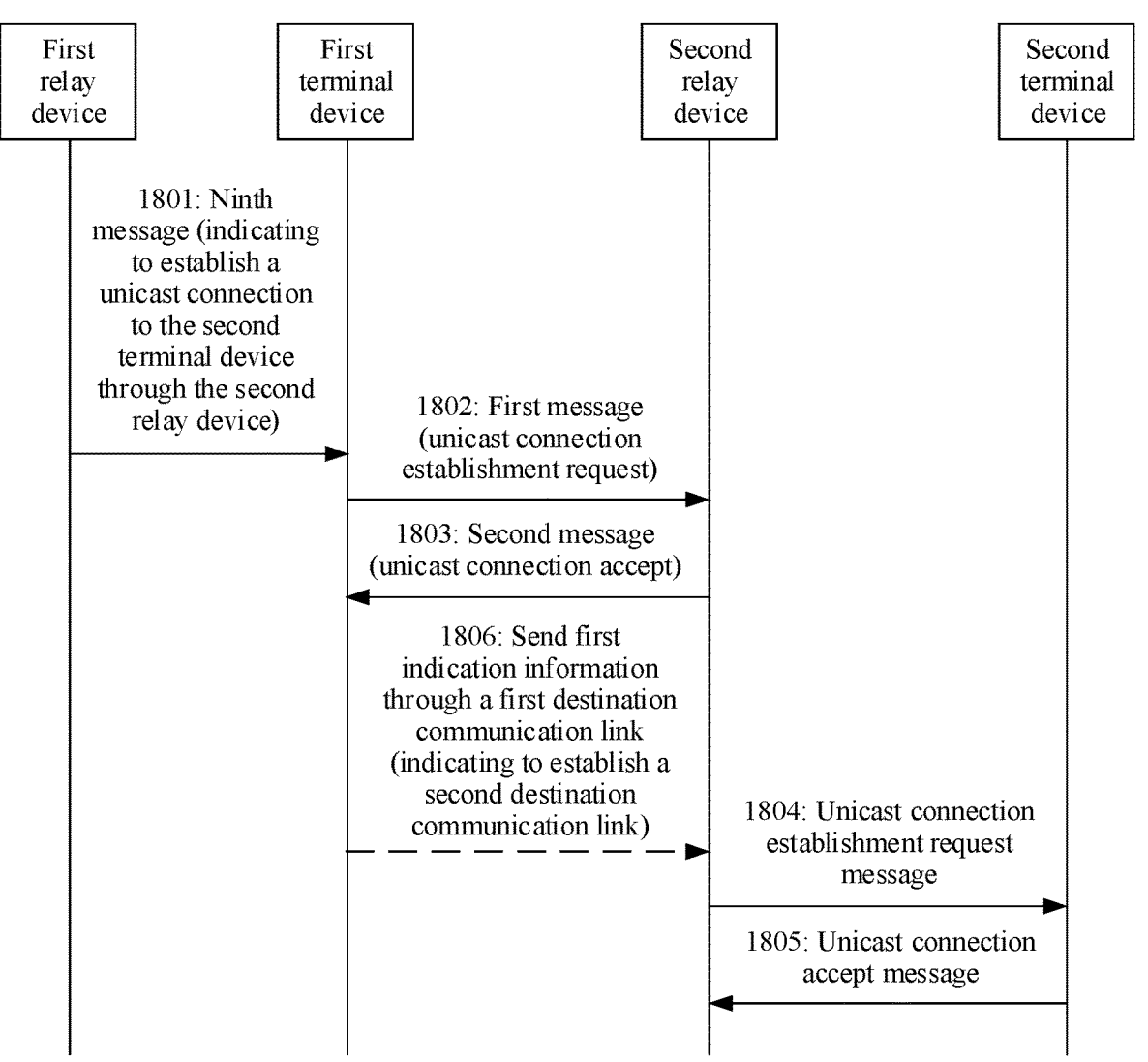
FIG. 18 is a third schematic flowchart of establishing a destination communication link in a scenario 1 according to an embodiment of this application.

As shown in FIG. 18, in a possible implementation, the first destination communication link is first established, and then the second destination communication link is established.

S1801. The first relay device sends a ninth message to the first terminal device, and the first terminal device receives the ninth message from the first relay device.

The ninth message indicates the first terminal device to establish the unicast connection to the second relay device, and indicates the first terminal device to trigger establishment of the unicast connection between the second relay device and the second terminal device. That the first terminal device triggers the establishment of the unicast connection between the second relay device and the second terminal device may be that the first terminal device sends indication information to the second relay device, to indicate the second relay device to establish the unicast connection to the second terminal.

S1802 is the same as S901.

S1803 is the same as S902.

The unicast connection between the first terminal device and the second relay device is established by using S1802 and S1803. That is, the first destination communication link is established.

S1804 is the same as S903.

S1805 is the same as S904.

The unicast connection between the second terminal device and the second relay device is established by using S1804 and S1805. That is, the second destination communication link is established.

In S1804 and S1805, the second relay device triggers the establishment of the second destination communication link. In a possible implementation, the first message in S1802 may indicate the second relay device to establish the unicast connection to the second terminal device. After receiving the first message in S1802, the second relay device may trigger, based on the first message, the establishment of the second destination communication link. In another optional manner, before S1804, the method further includes S1806.

S1806. After establishing the first destination communication link, the first terminal device sends the first indication information to the first relay device through the first destination communication link, and the first relay device receives the first indication information from the first terminal device.

This step is the same as S905.

Figures 19, 20:
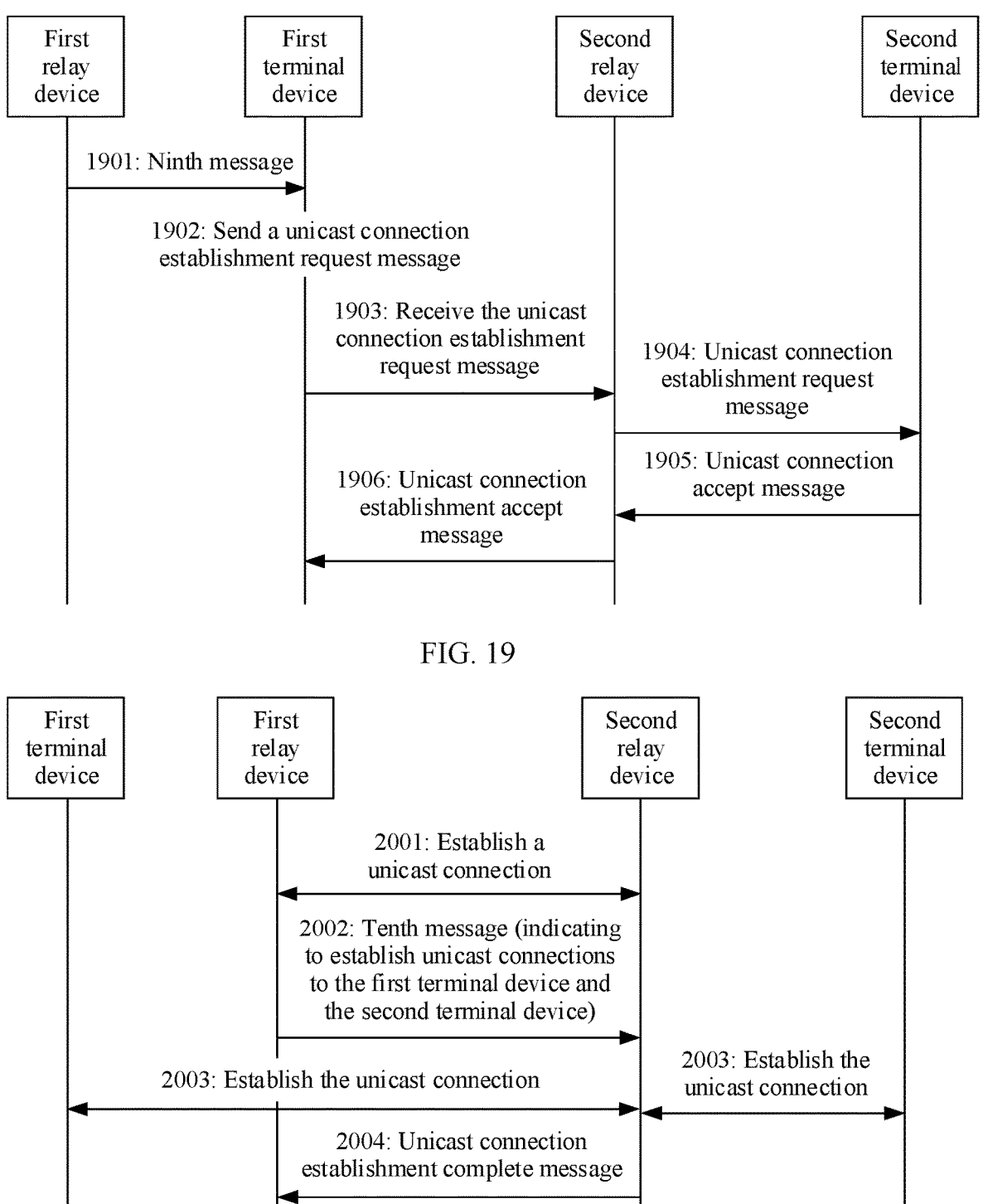
FIG. 19 is a fourth schematic flowchart of establishing a destination communication link in a scenario 1 according to an embodiment of this application.
FIG. 20 is a fifth schematic flowchart of establishing a destination communication link in a scenario 1 according to an embodiment of this application.

As shown in FIG. 19, in a possible implementation, the second destination communication link is first established, and then the first destination communication link is established.

S1901. The first relay device sends a ninth message to the first terminal device, and the first terminal device receives the ninth message from the first relay device.

The ninth message indicates the first terminal device to establish the unicast connection to the second relay device, and indicates the first terminal device to trigger establishment of the unicast connection between the second relay device and the second terminal. That the first terminal device triggers the establishment of the unicast connection between the second relay device and the second terminal device may be that the first terminal device sends indication information to the second relay device, to indicate the second relay device to establish the unicast connection to the second terminal.

S1902 to S1906 are the same as S901* to S905*. For details, refer to the descriptions in the embodiment in FIG. 9a. Details are not described herein again.

As shown in FIG. 20, another possible implementation of establishing the destination communication link is described as follows:

S2001. The first relay device establishes a unicast connection to the second relay device.

In an implementation, the first relay device sends a unicast connection establishment request to the second relay device, and the second relay device returns a unicast connection establishment accept message to the first relay device.

S2002. The first relay device sends a tenth message to the second relay device, and the second relay device receives the tenth message from the first relay device.

The tenth message indicates the second relay device to establish the unicast connection to the first terminal device, and indicates the second relay device to establish a unicast connection to the second terminal device.

S2003. The second relay device establishes the unicast connection to the first terminal device. The second relay device establishes the unicast connection to the second terminal device.

In an implementation, the second relay device sends a unicast connection establishment request message to the first terminal device, and the first terminal device returns a unicast connection establishment accept message to the second relay device.

The second relay device sends a unicast connection establishment request message to the second terminal device, and the second terminal device returns a unicast connection establishment accept message to the second relay device.

Optionally, S2004 may further be performed.

S2004. The second relay device sends a unicast connection establishment complete message to the first relay device. The first relay device receives the unicast connection establishment complete message from the second relay device. The unicast connection establishment complete message indicates that the establishment of the unicast connection between the second relay device and the first terminal device is completed, and indicates that the establishment of the unicast connection between the second relay device and the second terminal device is completed.

In the scenario 2, the destination communication link includes a link through which the first terminal device is directly connected to the second terminal device. After determining to perform link switching, the first relay device may establish the destination communication link by using the steps shown in FIG. 19.

The following describes possible implementations of releasing the source communication link.

Regardless of the scenario 1 or the scenario 2, the source communication link includes the first source communication link and the second source communication link. A process of releasing the source communication link includes releasing the first source communication link and releasing the second source communication link. After determining to perform link switching, the first relay device may send indication information to the first terminal device, to indicate the first terminal device to release the unicast connection to the second terminal device. For an operation performed after the first terminal device receives the indication information from the first relay device, refer to the embodiment in FIG. 11 or FIG. 12. Details are not described herein again. Optionally, another manner of releasing the source communication link may be as follows: The first relay device separately sends a unicast connection release request message to the first terminal device and the second terminal device. After separately receiving the unicast connection release request message from the first relay device, the first terminal device and the second terminal device separately release the unicast connections to the first relay device.

Further, the first terminal device and the second terminal device may further separately send unicast connection release complete messages to the first relay device. The first relay device receives the unicast connection release complete messages sent by the first terminal device and the second terminal device, and releases the first source communication link and the second source communication link.

In this embodiment of this application, the terminal device or the relay device may trigger unicast connection establishment or unicast connection release through indication performed by an RRC layer of the terminal device or the relay device may to a PC5-S layer.

In this embodiment of this application, when any terminal device of the first terminal device, the first relay device, the second relay device, or the second terminal device relates to operations of releasing the source communication link and establishing the destination communication link, the RRC layer of the terminal device may indicate the operation to the PC5-S layer.

It should be noted that, in this embodiment of this application, a name of the message is an example, and is not limited. The message may alternatively be replaced with another name having a same function or a same meaning. For example, the unicast connection establishment request message, the unicast connection establishment accept message, the unicast connection release request message, or the unicast connection release accept message may alternatively be replaced with another name. For example, the unicast connection establishment accept message may also be referred to as a unicast connection establishment complete message, and the unicast connection release accept message may also be referred to as a unicast connection release complete message.

It should be noted that the examples in the application scenarios in this application merely show some possible implementations, to help better understand and describe the method in this application. A person skilled in the art may obtain examples of some evolution forms according to the sidelink communication method provided in this application.

To implement functions in the foregoing methods provided in embodiments of this application, the first terminal device or the first relay device may include a hardware structure and/or a software module, and implement the foregoing functions in a form of the hardware structure, the software module, or a combination of the hardware structure and the software module. Whether one of the functions is implemented by using the hardware structure, the software module, or the combination of the hardware structure and the software module depends on a particular application and a design constraint condition of the technical solutions.

Figure 21:
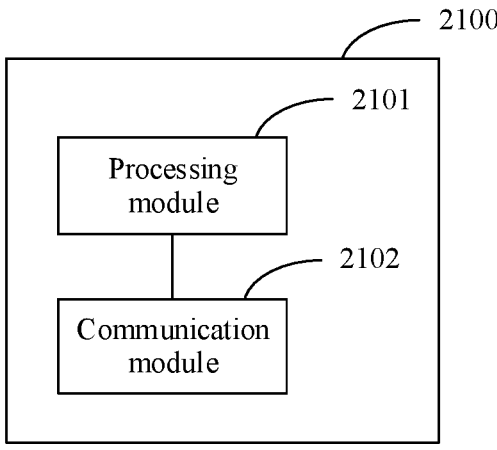
FIG. 21 is a first schematic diagram of a structure of a communication apparatus according to an embodiment of this application.

As shown in FIG. 21, based on a same technical concept, an embodiment of this application further provides a communication apparatus 2100. The communication apparatus 2100 may be a first terminal device or a first relay device, or may be an apparatus in the first terminal device or the first relay device, or may be an apparatus that can be used with the first terminal device or the first relay device. In a design, the communication apparatus 2100 may include modules that one-to-one correspond to the methods/operations/steps/actions performed by the first terminal device or the first relay device in the foregoing method embodiments. The module may be implemented by a hardware circuit, software, or a combination of a hardware circuit and software. In a design, the communication apparatus 2100 may include a processing module 2101 and a communication module 2102. The processing module 2101 is configured to invoke the communication module 2102 to perform a receiving function and/or a sending function.

In an embodiment, when the communication apparatus 2100 is configured to perform an operation performed by the first terminal device:

The communication module 2102 is configured to communicate with a second terminal device through a first relay device, where a link between the first terminal device and the first relay device is a first source communication link, and a link between the second terminal device and the first relay device is a second source communication link.

The processing module 2101 is configured to establish a destination communication link when a specified condition is satisfied.

The communication module 2102 is further configured to communicate with the second terminal device through the destination communication link.

When the communication apparatus 2100 is configured to perform an operation performed by the first terminal device:

In another embodiment, when the communication apparatus 2100 is configured to perform an operation performed by the first terminal device:

The communication module 2102 is configured to communicate with a second terminal device through a source communication link, where the source communication link is a communication link through which the first terminal device is directly connected to the second terminal device.

The processing module 2101 is configured to establish a first destination communication link and a second destination communication link when a specified condition is satisfied, where the first destination communication link is a link between the first terminal device and a relay device, and the second destination communication link is a link between the first terminal device and the relay device.

The communication module 2102 is further configured to communicate with the second terminal device through the first destination communication link and the second destination communication link.

When the communication apparatus 2100 is configured to perform an operation performed by the first relay device:

The communication module 2102 is configured to receive first data from a first terminal device, and forward the first data to a second terminal device, where a link between the first terminal device and the first relay device is a first source communication link, and a link between the second terminal device and the first relay device is a second source communication link.

The processing module 2101 is configured to trigger establishment of a destination communication link when a specified condition is satisfied, where the destination communication link is a link through which the first terminal device is to communicate with the second terminal device.

The foregoing describes an example in which the communication apparatus 2100 performs some operations of the first terminal device or the first relay device. It may be understood that the processing module 2101 and the communication module 2102 are further configured to perform other receiving or sending steps or operations performed by the first terminal device or the first relay device in the foregoing method embodiments. The processing module 2101 may be further configured to perform another corresponding step or operation performed by the first terminal device or the first relay device in the foregoing method embodiments. Details are not described herein again.

Module division in embodiments of this application is an example and is merely logical function division, and may be other division during actual implementation. In addition, functional modules in embodiments of this application may be integrated into one processor or may exist alone physically, or two or more modules may be integrated into one module. The integrated module may be implemented in a form of hardware, or may be implemented in a form of a software functional module.

Figure 22:
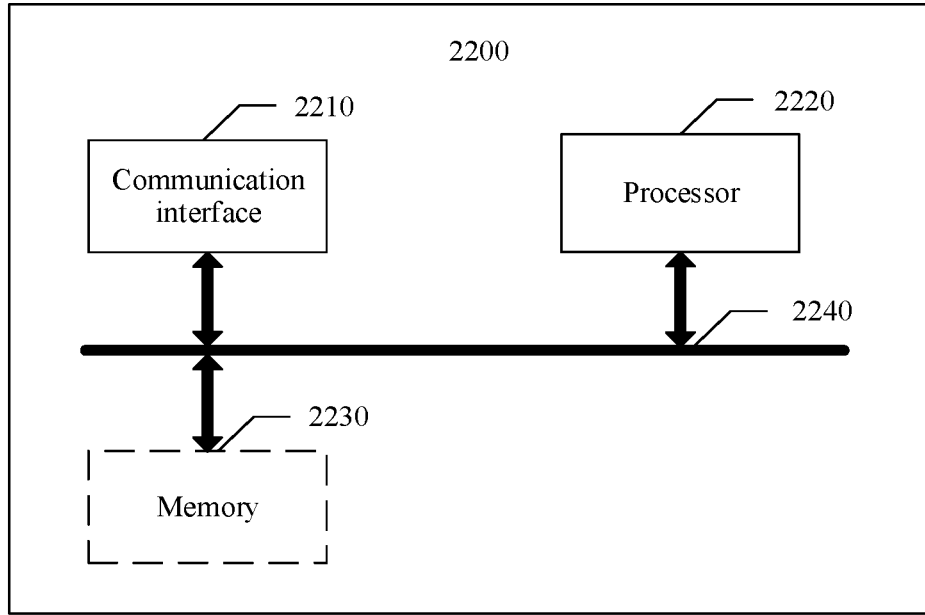
FIG. 22 is a second schematic diagram of a structure of a communication apparatus according to an embodiment of this application.

FIG. 22 shows a communication apparatus 2200 according to an embodiment of this application. The communication apparatus 2200 is configured to implement a function of the first terminal device or the first relay device in the foregoing method. The communication apparatus may be a first terminal device or a first relay device, or may be an apparatus in the first terminal device or the first relay device, or may be an apparatus that can be used with the first terminal device or the first relay device. The communication apparatus 2200 may be a chip system. In this embodiment of this application, the chip system may include a chip, or may include a chip and another discrete component. The communication apparatus 2200 includes at least one processor 2220, configured to implement the function of the first terminal device or the first relay device in the method provided in embodiments of this application. The communication apparatus 2200 may further include a communication interface 2210. In this embodiment of this application, the communication interface may be a transceiver, a circuit, a bus, a module, or a communication interface of another type, and is configured to communicate with another device through a transmission medium. For example, the communication interface 2210 is used by an apparatus in the communication apparatus 2200 to communicate with another device.

For example, when the communication apparatus 2200 is configured to perform an operation performed by the first terminal device:

In an embodiment, the communication interface 2210 is configured to communicate with a second terminal device through a first relay device, where a link between the first terminal device and the first relay device is a first source communication link, and a link between the second terminal device and the first relay device is a second source communication link.

The processor 2220 is configured to establish a destination communication link when a specified condition is satisfied.

The communication interface 2210 is further configured to communicate with the second terminal device through the destination communication link.

When the communication apparatus 2100 is configured to perform an operation performed by the first terminal device:

In another embodiment, the communication interface 2210 is configured to communicate with a second terminal device through a source communication link, where the source communication link is a communication link through which the first terminal device is directly connected to the second terminal device.

The processor 2220 is configured to establish a first destination communication link and a second destination communication link when a specified condition is satisfied, where the first destination communication link is a link between the first terminal device and a relay device, and the second destination communication link is a link between the first terminal device and the relay device.

The communication interface 2210 is further configured to communicate with the second terminal device through the first destination communication link and the second destination communication link.

When the communication apparatus 2200 is configured to perform an operation performed by the first relay device:

The communication interface 2210 is configured to receive first data from a first terminal device, and forward the first data to a second terminal device, where a link between the first terminal device and the first relay device is a first source communication link, and a link between the second terminal device and the first relay device is a second source communication link.

The processor 2220 is configured to trigger establishment of a destination communication link when a specified condition is satisfied, where the destination communication link is a link through which the first terminal device is to communicate with the second terminal device.

The processor 2220 and the communication module 2210 may be further configured to perform another corresponding step or operation performed by the first terminal device or the first relay device in the foregoing method embodiments. Details are not described herein again.

The communication apparatus 2200 may further include at least one memory 2230, configured to store program instructions and/or data. The memory 2230 is coupled to the processor 2220. The coupling in this embodiment of this application may be an indirect coupling or a communication connection between apparatuses, units, or modules in an electrical form, a mechanical form, or another form, and is used for information exchange between the apparatuses, the units, or the modules. The processor 2220 may operate in cooperation with the memory 2230. The processor 2220 may execute the program instruction stored in the memory 2230. The at least one memory may be included in the processor.

This embodiment of this application does not limit a specific connection medium between the communications interface 2210, the processor 2220, and the memory 2230. In this embodiment of this application, the memory 2230, the processor 2220, and the communications interface 2210 are connected by using a bus 2240 in FIG. 22. In FIG. 22, the bus is represented by a thick line. A manner of connection between other components is merely an illustrative description rather than a limitation. The bus may be classified into an address bus, a data bus, a control bus, and the like. For ease of representation, only one thick line is used to represent the bus in FIG. 22, but this does not mean that there is only one bus or only one type of bus.

When the communication apparatus 2100 and the communication apparatus 2200 are specifically chips or chip systems, the communication module 2102 and the communication interface 2210 may output or receive a baseband signal. When the communication apparatus 2100 and the communication apparatus 2200 are specifically devices, the communication module 2102 and the communication interface 2210 may output or receive a radio frequency signal.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware in the processor and a software module.

In this embodiment of this application, the memory 2230 may be a non-volatile memory, for example, a hard disk drive (HDD) or a solid-state drive (SSD); or may be a volatile memory, for example, a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

Some or all of the operations and functions performed by the first terminal device or the first relay device described in the foregoing method embodiments of this application may be implemented by using a chip or an integrated circuit.

To implement the function of the communication apparatus in FIG. 21 or FIG. 22, an embodiment of this application further provides a chip, including a processor, configured to support the communication apparatus in implementing the function related to the terminal in the foregoing method embodiments. In a possible design, the chip is connected to a memory or the chip includes the memory, and the memory is configured to store program instructions and data that are necessary for the communication apparatus.

An embodiment of this application provides a computer-readable storage medium that stores a computer program. The computer program includes instructions used to perform the foregoing method embodiments.

An embodiment of this application provides a computer program product including instructions. When the computer program product runs on a computer, the computer is enabled to perform the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this application have been described, a person skilled in the art can make changes and modifications to these embodiments once the person skilled in the art learns of the basic inventive concept. Therefore, the following claims are intended to be construed as to cover the embodiments and all changes and modifications falling within the scope of this application.

Clearly, a person skilled in the art can make various modifications and variations to embodiments of this application without departing from the spirit and scope of embodiments of this application. This application is intended to cover the modifications and variations of embodiments of this application provided that they fall within the scope of protection defined by the following claims of this application and their equivalent technologies.

What is claimed is:

1. A link switching method in sidelink communication, wherein the method is applied to a first communication apparatus and the method comprises:

communicating with a second communication apparatus through a first relay device, wherein a link between the first communication apparatus and the first relay device is a first source communication link, and a link between the second communication apparatus and the first relay device is a second source communication link;

establishing a destination communication link when a specified condition is satisfied; and communicating with the second communication apparatus through the destination communication link, wherein the destination communication link comprises a first destination communication link and a second destination communication link, the first destination communication link is a link between the first communication apparatus and a second relay device, and the second destination communication link is a link between the second communication apparatus and the second relay device; and the establishing a destination communication link comprises:

sending a first message to the second relay device, wherein the first message requests to establish a unicast connection between the first communication apparatus and the second relay device; and receiving a second message from the second relay device, wherein the second message is used to accept the establishment of the unicast connection between the first communication apparatus and the second relay device.

2. The method according to claim 1, wherein the specified condition is at least one of associated with channel quality of the first source communication link, or associated with channel quality of the second source communication link.

3. The method according to claim 2, wherein the channel quality is represented by using any one or more of the following parameters: a reference signal received power (RSRP), a reference signal-signal to interference plus noise ratio (RS-SINR), reference signal received quality (RSRQ), or a reference signal-received signal strength indicator (RS-RSSI).

4. The method according to claim 1, wherein the specified condition comprises one or more of the following:

the channel quality of the first source communication link is less than a first threshold, the channel quality of the second source communication link is less than a second threshold, or a sum of the channel quality of the first source communication link and the channel quality of the second source communication link is less than a third threshold.

5. The method according to claim 1, wherein the first message indicates the second relay device to establish a unicast connection to the second communication apparatus; or the method further comprises: after establishing the unicast connection to the second relay device, sending first indication information to the second relay device, wherein the first indication information indicates the second relay device to establish a unicast connection to the second communication apparatus.

6. The method according to claim 1, the method further comprises:

receiving an announcement message from the second relay device, wherein the announcement message indicates that the second relay device has a relay capability; and determining channel quality of the first destination communication link between the first communication apparatus and the second relay device based on signal quality of the announcement message.

7. A link switching method in sidelink communication, wherein the method is applied to a first communication apparatus and the method comprises:

communicating with a second communication apparatus through a source communication link, wherein the source communication link is a communication link through which the first communication apparatus is directly connected to the second communication apparatus;

establishing a first destination communication link and a second destination communication link when a specified condition is satisfied, wherein the first destination communication link is a link between the first communication apparatus and a relay device, and the second destination communication link is a link between the second communication apparatus and the relay device; and communicating with the second communication apparatus through the first destination communication link and the second destination communication link, wherein the establishing a first destination communication link comprises:

sending a first message to the relay device, wherein the first message requests to establish a unicast connection between the first communication apparatus and the relay device; and receiving a second message from the relay device, wherein the second message is used to accept the establishment of the unicast connection between the first communication apparatus and the relay device.

8. The method according to claim 7, wherein the specified condition is associated with any one or more of the following: channel quality of the source communication link, channel quality of the first destination communication link, or channel quality of the second destination communication link.

9. The method according to claim 8, wherein the channel quality is represented by using any one or more of the following parameters: a reference signal received power (RSRP), a reference signal-signal to interference plus noise ratio (RS-SINR), reference signal received quality (RSRQ), or a reference signal-received signal strength indicator (RS-RSSI).

10. The method according to claim 7, wherein the specified condition comprises any one or more of the following: the channel quality of the source communication link is less than a first threshold; the channel quality of the first destination communication link is greater than a second threshold; the channel quality of the source communication link is less than the channel quality of the first destination communication link; the channel quality of the second destination communication link is greater than a third threshold; the channel quality of the source communication link is less than the channel quality of the second destination communication link; the channel quality of the source communication link is less than a sum of the channel quality of the first destination communication link and the channel quality of the second destination communication link; or a sum of the channel quality of the first destination communication link and the channel quality of the second destination communication link is greater than a fourth threshold.

11. The method according to claim 7, wherein the first message indicates the relay device to establish a unicast connection to the second communication apparatus; or the establishing a second destination communication link comprises: after establishing the unicast connection to the relay device, sending first indication information to the relay device, wherein the first indication information indicates the relay device to establish a unicast connection to the second communication apparatus.

12. The method according to claim 7, wherein the establishing a first destination communication link comprises:

sending a third message, wherein the third message requests to establish a unicast connection to the second communication apparatus; and receiving a fourth message from the relay device, wherein the fourth message indicates to accept the establishment of the unicast connection.

13. A first communication apparatus, comprising a processor, wherein the processor is coupled to a non-transitory memory, the memory is configured to store instructions; and when the instructions are executed by the processor, cause the first communication apparatus to perform the following:

communicating with a second communication apparatus through a first relay device, wherein a link between the first communication apparatus and the first relay device is a first source communication link, and a link between the second communication apparatus and the first relay device is a second source communication link;

establishing a destination communication link when a specified condition is satisfied; and communicating with the second communication apparatus through the destination communication link, wherein the destination communication link comprises a first destination communication link and a second destination communication link, the first destination communication link is a link between the first communication apparatus and a second relay device, and the second destination communication link is a link between the second communication apparatus and the second relay device; and the establishing a destination communication link comprises:

sending a first message to the second relay device, wherein the first message requests to establish a unicast connection between the first communication apparatus and the second relay device; and receiving a second message from the second relay device, wherein the second message is used to accept the establishment of the unicast connection between the first communication apparatus and the second relay device.

14. The first communication apparatus according to claim 13, wherein the specified condition is at least one of associated with channel quality of the first source communication link, or associated with channel quality of the second source communication link.

15. The first communication apparatus according to claim 14, wherein the channel quality is represented by using any one or more of the following parameters: a reference signal received power (RSRP), a reference signal-signal to interference plus noise ratio (RS-SINR), reference signal received quality (RSRQ), or a reference signal-received signal strength indicator (RS-RSSI).

16. The first communication apparatus according to claim 13, wherein the specified condition comprises one or more of the following:

the channel quality of the first source communication link is less than a first threshold, the channel quality of the second source communication link is less than a second threshold, or a sum of the channel quality of the first source communication link and the channel quality of the second source communication link is less than a third threshold.

17. The first communication apparatus according to claim 13, wherein the first message indicates the second relay device to establish a unicast connection to the second communication apparatus; or after establishing the unicast connection to the second relay device, sending first indication information to the second relay device, wherein the first indication information indicates the second relay device to establish a unicast connection to the second communication apparatus.

* * * * *